United States Patent
Takahashi et al.

(10) Patent No.: US 10,951,871 B2
(45) Date of Patent: Mar. 16, 2021

(54) GENERATION DEVICE, IDENTIFICATION INFORMATION GENERATION METHOD, REPRODUCTION DEVICE, AND IMAGE REPRODUCTION RELATED TO STEREO PACKING OF PROJECTED FRAMES

(71) Applicant: SONY CORPORATION, Tokyo (JP)

(72) Inventors: Ryohei Takahashi, Kanagawa (JP); Mitsuhiro Hirabayashi, Tokyo (JP); Teruhiko Suzuki, Kanagawa (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/467,618

(22) PCT Filed: Dec. 15, 2017

(86) PCT No.: PCT/JP2017/045043
§ 371 (c)(1),
(2) Date: Jun. 7, 2019

(87) PCT Pub. No.: WO2018/123645
PCT Pub. Date: Jul. 5, 2018

(65) Prior Publication Data
US 2020/0077070 A1 Mar. 5, 2020

(30) Foreign Application Priority Data

Dec. 28, 2016 (JP) .............................. JP2016-255630
Jul. 5, 2017 (JP) .............................. JP2017-132057

(51) Int. Cl.
*H04N 13/361* (2018.01)
*H04N 13/359* (2018.01)
(Continued)

(52) U.S. Cl.
CPC ......... *H04N 13/111* (2018.05); *H04N 13/122* (2018.05); *H04N 13/349* (2018.05); *H04N 13/359* (2018.05); *H04N 13/361* (2018.05)

(58) Field of Classification Search
CPC ... H04N 13/361; H04N 13/359; H04N 21/845
See application file for complete search history.

(56) References Cited

U.S. PATENT DOCUMENTS 9,578,298 B2 * 2/2017 Ballocca .............. H04N 21/235
2008/0303893 A1 * 12/2008 Kim ..................... H04N 19/597
348/42
(Continued)

FOREIGN PATENT DOCUMENTS

CN 104160698 A 11/2014

OTHER PUBLICATIONS

Hannuksela, "ISOBMFF Framework for Indicating Projection Format, Projection Orientation, Stereoscopic Packing, and Region-Wise Packing"; ISO/IEC JTC1/SC29/WG11 MPEG2017/M39757, Jan. 2017. (Year: 2017).*

(Continued)

*Primary Examiner* — Jamie J Atala
*Assistant Examiner* — Michael Robert Cammarata
(74) *Attorney, Agent, or Firm* — Paratus Law Group, PLLC

(57) ABSTRACT

There is provided a generation device, an identification information generation method, a reproduction device, and an image reproduction method capable of identifying a packing scheme. Stereo packing identification information for identifying a scheme of packing is generated with regard to a plurality of region images of a celestial sphere image packed in a packed frame. In a case in which packing is performed by one of a plurality of packing schemes, stereo packing identification information indicating a packing (Continued)

method can be generated, a projected frame can be generated easily on the basis of the identification information, and the projected frame can be rendered. The present technology can be applied to a case in which a celestial sphere stereoscopic image is transmitted to be reproduced on a reception side.

5 Claims, 75 Drawing Sheets

(51) Int. Cl.
  *H04N 21/845* (2011.01)
  *H04N 13/111* (2018.01)
  *H04N 13/122* (2018.01)
  *H04N 13/349* (2018.01)

(56) References Cited

U.S. PATENT DOCUMENTS

| | | | | |
|---|---|---|---|---|
| 2011/0234753 A1* | 9/2011 | Caramelli | ............ | H04N 19/597 348/43 |
| 2011/0316990 A1* | 12/2011 | Saito | ............ | H04N 13/158 348/51 |
| 2012/0105583 A1* | 5/2012 | Suh | ............ | H04N 19/597 348/43 |
| 2012/0288208 A1* | 11/2012 | Katsumata | ............ | G11B 27/309 382/232 |
| 2012/0288257 A1* | 11/2012 | Katsumata | ............ | H04N 9/8227 386/248 |
| 2013/0083160 A1* | 4/2013 | Ballocca | ............ | H04N 21/235 348/42 |
| 2017/0237965 A1* | 8/2017 | Wang | ............ | H04N 21/85406 348/42 |
| 2019/0020880 A1* | 1/2019 | Wang | ............ | H04N 19/583 |
| 2019/0141311 A1* | 5/2019 | Lee | ............ | H04N 21/816 |
| 2019/0200023 A1* | 6/2019 | Hanhart | ............ | H04N 19/167 |
| 2019/0347760 A1* | 11/2019 | Takahashi | ............ | H04N 21/8456 |
| 2019/0356898 A1* | 11/2019 | Choi | ............ | H04N 13/139 |
| 2020/0068269 A1* | 2/2020 | Deshpande | ............ | H04N 19/597 |
| 2020/0260063 A1* | 8/2020 | Hannuksela | ............ | H04N 13/243 |
| 2020/0288171 A1* | 9/2020 | Hannuksela | ............ | H04N 19/124 |

OTHER PUBLICATIONS

Choi, "WD on ISO/IEC 23000-20 Omnidirectional Media Application Format", ISO/IEC JTC1/SC29/WG11 N16439, Coding of Moving Pictures and Audio, Oct. 2016, 55 pages. (Year: 2016).*

Nov. 11, 2019, European Search Report issued for related EP Application No. 17888720.4.

Technologies under Consideration for Omnidirectional Media Application Format, International Organisation for Standardisation ISO/IEC JTC1/SC29/WG11, Feb. 2016, pp. 1-16, San Diego, CA.

Fogg, Essential metadata to support virtual reality in AVC and HEVC elementary video streams, Joint Collaborative Team on Video Coding (JCT-VC) of ITU-T SG 16 WP 3 and ISO/IEC JTC 1/SC 29/WG 11, Oct. 14-21, 2016, pp. 1-8, 25th Meeting: Chengdu, CN.

Choi et al., WD on ISO/IEC 23000-20 Omnidirectional Media Application Format, International Organisation for Standardisation ISO/IEC JTC1/SC29/WG11, Jun. 2016, pp. 1-42, Geneva, Switzerland.

Hannuksela et al., OMAF: specification text examples for clauses 5 to 8, International Organisation for Standardisation ISO/IEC JTC1/SC29/WG11, Oct. 2016, pp. 1-4, Chengdu, China.

Hannuksela et al., DASH / OMAF: Virtual reality video descriptor, International Organisation for Standardisation ISO/IEC JTC1/SC29/WG11, May/Jun. 2016, pp. 1-5, Geneva, CH.

* cited by examiner

FIG. 5

| VALUE | DESCRIPTION |
|---|---|
| 0 | CHECKERBOARD |
| 1 | COLUMN BASE INTERLEAVING |
| 2 | ROW BASE INTERLEAVING |
| 3 | side by side |
| 4 | top & bottom |
| 5 | FRAME SEQUENTIAL |
| 6 | NO FRAME PACKING (2D) |
| 7 | TILE BASE PACKING |

FIG. 6

A (51):
| left_L | left_R | top_L | top_R |
|---|---|---|---|
| back_L | back_R | front_L | front_R |
| right_L | right_R | bottom_L | bottom_R |

B (52):
| left_L | left_R | right_L | right_R | top_L | top_R |
|---|---|---|---|---|---|
| front_L | front_R | back_L | back_R | bottom_L | bottom_R |

C (53):
| left_L | front_L | right_L | back_L |
|---|---|---|---|
| left_R | front_R | right_R | back_R |
| top_L | top_R | bottom_L | bottom_R |

FIG. 7

| 61 | | | |
|---|---|---|---|
| top_R | top_L | front_R | right_R |
| left_L | front_L | right_L | back_L |
| bottom_R | bottom_L | back_R | left_R |

A

| 62 | | | |
|---|---|---|---|
| top_L | right_R | back_R | left_R |
| front_L | right_L | back_L | left_L |
| bottom_L | top_R | front_R | bottom_R |

B

| 63 | | | |
|---|---|---|---|
| top_L | right_R | back_R | left_R |
| front_L | right_L | back_L | left_L |
| bottom_L | top_R | front_R | bottom_R |

```
aligned(8) class RegionMappigBox extends FullBox('rmap', version=0,0)
    unsigned int(8) projection_format;
    unsigned int(1) packing_flag;
    unsigned int(1) FOV_flag;
    unsigned int(2) stereo_packing_type;
    bit(12) reserved=0;
    unsigned int(8) num_regions;

for(i=0; i<num_regions; i++){
        signed int(16) center_yaw[i];
        signed int(16) center_pitch[i];
        unsigned int(16) object_width[i];
        unsigned int(16) object_height[i];
        if(packing_flag){
            unsigned int(32) rect_width[i];
            unsigned int(32) rect_height[i];
            unsigned int(32) rect_left[i];
            unsigned int(32) rect_top[i];
            if(stereo_packing_type==2){
                unsigned int(32) rect_width_r[i];
                unsigned int(32) rect_height_r[i];
                unsigned int(32) rect_left_r[i];
                unsigned int(32) rect_top_r[i];
            }
        }
    }
}
```

FIG. 9

| | |
|---|---|
| projection_format | PROJECTION TYPE.<br>0: EQUIRECTANGULAR PROJECTION<br>1: CUBE MAPPING PROJECTION |
| packing_flag | WHETHER OR NOT region-wise packing IS USED.<br>0: region-wise packing IS NOT USED<br>1: region-wise packing IS USED |
| FOV_flag | INDICATE STANDARD OF ANGLE INFORMATION OF object_width, object_height.<br>0: SURFACE OF SPHERE<br>1: SURFACE OF PERSPECTIVE PROJECTION |
| stereo_packing_type | STEREO PACKING TYPE.<br>0: CONFORM TO stereo_indication_type OF stvi.<br>   CASE IN WHICH THERE IS NO stvi MEANS MONO.<br>   IN CASE IN WHICH THERE IS stvi, PACKING FOR EACH FRAME IN WHICH side by side, top & bottom, OR LIKE IS USED<br>1: PACKING OF L view AND R view FOR EACH REGION IN FRAME OF CELESTIAL SPHERE STEREO IMAGE<br>2: PACKING IN ACCORDANCE WITH ARBITRARY DISPOSITION OF L view AND R view OF REGIONS IN FRAME OF CELESTIAL SPHERE STEREO IMAGE |
| num_regions | NUMBER OF REGIONS OF packed frame |
| center_yaw | yaw OF REGION CENTER IN projection structure |
| center_pitch | pitch OF REGION CENTER IN projection structure |
| object_width | REGION HEIGHT (ANGLE) IN projection structure |
| object_height | REGION HEIGHT (ANGLE) IN projection structure |
| rect_width | REGION WIDTH IN packed frame |
| rect_height | REGION HEIGHT IN packed frame |
| rect_left | x COORDINATE OF REGION IN packed frame |
| rect_top | y COORDINATE OF REGION IN packed frame |
| rect_width_r | WIDTH OF REGION (R view) IN packed frame |
| rect_height_r | HEIGHT OF REGION (R view) IN packed frame |
| rect_left_r | x COORDINATE OF REGION (R view) IN packed frame |
| rect_top_r | y COORDINATE OF REGION (R view) IN packed frame |

FIG. 15

| projection_format | 1 |
|---|---|
| packing_flag | 0 |
| stereo_packing_type | 0 |
| num_regions | 6 |
| FOV_flag | 1 |
| center_yaw,center_pitch,object_width,object_height | -90,0,90,90(right face) |

FIG. 17

| projection_format | 1 |
| --- | --- |
| packing_flag | 1 |
| stereo_packing_type | 1 |
| num_regions | 6 |
| FOV_flag | 1 |
| center_yaw, center_pitch, object_width, object_height | -90,0,90,90(right face) |
| rect_left, rect_top, rect_width, rect_height | 0,960,960,480 (REGION 411 OF right face) |

FIG. 20

| | |
|---|---|
| projection_format | 0 |
| packing_flag | 1 |
| stereo_packing_type | 1 |
| num_regions | 4 |
| FOV_flag | 0 |
| center_yaw, center_pitch, object_width, object_height | 180, 0, 180, 135 (region C, A) |
| rect_left, rect_top, rect_width, rect_height | 1280, 160, 640, 1280 (C_L, A_L, C_R, A_R) |

FIG. 21

```
aligned(8) class RegionMappigBox extends FullBox('rmap', version=0,0)
{
    unsigned int(8) projection_format;
    unsigned int(1) packing_flag;
    unsigned int(1) FOV_flag;
    unsigned int(2) stereo_packing_type;
    bit(12) reserved=0;
    if(stereo_packing_type==1){
        unsigned int(8) stereo_indication;
    }
    unsigned int(8) num_regions;
    for(i=0; i<num_regions; i++){
        signed int(16) center_yaw[i];
        signed int(16) center_pitch[i];
        unsigned int(16) object_width[i];
        unsigned int(16) object_height[i];
        if(packing_flag){
            if(stereo_packing_type==2){
                unsigned int(8) stereo_indication[i];
            }
            unsigned int(32) rect_width[i];
            unsigned int(32) rect_height[i];
            unsigned int(32) rect_top[i];
            unsigned int(32) rect_left[i];
            if(stereo_packing_type==3){
                unsigned int(32) rect_width_r[i];
                unsigned int(32) rect_height_r[i];
                unsigned int(32) rect_left_r[i];
                unsigned int(32) rect_top_r[i];
            }
        }
    }
}
```

FIG. 22

| stereo_packing_type | STEREO PACKING TYPE.<br>0: MONO<br>1: PACKING FOR EACH FRAME OF CELESTIAL SPHERE STEREO IMAGE<br>2: PACKING OF L view AND R view FOR EACH REGION IN FRAME OF CELESTIAL SPHERE STEREO IMAGE<br>3: PACKING OF L view AND R view BY ARBITRARY DISPOSITION OF REGION IN FRAME |
|---|---|
| stereo_indication | INDICATE PACKING ARRANGEMENT OF REGION OF packed frame.<br>3: side by side<br>4: top and bottom<br>others: reserved |

FIG. 24

| | |
|---|---|
| projection_format | 1 |
| packing_flag | 1 |
| stereo_packing_type | 2 |
| num_regions | 6 |
| FOV_flag | 1 |
| center_yaw, center_pitch, object_width, object_height | 90, 0, 90, 90(left face) |
| stereo_indication | 4(top & bottom) |
| rect_left, rect_top, rect_width, rect_height | 0, 0, 480, 960(left face pair region) |
| center_yaw, center_pitch, object_width, object_height | -90, 0, 90, 90(right face) |
| stereo_indication | 3(side by side) |
| rect_left, rect_top, rect_width, rect_height | 0, 960, 960, 480(right face pair region) |

FIG. 26

| projection_format | 1 |
|---|---|
| packing_flag | 1 |
| stereo_packing_type | 2 |
| num_regions | 6 |
| FOV_flag | 1 |
| center_yaw, center_pitch, object_width, object_height | -90, 0, 90, 90 (right face) |
| rect_left, rect_top, rect_width, rect_height | 960, 480, 480, 480 (L view OF right face) |
| rect_left_r, rect_top_r, rect_width_r, rect_height_r | 1440, 0, 480, 480 (R view OF right face) |

FIG. 27

```
aligned(8) class RegionMappigBox extends FullBox('rmap', version=0, 0)
    unsigned int(8) projection_format;
    unsigned int(1) packing_flag;
    unsigned int(1) FOV_flag;
    unsigned int(2) stereo_packing_type;
    bit(14) reserved=0;
    unsigned int(8) num_regions;

for(i=0; i<num_regions; i++) {
        signed int(16) center_yaw[i];
        signed int(16) center_pitch[i];
        unsigned int(16) object_width[i];
        unsigned int(16) object_height[i];
        if(packing_flag) {
            unsigned int(32) rect_width[i];
            unsigned int(32) rect_height[i];
            unsigned int(32) rect_left[i];
            unsigned int(32) rect_top[i];
            if(stereo_packing_type==2) {
                unsigned int(1) mono_region[i];
                reserved=0;
                bit(7)
                if(!mono_region[i]){
                    unsigned int(32) rect_width_r[i];
                    unsigned int(32) rect_height_r[i];
                    unsigned int(32) rect_left_r[i];
                    unsigned int(32) rect_top_r[i];
                }
            }
        }
    }
}
```

FIG. 28

| mono_region | INDICATE WHETHER REGION OF packed frame IS MONO OR STEREO.<br>0: STEREO<br>1: MONO |
|---|---|

FIG. 29

```
aligned(8) class RegionMappigBox extends FullBox('rmap', version=0, 0)

unsigned int(8) projection_format;
    unsigned int(1) packing_flag;
    unsigned int(1) FOV_flag;
    unsigned int(2) stereo_packing_type;
    bit(12) reserved=0;
    unsigned int(8) num_regions;

for(i=0; i<num_regions; i++){
        signed int(16) center_yaw[i];
        signed int(16) center_pitch[i];
        unsigned int(16) object_width[i];
        unsigned int(16) object_height[i];
        if(packing_flag){
            unsigned int(32) rect_width[i];
            unsigned int(32) rect_height[i];
            unsigned int(32) rect_top[i];
            unsigned int(32) rect_left[i];
            if(stereo_packing_type==2){
                unsigned int(8) num_additional_view;
                for(j=0; j<num_additional_view; j++){
                    unsigned int(32) rect_width_av[i][j];
                    unsigned int(32) rect_height_av[i][j];
                    unsigned int(32) rect_left_av[i][j];
                    unsigned int(32) rect_top_av[i][j];
```

FIG. 30

| | |
|---|---|
| stereo_packing_type | STEREO PACKING TYPE.<br>0: PACKING FOR EACH FRAME USING side by side, top & bottom, OR LIKE<br>1: PACKING OF L view/R view FOR EACH DISPLAY REGION IN FRAME OF CELESTIAL SPHERE STEREO IMAGE<br>2: PACKING BY ARBITRARY DISPOSITION OF PLURALITY OF views OF DISPLAY REGION IN FRAME OF CELESTIAL SPHERE STEREO IMAGE |
| num_additional_view | INDICATE NUMBER OF views FOR EACH REGION.<br>TOTAL NUMBER OF views IS num_additional_view + 1 |
| rect_width_av | REGION WIDTH OF ADDITIONAL view IN packed frame |
| rect_height_av | REGION HEIGHT OF ADDITIONAL view IN packed frame |
| rect_left_av | x COORDINATE OF REGION OF ADDITIONAL view IN packed frame |
| rect_top_av | y COORDINATE OF REGION OF ADDITIONAL view IN packed frame |

FIG. 31

```
aligned(8) class RegionMappigBox extends FullBox('rmap', version=0, 0)
{
    unsigned int(8) projection_format;
    unsigned int(1) packing_flag;
    unsigned int(2) stereo_packing_type;
    bit(12) reserved=0;
    unsigned int(8) num_regions;

for(i=0; i<num_regions; i++){
        unsigned int(32) pf_regions_width[i];
        unsigned int(32) pf_regions_height[i];
        unsigned int(32) pf_regions_left[i];
        unsigned int(32) pf_regions_top[i];
        if(packing_flag){
            unsigned int(32) rect_width[i];
            unsigned int(32) rect_height[i];
            unsigned int(32) rect_left[i];
            unsigned int(32) rect_top[i];
            if(stereo_packing_type==2){
                unsigned int(32) rect_width_r[i];
                unsigned int(32) rect_height_r[i];
                unsigned int(32) rect_left_r[i];
                unsigned int(32) rect_top_r[i];
            }
        }
    }
}
```

FIG. 32

| pf_region_width | REGION WIDTH IN projected frame |
| --- | --- |
| pf_region_height | REGION HEIGHT IN projected frame |
| pf_region_left | x COORDINATE OF REGION IN projected frame |
| pf_region_top | y COORDINATE OF REGION IN projected frame |

FIG. 35

```
aligned(8) class VRInformationBox extends FullBox('vrif', version=0, 0)
{
    unsigned int(8) projection_format;
    unsigned int(2) stereo_packing_type;
    unsigned int(1) coordinate_system;
    bit(4) reserved=0;
}
```

FIG. 36

| projection_format | PROJECTION TYPE.<br>0: EQUIRECTANGULAR PROJECTION<br>1: CUBE MAPPING PROJECTION |
|---|---|
| stereo_packing_type | STEREO PACKING TYPE.<br>0: CONFORM TO stereo_indication_type OF stvi.<br>   CASE IN WHICH THERE IS NO stvi MEANS MONO.<br>   IN CASE IN WHICH THERE IS stvi, PACKING FOR<br>   EACH FRAME IN WHICH side by side, top & bottom,<br>   OR LIKE IS USED<br>1: PACKING OF L view/R view FOR EACH DISPLAY<br>   REGION IN FRAME OF CELESTIAL SPHERE<br>   STEREO IMAGE<br>2: PACKING BY ARBITRARY DISPOSITION OF L view<br>   AND R view OF DISPLAY REGIONS IN FRAME OF<br>   CELESTIAL SPHERE STEREO IMAGE |
| coordinate_system | COORDINATE SYSTEM OF REGION EXPRESSION OF<br>projection structure/projected frame.<br>0: 2-DIMENSIONAL COORDINATE SYSTEM<br>1: SPHERICAL COORDINATE SYSTEM |

FIG. 37

```
<MPD>
<Period>
<AdaptationSet mimeType="video/mp4" width="video/1280" height="960" >
<EssentialProperty schemeIdUri="urn:mpeg:dash:vr:ProjectionType" value="cube" />
<EssentialProperty schemeIdUri="urn:mpeg:mpegB:cicp:VideoFramePackingType" value="3" />
<Representation id="cube_video_0" bandwidth="1024000" >
<BaseURL>cube_0.mp4</BaseURL>
</Representation>
</AdaptationSet>
<AdaptationSet mimeType="video/mp4" width="video/1280" height="960" >
<EssentialProperty schemeIdUri="urn:mpeg:dash:vr:ProjectionType" value="cube" />
<EssentialProperty schemeIdUri="urn:mpeg:mpegB:cicp:VideoFramePackingType" value="3" />
<EssentialProperty schemeIdUri="urn:mpeg:dash:vr:StereoPackingType" value="1" />
<Representation id="cube_video_1" bandwidth="819200" >
<BaseURL>cube_1.mp4</BaseURL>
</Representation>
</AdaptationSet>
</Period>
</MPD>
```

FIG. 38 region-wise packing

| | top_L | | | | |
|---|---|---|---|---|---|
| | | left front right back | | | |
| | | _L _L _L _L | | | |
| | | left front right back | | | |
| | | _R _R _R _R | | | |
| | top_R | left front right back | | bottom_R | |
| | | _R _R _R _R | | | |
| | | | | | |
| | | | bottom_L | | |

↑

| left_L | left_R | top_L | top_R | front_L | front_R |
|---|---|---|---|---|---|
| back_L | back_R | | | right_L | right_R |
| | | | | bottom_L | bottom_R |

FIG. 46

```
aligned(8) class RegionWisePackingBox extends FullBox('rwpk', 0, 0) {
    RegionWisePackingStruct();
}
```

FIG. 47

```
aligned(8) class RegionWisePackingStruct {
    unsigned int(8) num_regions;
    unsigned int(16) proj_picture_width;
    unsigned int(16) proj_picture_height;
    for (i = 0; i < num_regions; i++) {
        bit(4) reserved = 0;
        unsigned int(4) packing_type[i];
        if (packing_type[i] == 0)
            RectRegionPacking(i);
    }
}
```

FIG. 48

```
aligned(8) class RectRegionPacking(i) {
            unsigned int(16) proj_reg_width[i];
            unsigned int(16) proj_reg_height[i];
            unsigned int(16) proj_reg_top[i];
            unsigned int(16) proj_reg_left[i];
            unsigned int(16) packed_reg_width[i];
            unsigned int(16) packed_reg_height[i];
            unsigned int(16) packed_reg_top[i];
            unsigned int(16) packed_reg_left[i];
}
```

FIG. 49

| num_regions | NUMBER OF REGIONS. |
|---|---|
| proj_picture_width | WIDTH OF PROJECTED PICTURE. |
| proj_picture_height | HEIGHT OF PROJECTED PICTURE. |
| packing_type[i] | KIND OF region-wise packing OF i-TH REGION. 0 INDICATES PACKING OF RECTANGULAR REGION. OTHER VALUES ARE reserved. |
| proj_reg_width[i] | WIDTH OF i-TH REGION OF PROJECTED PICTURE. |
| proj_reg_height[i] | HEIGHT OF i-TH REGION OF PROJECTED PICTURE. |
| proj_reg_top[i] | POSITION OF TOP LEFT PIXEL OF i-TH REGION OF PROJECTED PICTURE IN VERTICAL DIRECTION. |
| proj_reg_left[i] | POSITION OF TOP LEFT PIXEL OF i-TH REGION OF PROJECTED PICTURE IN HORIZONTAL DIRECTION. |
| packed_reg_width[i] | WIDTH OF i-TH REGION OF PACKED PICTURE. |
| packed_reg_height[i] | HEIGHT OF i-TH REGION OF PACKED PICTURE. |
| packed_reg_top[i] | POSITION OF TOP LEFT PIXEL OF i-TH REGION OF PACKED PICTURE IN VERTICAL DIRECTION. |
| packed_reg_left[i] | POSITION OF TOP LEFT PIXEL OF i-TH REGION OF PACKED PICTURE IN HORIZONTAL DIRECTION. |

FIG. 52

```
aligned(8) class RegionWisePackingStruct {
    unsigned int(8) num_regions;
    unsigned int(16) proj_picture_width;
    unsigned int(16) proj_picture_height;
    bit(7) reserved=0;
    unsigned int(1) region_wise_stereo_packing_flag;
    for (i = 0; i < num_regions; i++) {
        bit(4) reserved = 0;
        unsigned int(4) packing_type[i];
        if (packing_type[i] == 0)
            RectRegionPacking(i);
    }
}
```

FIG. 53

| region_wise_ stereo_packing_flag |
|---|
| 0: INDICATE THAT PROJECTED PICTURE IS MONO OR region(s) OF L view AND R view OF WHICH DISPLAY REGIONS MATCH DO NOT FORM ARBITRARY CONTINUOUS RECTANGULAR REGIONS.<br>1: INDICATE THAT region(s) OF L view AND R view OF WHICH DISPLAY REGIONS MATCH FORM ARBITRARY CONTINUOUS RECTANGULAR REGIONS. |

```
aligned(8) class SubPictureCompositionBox extends TrackGroupTypeBox('spco') {
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

FIG. 58 track_x: POSITION OF TOP LEFT PIXEL OF sub-picture STORED IN THIS track IN HORIZONTAL DIRECTION IN ENTIRE PICTURE
track_y: POSITION OF TOP LEFT PIXEL OF sub-picture STORED IN THIS track IN VERTICAL DIRECTION IN ENTIRE PICTURE
track_width: WIDTH OF sub-picture STORED IN THIS track IN ENTIRE PICTURE
track_height: HEIGHT OF sub-picture STORED IN THIS track IN ENTIRE PICTURE
composition_width: WIDTH OF ENTIRE PICTURE
composition_height: HEIGHT OF ENTIRE PICTURE

FIG. 59

```
aligned(8) class TrackStereoVideoBox extends FullBox('tstv', version = 0, 0)
{
    unsigned int(2) view_idc;
}
```

FIG. 60

| view_idc | |
|---|---|
| | 0: reserved |
| | 1: ONLY left views ARE STORED IN tracks AND MONO DISPLAY IS POSSIBLE |
| | 2: ONLY right views are STORED IN tracks AND MONO DISPLAY IS POSSIBLE |
| | 3: STEREOSCOPIC DISPLAY IS POSSIBLE IN tracks |

FIG. 61

```
aligned(8) class TrackStereoVideoBox extends FullBox('tstv', version = 0, 0)
{
    unsigned int(2) view_idc;
    if(view_idc==3) {
        unsigned int(2) single_view_allowed;
        bit(4) reserved=0;
        unsigned int(32) stereo_scheme;
        unsigned int(32) length;
        unsigned int(8)[length] stereo_indication_type;
    }
    else
        bit(6) reserved=0;
}
```

FIG. 62

| view_idc | 0: reserved<br>1: ONLY left views ARE STORED IN tracks AND MONO DISPLAY IS POSSIBLE<br>2: ONLY right views are STORED IN tracks AND MONO DISPLAY IS POSSIBLE<br>3: STEREO DISPLAY IS POSSIBLE IN tracks |
|---|---|
| single_view_allowed | 0: CONTENT IS INTENDED TO BE DISPLAYED ONLY ON DISPLAY SUPPORTING STEREOSCOPIC IMAGE<br>(single_view_allowed&1) =1: DISPLAY OF right views OF CONTENT IS ALLOWED AS MONOSCOPIC DISPLAY<br>(single_view_allowed&2) =2: DISPLAY OF left views OF CONTENT IS ALLOWED AS MONOSCOPIC DISPLAY |
| stereo_scheme | 1: FRAME PACKING METHOD CONFORMS TO Frame packing arrangement SEI OF ISO/IEC 14496-10<br>2: FRAME PACKING METHOD CONFORMS TO Annex. L OF ISO/IEC 13818-2<br>3: FRAME PACKING METHOD CONFORMS TO 2D/3D Mixed service AND frame/service compatible OF ISO/IEC 23000-11 |
| length | BYTE LENGTH OF stereo_indication_type |
| stereo_indication_type | FRAME PACKING METHOD CONFORMING TO stereo_scheme |

FIG. 63

```
aligned(8) class StereoVideoBox extends FullBox('stvi', version = 0, 0)
{
    template unsigned int(30) reserved = 0;
    unsigned int(2) single_view_allowed;
    unsigned int(32) stereo_scheme;
    unsigned int(32) length;
    unsigned int(8)[length] stereo_indication_type;
    Box[] any_box; // optional
}
```

FIG. 64

```
aligned(8) class StereoVideoBox extends FullBox("stvi", version = 0, 0)
{
    template unsigned int(30) reserved = 0;
    unsigned int(2) single_view_allowed;
    unsigned int(32) stereo_scheme;
    unsigned int(32) length;
    unsigned int(8)[length] stereo_indication_type;
    TrackStereoVideoBox track_stereo_info;
}
```

FIG. 66

```
aligned(8) class SubPictureCompositionBox extends TrackGroupTypeBox( 'spco' ) {
    unsigned int(1) view_idc_presence_flag;
    bit(7) reserved=0;
    if(view_idc_presence_flag==1) {
        unsigned int(2) view_idc;
        bit(6) reserved=0;
    }
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

FIG. 67

| view_idc_presence_flag | 0: THERE IS NO view_idc<br>1: THERE IS view_idc |
|---|---|
| view_idc | 0: reserved<br>1: ONLY left views ARE STORED IN tracks AND MONO DISPLAY IS POSSIBLE<br>2: ONLY right views ARE STORED IN tracks AND MONO DISPLAY IS POSSIBLE<br>3: STEREO DISPLAY IS POSSIBLE IN tracks<br>4: unknown |

FIG. 68

```
aligned(8) class SubPictureCompositionBox extends TrackGroupTypeBox( 'spco' ) {
    unsigned int(1) stereo_info_presence_flag;
    bit(7) reserved=0;
    if(stereo_info_presence_flag==1){
        unsigned int(2) view_idc;
        bit(6) reserved=0;
        if(view_idc==3){
            unsigned int(2) single_view_allowed;
            bit(6) reserved=0;
            unsigned int(32) stereo_scheme;
            unsigned int(32) length;
            unsigned int(8)[length] stereo_indication_type;
        }
    }
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

FIG. 69

| stereo_info_presence_flag | 0: THERE IS NO STEREO-RELATED INFORMATION<br>1: THERE IS STEREO-RELATED INFORMATION |
|---|---|
| view_idc | 0: reserved<br>1: ONLY left views ARE STORED IN tracks AND MONO DISPLAY IS POSSIBLE<br>2: ONLY right views are STORED IN tracks AND MONO DISPLAY IS POSSIBLE<br>3: STEREO DISPLAY IS POSSIBLE IN tracks<br>4: unknown |

GENERATION DEVICE, IDENTIFICATION INFORMATION GENERATION METHOD, REPRODUCTION DEVICE, AND IMAGE REPRODUCTION RELATED TO STEREO PACKING OF PROJECTED FRAMES

CROSS REFERENCE TO PRIOR APPLICATION

This application is a National Stage Patent Application of PCT International Patent Application No. PCT/JP2017/045043 (filed on Dec. 15, 2017) under 35 U.S.C. § 371, which claims priority to Japanese Patent Application Nos. 2016-255630 (filed on Dec. 28, 2016) and 2017-132057 (filed on Jul. 5, 2017), which are all hereby incorporated by reference in their entirety.

TECHNICAL FIELD

The present technology relates to a generation device, an identification information generation method, a reproduction device, and an image reproduction method, and particularly, to a generation device, an identification information generation method, a reproduction device, and an image reproduction method capable of identifying a packing scheme.

BACKGROUND ART

There are recording devices that generate celestial sphere images in which images of 360 degrees in the horizontal direction and 180 degrees in the vertical direction are mapped to 2D images (planar images) from photographed images photographed by multiple cameras and encode and record the celestial sphere images (for example, see Patent Literature 1).

In such recording media, a method using equirectangular projection, a cube mapping method, or the like is used as a method of generating a celestial sphere image. In a case in which a method of generating a celestial sphere image is a method using equirectangular projection, the celestial sphere image is an image in accordance with equirectangular projection of a sphere when a captured image is mapped to the surface of the sphere. In addition, in a case in which a method of generating a celestial sphere image is a cube mapping method, the celestial sphere image is an image of development of a cube when a photographed image is mapped to the surface of the cube.

On the other hand, as a streaming type of moving image content, there is Moving Picture Experts Group phase-Dynamic Adaptive Streaming over HTTP (MPEG-DASH). In MPEG-DASH, a management file for managing an encoded stream of moving image content is transmitted from a delivery server to a terminal device and the terminal device selects an encoded stream which is a reproduction target on the basis of the management file and requests the encoded stream from the delivery server.

In a case in which a celestial sphere image is applied to a virtual reality (VR) image, a stereoscopic image is necessary.

CITATION LIST

Patent Literature

Patent Literature 1: JP 2006-14174A

DISCLOSURE OF INVENTION

Technical Problem

In ISO base media file format (ISOBMFF), a stereo_indication_type field of stvi (Stereo VideoBox) is used and a packing scheme such as side by side or top & bottom used in a stereoscopic image can be transmitted to a reproduction device side.

However, packing schemes of the related art are insufficient for packing of celestial sphere images since stereoscopic images which are normal 2-dimensional images are targets. Accordingly, development of packing schemes appropriate for celestial sphere images is expected and the packing schemes are preferably identified on reproduction device sides.

The present technology is devised in view of such circumstances and enables a packing scheme to be identified.

Solution to Problem

An aspect of the present technology is a generation device including: a generation unit configured to generate stereo packing identification information for identifying a type of packing with regard to a plurality of region images of a celestial sphere image packed in a packed frame.

A packing unit configured to pack, in the packed frame, a first image and a second image for generating a celestial sphere stereoscopic image of a projected frame of a plurality of regions of the celestial sphere image can be further provided.

The first image and the second image can be a left-eye region image and a right-eye region image or a texture image and a depth image.

The stereo packing identification information can include information for identifying the type of packing in which the first image and the second image of the corresponding regions are disposed to configure the packed frame which is rectangular as a whole.

The stereo packing identification information can include information for identifying the type of packing in which the first image and the second image of the corresponding regions are packed to be adjacent in the packed frame.

The stereo packing identification information can include information for identifying the type of packing in which the first image and the second image of the corresponding regions are disposed at arbitrary positions in the rectangular packed frame.

The stereo packing identification information can include information for identifying the type of packing in which packing is performed so that a first frame which is rectangular as a whole is configured in an invalid region along with the first image of the corresponding region, a second frame which is rectangular as a whole is configured in an invalid region along with the second image of the corresponding region, and the first frame and the second frame are disposed at predetermined positions to configure the rectangular packed frame.

A projection structure of the celestial sphere image can be a sphere, and the first image and the second image of the regions adjacent to a left side of the region of a front face and the first image and the second image of the regions adjacent to a right side of the region of the front face can be collected in one large region.

The region can be represented by a yaw angle and a pitch angle of a center of the region of a spherical coordinate system, angles of a width and a height of the region, or a width and a height of the region in a 2-dimensional coordinate system and x and y coordinates of one angle of the region.

The stereo packing identification information can be described in a box below Scheme Information Box of ISOBMFF.

The generation unit can further generate packing identification information for identifying that, with regard to the first image and the second image, at least one of a position or a size is changed for the packing.

The first image can be described in a case in which the packing identification information is packing identification information for identifying that at least one of the position or the size is changed for the packing.

The generation unit can further generate identification information for identifying disposition of the region image, identification information for identifying whether the region image is stereoscopic or monoscopic, identification information for identifying a type of projection for the projection structure, or identification information for identifying a standard of an angle of a width and a height of the region of the projection structure.

The generation unit can further generate identification information for identifying the number of viewpoints for each region. In a case in which the stereo packing identification information is identification information for identifying the type of packing in which the first image and the second image of the corresponding regions are disposed at arbitrary positions of the rectangular packed frame, the region image of the number of viewpoints corresponding to the identification information for identifying the number of viewpoints for each region can be described.

The stereo packing identification information can be described in conformity with MPEG-DASH.

In a case in which tracks in which an image of the packed frame is divided and stored are configured, the packed frame can be packed in correspondence with the stereo packing identification information of the image stored in the tracks.

In a case in which tracks in which a pair of stereo images are stored are configured, the packed frame can be packed so that the first image and the second image of which display regions match form an arbitrary continuous rectangular region in the packed frame.

An aspect of the present technology is an identification information generation method including: a generation step of generating stereo packing identification information for identifying a type of packing with regard to a plurality of region images of a celestial sphere image packed in a packed frame by a generation device.

An aspect of the present technology is a reproduction device including: an acquisition unit configured to acquire identification information for identifying a type of packing of a plurality of region images of a celestial sphere image in a packed frame; a generation unit configured to generate a projected frame on the basis of the acquired identification information; and a rendering unit configured to render the projected frame.

An aspect of the present technology is an image reproduction method including: an acquisition step of acquiring identification information for identifying a type of packing of a plurality of region images of a celestial sphere image in a packed frame by a reproduction device; a generation step of generating a projected frame on the basis of the acquired identification information by the reproduction device; and a rendering step of rendering the projected frame by the reproduction device.

An aspect of the present technology is a generation device including: a packing unit configured to pack a first image and a second image for generating a celestial sphere stereoscopic image of a projected frame of a plurality of regions of a celestial sphere image in a packed frame; and a generation unit configured to generate stereo video information that includes information indicating whether the image stored in a track in which at least one of the first image or the second image of the packed frame is stored is a stereoscopic reproducible image, for each track.

According to an aspect of the present technology, the generation unit generates stereo packing identification information for identifying the foregoing packing type with regard to the plurality of region images of the celestial sphere image packed in the packed frame.

Advantageous Effects of Invention

As described above, according to one aspect of the present technology, it is possible to identify a packing scheme. Note that the effects described in the present specification are not limiting but are merely examples, and there may be other effects.

BRIEF DESCRIPTION OF DRAWINGS

FIG. 5 is an explanatory diagram illustrating stereo indication types.

FIG. 6 is a diagram illustrating an example of packing.

FIG. 7 is a diagram illustrating an example of packing.

FIG. 8 is a diagram illustrating a configuration example of a region mapping box.

FIG. 9 is an explanatory diagram illustrating fields of the region mapping box.

FIG. 15 is an explanatory diagram illustrating a field in the case in which the stereo packing type is 0.

FIG. 17 is an explanatory diagram illustrating a field in the case in which the stereo packing type is 1.

FIG. 20 is an explanatory diagram illustrating a field in a case in which packing is performed by projection of the equirectangular projection.

FIG. 21 is a diagram illustrating a configuration example of a region mapping box.

FIG. 22 is an explanatory diagram illustrating a field of the region mapping box.

FIG. 24 is an explanatory diagram illustrating a field in a case in which the packing arrangement is changed.

FIG. 26 is an explanatory diagram illustrating a field in the case in which the stereo packing type is 2.

FIG. 27 is a diagram illustrating a configuration example of the region mapping box.

FIG. 28 is an explanatory diagram illustrating a field of the region mapping box.

FIG. 29 is a diagram illustrating a configuration example of a region mapping box.

FIG. 30 is an explanatory diagram illustrating the fields of the region mapping box.

FIG. 31 is a diagram illustrating a configuration example of a region mapping box.

FIG. 32 is an explanatory diagram illustrating the fields of the region mapping box.

FIG. 35 is a diagram illustrating a configuration example of a VR information box.

FIG. 36 is an explanatory diagram illustrating a field of the VR information box.

FIG. 37 is a diagram illustrating an example of an MPD file to which DASH is applied.

FIG. 38 is an explanatory diagram illustrating a celestial sphere stereoscopic image stored on one track.

FIG. 46 is a diagram illustrating a configuration of RegionWisePackingBox.

FIG. 47 is a diagram illustrating a configuration of RegionWisePackingStruct.

FIG. 48 is a diagram illustrating a configuration of RectRegionPacking.

FIG. 49 is an explanatory diagram illustrating fields of RegionWisePackingStruct and RectRegionPacking.

FIG. 52 is a diagram illustrating a configuration of RegionWisePackingStruct.

FIG. 53 is an explanatory diagram illustrating a region-wise stereo packing flag.

FIG. 56 is an explanatory diagram illustrating a box in a case in which a celestial sphere stereoscopic image is stored in four tracks.

FIG. 57 is a diagram illustrating a configuration of a sub-picture composition box.

FIG. 58 is an explanatory diagram illustrating fields of the sub-picture composition box.

FIG. 59 is a diagram illustrating a configuration of a track stereo video box.

FIG. 60 is an explanatory diagram illustrating fields of the track stereo video box.

FIG. 61 is a diagram illustrating a configuration of a track stereo video box.

FIG. 62 is an explanatory diagram illustrating fields of the track stereo video box.

FIG. 63 is a diagram illustrating a configuration of a stereo video box.

FIG. 64 is a diagram illustrating a configuration of a stereo video box.

FIG. 66 is a diagram illustrating a configuration of a sub-picture composition box.

FIG. 67 is an explanatory diagram illustrating fields of the sub-picture composition box.

FIG. 68 is a diagram illustrating a configuration of a sub-picture composition box.

FIG. 69 is an explanatory diagram illustrating fields of the sub-picture composition box.

MODE(S) FOR CARRYING OUT THE INVENTION

Hereinafter, embodiments for carrying out the present technology will be described. Note that the description will be made in the following order.

Figure 33:
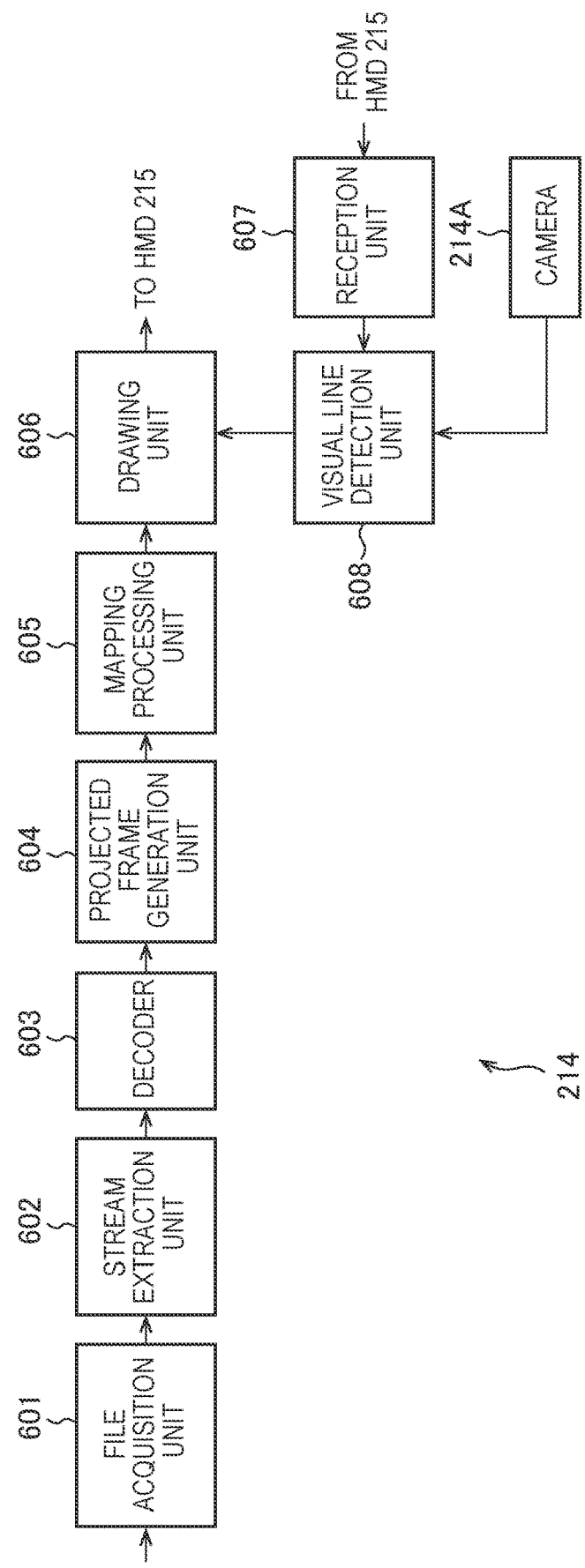
FIG. 33 is a block diagram illustrating a configuration example of a reproduction device.
Figure 34:
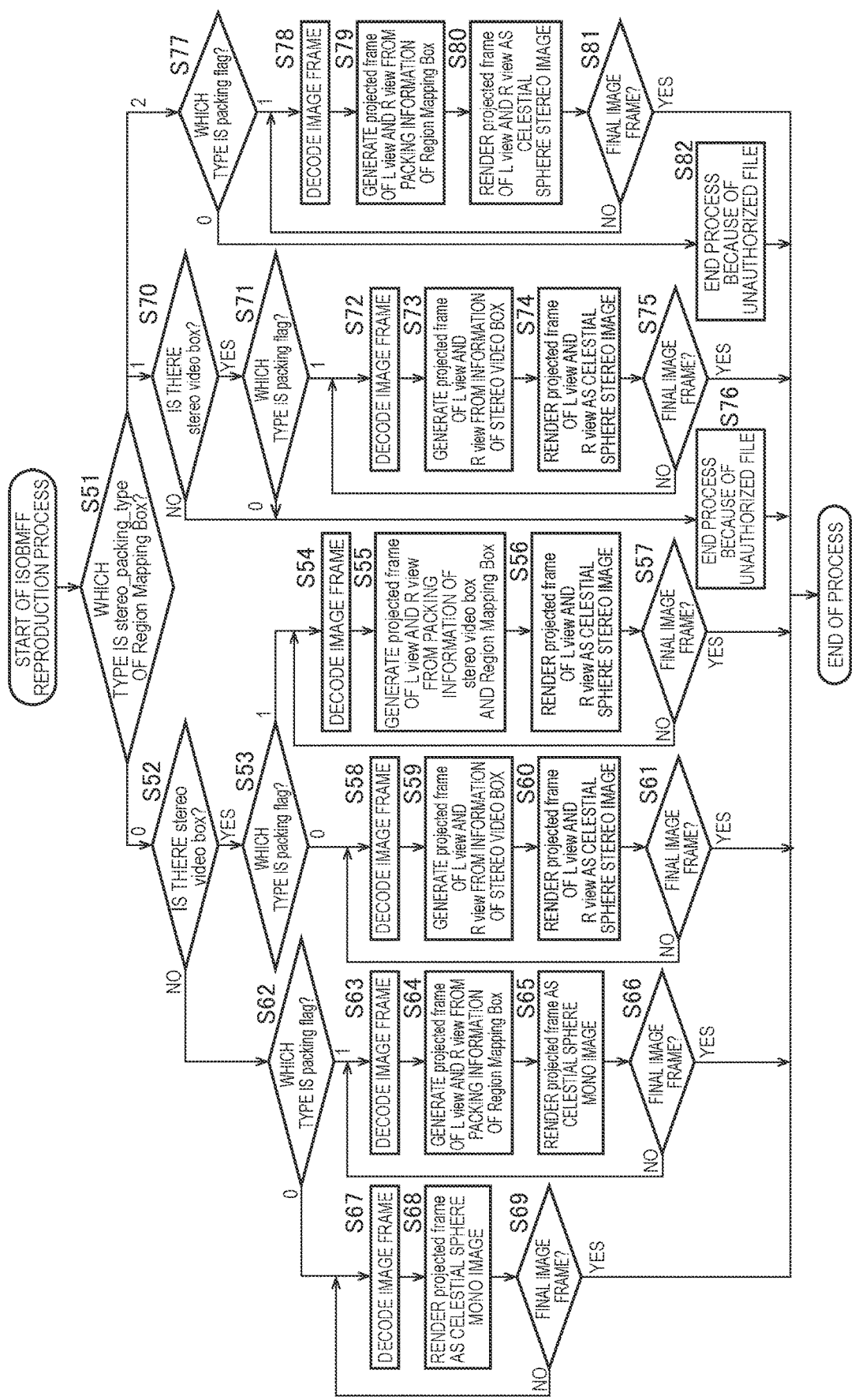
FIG. 34 is an explanatory flowchart illustrating a reproduction process.

1. Embodiment
(1) Principle of projection (FIG. 1)
(2) Packing (FIGS. 2 to 10)
(3) Delivery system (FIG. 11)
(4) Generation device (FIGS. 12 to 32)
(5) Reproduction device (FIGS. 33 and 34)

(6) Delivery of property information of celestial sphere stereoscopic image packing (FIGS. 35 to 37)
(7) Sub-picture tracking (FIGS. 38 to 74)
2. Computer (FIG. 75)
3. Others Embodiment <Principle of Projection (FIG. 1)>

In the present technology, a celestial sphere image is delivered as a video stream, for example, from a server to a client and is received, reproduced, and viewed on a client side. Accordingly, a principle of a process of generating and delivering a celestial sphere image will be described first.

Figure 1:
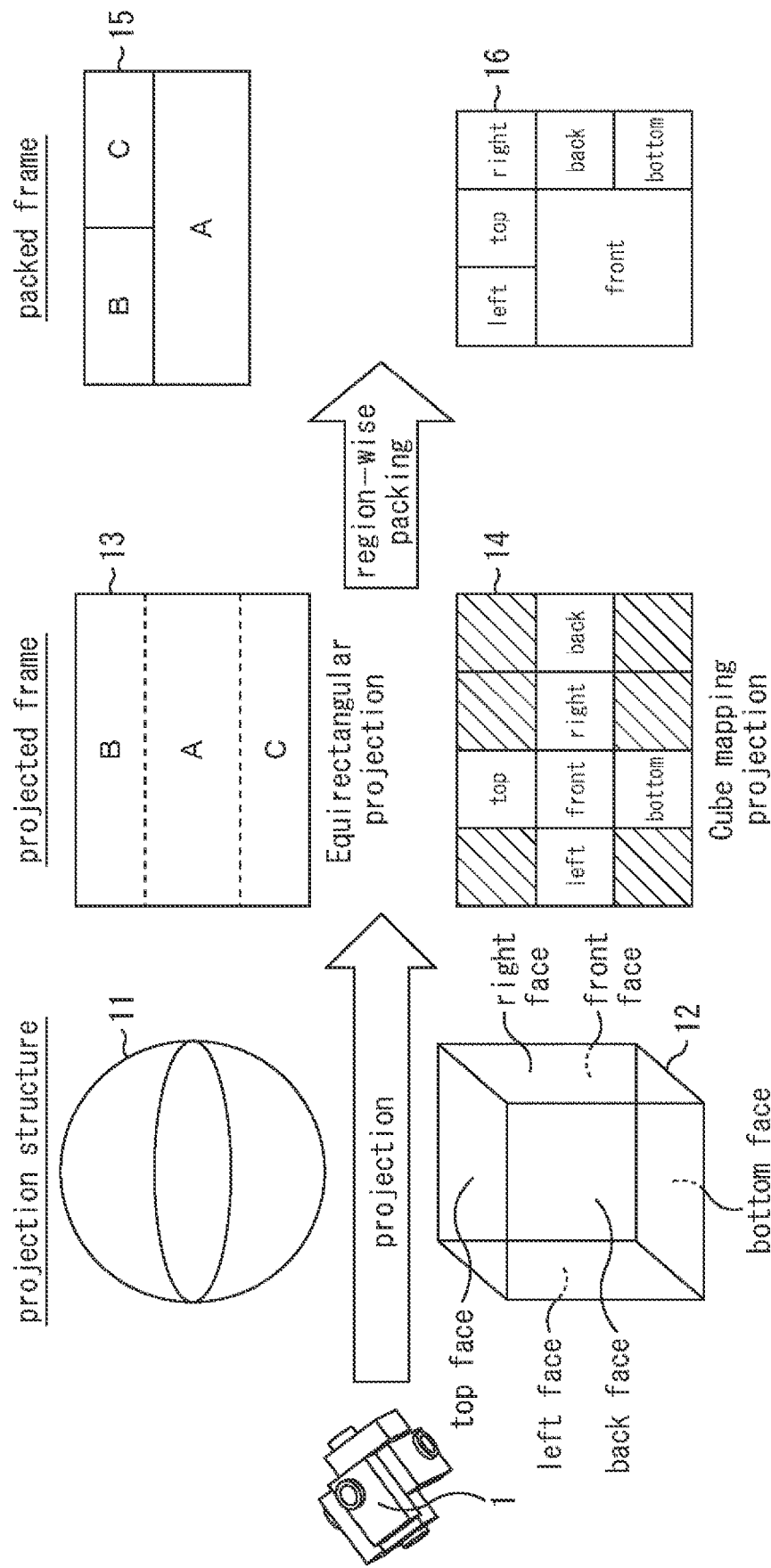
FIG. 1 is an explanatory diagram illustrating a projected frame and a packed frame.

In the present technology, a projected frame and a packed frame of a celestial sphere image are generated. FIG. 1 is an explanatory diagram illustrating a projected frame and a packed frame. As illustrated in FIG. 1, an omnidirectional image (celestial sphere image) is photographed by a camera 1. The celestial sphere image is an image of 360 degrees in up, down, left, and right directions. Note that, hereinafter, in a case in which it is difficult to understand words when the words are written in katakana, the words are described in English.

The celestial sphere image can be projected to a projection structure to obtain a projected frame. Then, by changing a position and a size of the projected frame for each region and disposing and packing the projected frame on a 2-dimensional surface, it is possible to obtain a packed frame. In this way, changing at least one of the position or the size for each region for packing is referred to as region-wise packing. In the packed frame, the projected frame is disposed so that each region is rectangular as a whole. By using the packed frame, it is possible to optimize a transmission capacity by increasing a resolution of a region in which high quality is preferable and decreasing a resolution of a region in which low quality is sufficient.

In the example of FIG. 1, a sphere 11 and a cube 12 are illustrated as projection structures. By projecting the celestial sphere image to the sphere 11 in accordance with equirectangular projection and expressing the sphere 2-dimensionally, it is possible to obtain a projected frame 13. In this example, the projected frame 13 includes a middle region A, a region B located above, and a region C located below.

Then, a packed frame 15 can be obtained by performing region-wise packing on the projected frame 13. In this example, the resolution of the region A is considered to remain unchanged, the region B is disposed on the top left side of the region A, and the region C is disposed on the right side. The resolutions of the regions B and C decrease.

By projecting the celestial sphere image to the cube 12 (performing cube mapping projection) and expressing the celestial sphere image 2-dimensionally, it is possible to obtain a projected frame 14. Images of six faces (regions) including a front face, a right face, a back face, a left face, a top face, and a bottom face of the cube 12 are disposed in the projected frame 14 and include a total of 12, 4×3, regions. Region images of the left face (left), the front face (front), the right face (right), and the back face (back) are disposed in four middle regions in sequence from the left side, a region image of the top face (top) is disposed in a region above the front face (front), and a region image of the bottom face (bottom) is disposed in a region below the front face.

By performing region-wise packing on the projected frame 14, it is possible to obtain a packed frame 16. In the example, the resolution of the region image of the front face (front) increases and the resolutions of the other region images remain unchanged. The region image of the left face (left) is disposed on the left side of the region image of the front face (front) and the region image of the top face (top) is disposed on the right side thereof. The region images of the right face (right), the back face (back), and the bottom face (bottom) are disposed in sequence from the top on the right side of the region image of the front face (front).

Note that the images from one viewpoint (view) have been described above. However, in the present technology, since a stereoscopic image (celestial sphere stereoscopic image) is used, there are images from two viewpoints, that is, an image from the left-eye viewpoint (an L view image) and an image from the right-eye viewpoint (an R view image). That is, the image from the left-eye viewpoint (the L view image) and the image from the right-eye viewpoint (the R view image) are photographed and acquired by the camera 1.

<Packing Examples (FIGS. 2 to 10)>

Figure 2:
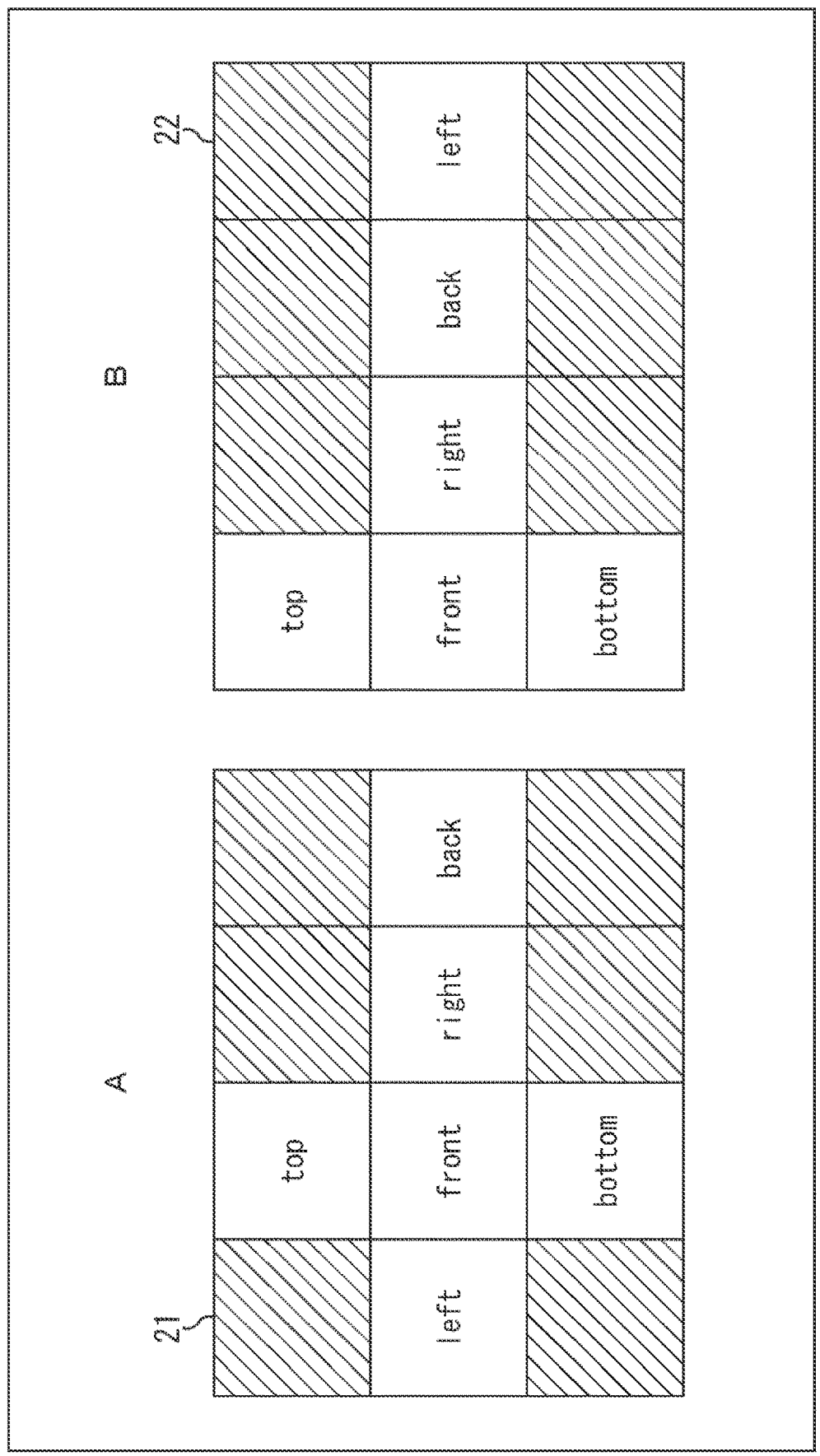
FIG. 2 is a diagram illustrating an example of cube mapping.

Next, packing performed in the present technology will be described. FIG. 2 is a diagram illustrating an example of cube mapping. As projected frames obtained in a case in which the cube mapping is performed, there are types of a projected frame 21 illustrated in A of FIG. 2 and a projected frame 22 illustrated in B of FIG. 2. The projected frame 21 in A of FIG. 2 has the same configuration as the projected frame 14 illustrated in FIG. 1. Hereinafter, such disposition is referred to as Type A for convenience.

In the projected frame 22, region images of the front face (front), the right face (right), the back face (back), and the left face (left) are disposed in four middle regions of a total of 12 4×3 regions in sequence from the left side, the region image of the top face (top) is disposed in the region above the front face (front), and the region image of the bottom face (bottom) is disposed below the front face. Hereinafter, such disposition is referred to as Type B for convenience.

In FIG. 2 (similarly in FIGS. 3 and 4 to be described below), valid pixel data is not disposed in rations (hatched rations) in which text (text such as "front," "right," "back," "left," "front," and "top") of the regions is not displayed (actually, invalid data is disposed), and these can be referred to as invalid regions. All of the region images of the valid faces and the invalid regions are rectangular and form a frame on which encoding is possible.

As described above, in the present technology, an image from the left-eye viewpoint (hereinafter also referred to as an L view image) and an image from the right-eye viewpoint (hereinafter also referred to as an R view image) are photographed. Accordingly, in the L view image and the R view image, there is the projected frame 21 illustrated in A of FIG. 2 and there is the projected frame 22 illustrated in B of FIG. 2.

Hereinafter, packing of a celestial sphere stereoscopic image will be described exemplifying a case in which the projected frame is packed by the cube mapping.

In the present technology, a celestial sphere stereoscopic image is packed using any of the following three packing schemes.

First Packing Scheme (Scheme 1)

The L view image of the projected frame in which the region images of six faces are disposed in six predetermined regions among 4×3 regions and the R view image of the projected frame configured similarly are packed side by side or top & bottom.

Second Packing Scheme (Scheme 2)

The L view image and the R view image are packed for each region in the frame of the celestial sphere stereoscopic image.

Third Packing Scheme (Scheme 3)

The L view image and the R view image are packed for an arbitrary region in the frame of the celestial sphere stereoscopic image.

In the first packing scheme (Scheme 1), the L view image of the projected frame in which the region images of six faces are disposed in six predetermined regions among 4×3 regions and the R view image of the projected frame configured similarly are packed side by side or top & bottom.

Figure 3:
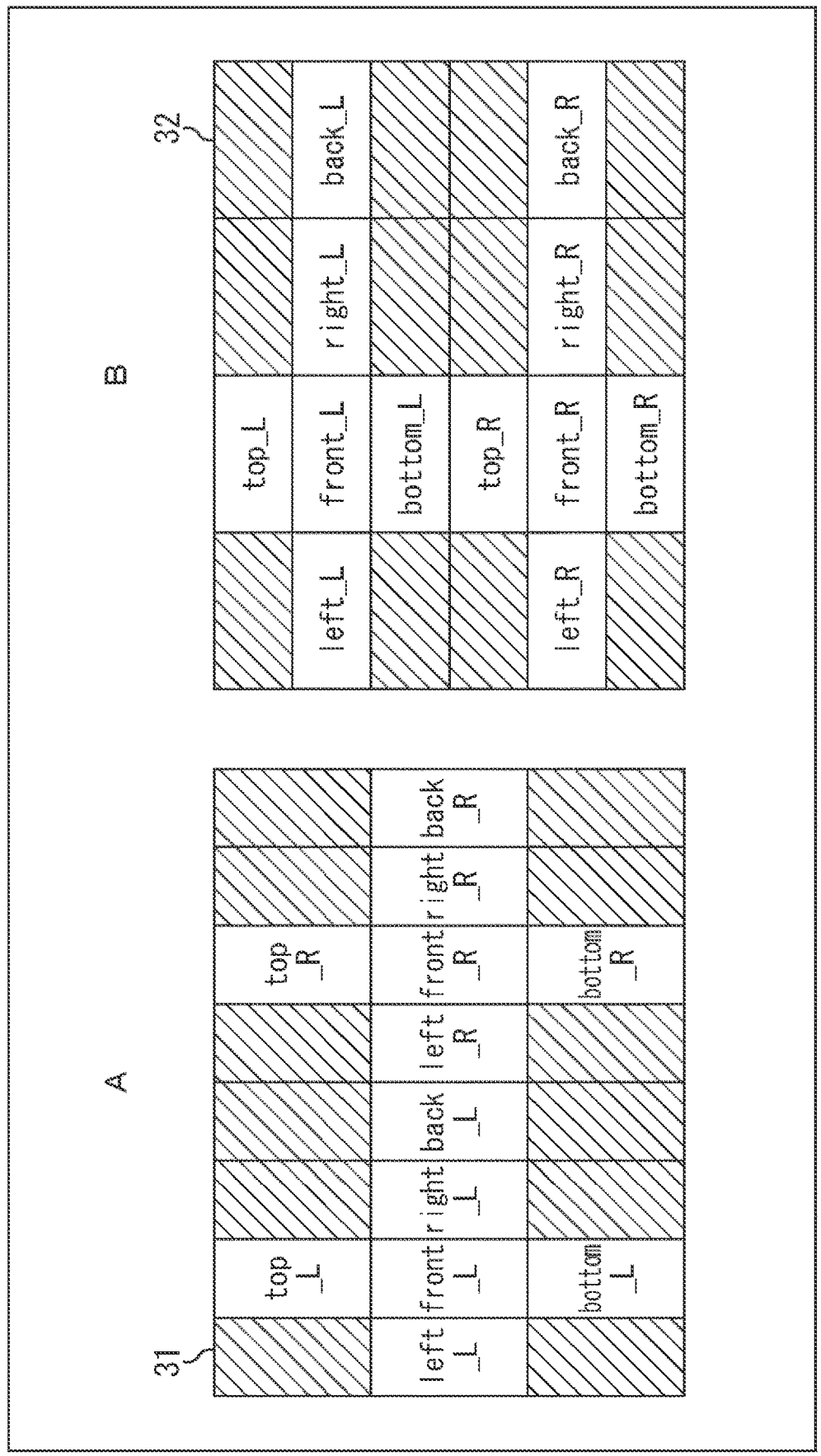
FIG. 3 is a diagram illustrating an example of packing.
Figure 4:
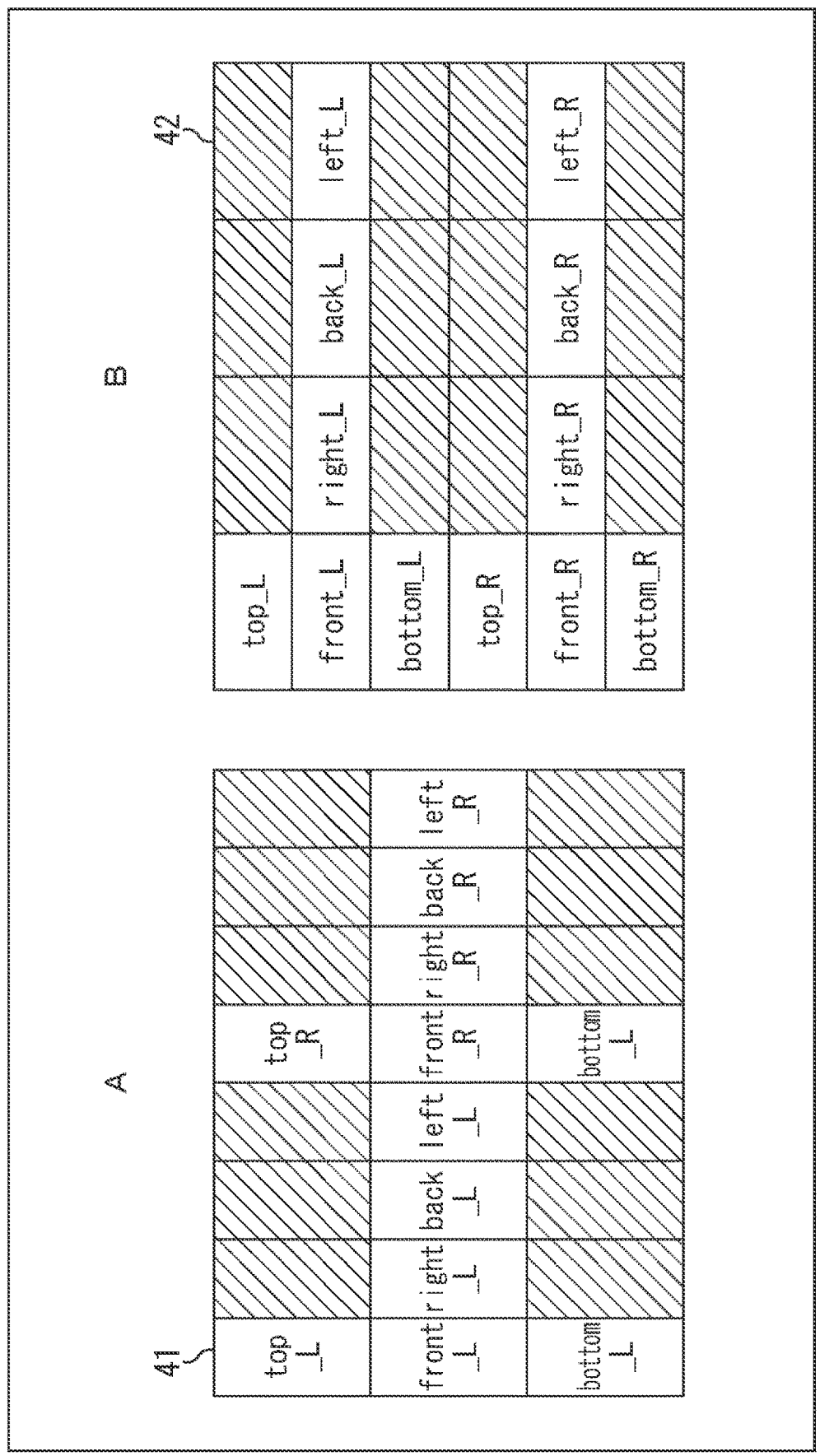
FIG. 4 is a diagram illustrating an example of packing.

Both FIGS. 3 and 4 are diagrams illustrating examples of packing. FIGS. 3 and 4 illustrate example of the first packing scheme (Scheme 1). FIG. 3 illustrates packing of the projected frame mapped like Type A illustrated in A of FIG. 2 and FIG. 4 illustrates packing of the projected frame mapped like Type B illustrated in B of FIG. 2.

In addition to FIGS. 3 and 4, in the following drawings, left_L represents a region image of the left face of an L view image and front_L represents a region image of the front face of the L view image. Hereinafter, similarly, right_L represents a region image of the right face of the L view image, back_L represents a region image of the back face of the L view image, top_L represents a region image of the top face of the L view image, and bottom_L represents a region image of the bottom face of the L view image. Similarly, left_R represents a region image of the left face of an R view image and front_R represents a region image of the front face of the R view image. Hereinafter, similarly, right_R represents a region image of the right face of the R view image, back_R represents a region image of the back face of the R view image, top_R represents a region image of the top face of the R view image, and bottom_R represents a region image of the bottom face of the R view image.

In the example illustrated in A of FIG. 3, the projected frame of the entire rectangular R view mapped in Type A is disposed on the right side of the projected frame of the entire rectangular L view mapped in Type A like the projected frame 21 illustrated in A of FIG. 2. That is, an entire rectangular packed frame 31 is configured by packing the images side by side. In each region, a resolution in the longitudinal direction is reduced to ½ compared to that in the transverse direction.

In the example illustrated in B of FIG. 3, the projected frame of the entire rectangular R view mapped in Type A is disposed on the bottom side of the projected frame of the entire rectangular L view mapped in Type A like the projected frame 21 illustrated in A of FIG. 2. That is, an entire rectangular packed frame 32 is configured by packing of the top & bottom. In each region, a resolution in the transverse direction is reduced to ½ compared to that in the longitudinal direction.

In the example illustrated in A of FIG. 4, the projected frame of the R view mapped in Type B is disposed on the right side of the projected frame of the L view mapped in Type B like the projected frame 22 illustrated in B of FIG. 2. That is, a packed frame 41 is configured by packing the images side by side. In each region, a resolution in the longitudinal direction is reduced to ½ compared to that in the transverse direction.

In the example illustrated in B of FIG. 4, the projected frame of the R view mapped in Type B is disposed on the bottom side of the projected frame of the L view mapped in Type B like the projected frame 22 illustrated in B of FIG. 2. That is, a packed frame 42 is configured by packing of the top & bottom. In each region, a resolution in the transverse direction is reduced to ½ compared to that in the longitudinal direction.

The first packing scheme illustrated in FIGS. 3 and 4 is similar to the packing scheme of the related art. Accordingly, to ensure compatibility, a process in accordance with a stereo indication type (stereo_indication_type) of a stereo video box (stvi: StereoVideoBox) is performed. That is, the L view image and the R view image are packed into one video frame by one of the side by side and the top & bottom. Since an invalid region formed by invalid data is included in the packed frame, transmission of the packed frame may be inefficient (that is, transmission efficiency deteriorates). Note that correspondence to indication types other than the side by side and the top & bottom, as illustrated in FIG. 5 to be described below, is also possible.

FIG. 5 is an explanatory diagram illustrating stereo indication types. Value 0 of stereo_indication_type represents a checkerboard, Value 1 represents column base interleaving, and Value 2 represents row base interleaving. Value 3 represents side-by-side and Value 4 indicates top & bottom. Value 5 represents frame sequential, Value 6 indicates no frame packing (2D), and Value 7 represents tile base packing.

Next, the second packing scheme (Scheme 2) will be described with reference to FIG. 6. FIG. 6 is a diagram illustrating an example of packing. In the second packing scheme, a pair of an L view image and an R view image are packed for each region in the frame of the celestial sphere stereoscopic image.

In a packed frame 51 in A of FIG. 6, region images of right and left corresponding regions are disposed side by side in 4×3 regions. That is, region images of left_L and left_R are disposed to be adjacent in two regions in the longitudinal direction on the left side of the top row. Region images of top_L and top_R are disposed to be adjacent in two regions in the longitudinal direction on the right side of the top row Region images of back_L and back_R are disposed to be adjacent in two regions in the horizontal direction on the left side of the middle row and region images of front_L and front_R are disposed to be adjacent in two regions in the longitudinal direction on the right side of the middle row. Region images of right_L and right_R are disposed to be adjacent in two regions in the horizontal direction on the left side of the bottom row and region images of bottom_L and bottom_R are disposed to be adjacent in two regions in the longitudinal direction on the right side of the bottom row.

In a packed frame 52 in B of FIG. 6, region images of right and left corresponding regions are disposed in 2×6 regions by the top & bottom. That is, region images of left_L and left_R are disposed to be adjacent in two regions in the top rows of the left column in the transverse direction and region images of right_L and right_R are disposed to be adjacent in two regions below in the transverse direction. Additionally, region images of top_L and top_R are disposed to be adjacent in two regions further below in the transverse direction. Region images of front_L and front_R are disposed to be adjacent in two regions in the top rows of the right column in the transverse direction and region images of back_L and back_R are disposed to be adjacent in two regions below in the transverse direction. Additionally, region images of bottom_L and bottom_R are disposed to be adjacent in two regions further below in the transverse direction.

In a packed frame 53 in C of FIG. 6, region images of right and left corresponding regions are disposed side by side or the top & bottom. That is, in this example, the side by side or the top & bottom are mixed. Region images of left_L and left_R are disposed to be adjacent in two regions in the transverse direction on the leftmost side among 4×3 regions and region images of front_L and front_R are disposed to be adjacent in two regions in the transverse direction on the right side of the leftmost side. Further, region images of right_L and right_R are disposed to be adjacent in two regions in the transverse direction on the further right side and region images of back_L and back_R are disposed to be adjacent in two regions in the transverse direction on the right side.

Region images of top_L and top_R are disposed to be adjacent in two regions in the longitudinal direction on the left side of the bottom row and region images of bottom_L and bottom_R are disposed to be adjacent in two regions in the longitudinal direction on the right side of the bottom row.

Since a pair of L view image and R view image is disposed for each region, it is easy to acquire a pair of region images. Therefore, it is possible to smoothly perform display conversion by viewpoint movement at the time of stereoscopic display. In addition, conversion between stereoscopic (hereinafter also simply abbreviated to stereo) display and monoscopic (hereinafter also simply abbreviated to mono) display is also easy. At the time of monoscopic reproduction, only the L view image is reproduced.

Further, by pairing L view image and R view image for each region (for example, a pair of left_L image and left_R image, a pair of top_L image and top_R image, or the like) as one tile (a high efficiency video coding (HEVC) tool) and encoding the R view image as a difference from the L view image, or the like to allow a relation in which the R view image refers to the L view image, encoding efficiency can be caused to be improved.

Note that the present technology is not limited to cube mapping projection and similar advantageous effects can also be realized in projection types such as equirectangular projection, truncated square pyramid, and cylinder. Note that the present technology can also correspond to indication types other than the side by side or the top & bottom illustrated in FIG. 5.

Next, the third packing scheme (Scheme 3) will be described with reference to FIG. 7. FIG. 7 is a diagram illustrating an example of packing. In conformity with the third packing scheme, an L view image and an R view image are packed in arbitrary regions in a frame of a celestial stereoscopic image.

In a packed frame 61 in A of FIG. 7, region images of right and left corresponding regions are disposed at arbitrary positions in 4×3 regions. In this example, region images of top_R, top_L, front_R, and right_R are disposed to be adjacent in sequence in the longitudinal direction from the left side in the top row. Region images of left_L, front_L, right_L, and back_L are disposed to be adjacent in sequence in the longitudinal direction from the left side in the middle row. Region images of bottom_R, bottom_L, back_R, and left_R are disposed to be adjacent in sequence in the longitudinal direction from the left side in the bottom row.

That is, in the packed frame 61, the L view image is disposed in Type A illustrated in A of FIG. 2 and each region image of the R view is disposed in the remaining regions.

In a packed frame 62 in B of FIG. 7, region images of right and left corresponding regions are disposed at arbitrary positions in 4×3 regions. In this example, region images of top_L, right_R, back_R, and left_R are disposed to be adjacent in sequence in the longitudinal direction from the left side in the top row. Region images of front_L, right_L, back_L, and left_L are disposed to be adjacent in sequence in the longitudinal direction from the left side in the middle row. Region images of bottom_L, top_R, front_R, and bottom_R are disposed to be adjacent in sequence in the longitudinal direction from the left side in the bottom row.

That is, in the packed frame 62, the L view image is disposed in Type B illustrated in B of FIG. 2 and each region image of the R view is disposed in the remaining regions.

The disposition of each region image in a packed frame 63 in C of FIG. 7 is basically similar to the case of the packed frame 62 in B of FIG. 7. Here, the direction of each of the regions images of top_R, front_R, and bottom_R which are three right region images in the bottom row is different from that in the case of B of FIG. 7.

That is, in the packed frame 62 in B of FIG. 7, the region images of top_R, front_R, and bottom_R are disposed so that the upper direction of the images orients the upper direction of the drawing as in the other region images. In contrast, in the packed frame 63 in C of FIG. 7, the region images of top_R, front_R, and bottom_R are disposed so that the images continue. The region images of top_R, front_R, and bottom_R are rotated by 90 degrees counter-clockwise compared to the case of the packed frame 62 in B of FIG. 7.

That is, as apparent from FIG. 1, a region image continuing in the transverse direction of the region image of bottom_R is the region image of front_R and a region image continuing in the transverse direction of the region image of front_R is the region image of top_R. That is, the region images of top_R, front_R, and bottom_R are each adjacent in the transverse direction. Accordingly, for example, when an image of one line continuing in each of the regions of top_R, front_R, and bottom_R is considered, the lines are expressed as one continuous line (a line continuing in the transverse direction in C of FIG. 7) in the packed frame 63C. That is, continuity of cube faces is maintained.

In contrast, in the packed frame 62 in B of FIG. 7, since one line is presented as a line in the upper direction of each drawing in each of the regions of top_R, front_R, and bottom_R, three lines are expressed to be parallel separately. That is, in the packed frame 62 in B of FIG. 7, the regions of top_R, front_R, and bottom_R are not disposed so that the images continue.

In the third packing scheme illustrated in A of FIG. 7 to C of FIG. 7, a resolution of each cube face can be doubled while maintaining a transmission capacity compared to the first packing scheme illustrated in A of FIG. 3, B of FIG. 3, A of FIG. 4, and B of FIG. 4.

In addition, in the third packing scheme in A of FIG. 7 and B of FIG. 7, the disposition of each region image of the L view is considered to be each similar to that of the case of A of FIG. 2 and B of FIG. 2. The region image of the R view is disposed at a position at which each region image of the L view is not disposed (an unused region). As a result, in a client which does not correspond to the third packing scheme, the region images of the cube faces of the L view can also be acquired, reproduced, and displayed. Therefore, the scheme can be said to be a packing scheme with backward capability.

In order to a client to receive a celestial sphere image so that the celestial sphere image can be viewed, it is necessary to deliver the celestial sphere image so that the client can acquire the region images of the celestial sphere image described above from a delivered stream and can render and display the region images. Accordingly, a delivery format of information necessary to acquire the region images will be described.

In the present technology, a new box is disposed below schi (SchemeInformationBox) defined by ISOBMFF and box information is delivered with the box. Hereinafter, this box is referred to as a region mapping box (RegionMappingBox). RegionMappingBox is disposed in the case of Scheme Type='rmap.' In addition, a stereo video box (StereoVideoBox) is also disposed below schi along with the region mapping box. At this time, information regarding the stereo video box is used in association with information regarding the region mapping box. Of course, locations in which RegionMappingBox and StereoVideoBox are disposed may be locations other than the locations below schi.

FIG. 8 is a diagram illustrating a configuration example of the region mapping box. FIG. 9 is an explanatory diagram illustrating fields of the region mapping box. Meaning of the field described in the region mapping box in FIG. 8 is illustrated in FIG. 9.

In the example of FIG. 8, projection_format, packing_flag, FOV_flag, stereo_packing_type, and num_regions are described in RegionMappingBox. Here, projection_format represents a projection type, Value 0 thereof means equirectangular projection, and Value 1 thereof means cube mapping projection. Here, packing_flag represents whether or not the region-wise packing is used, Value 0 thereof means non-use of the region-wise packing, and Value 1 thereof means use of the region-wise packing.

FOV_flag indicates a standard of angle information of object_width and object_height, Value 0 thereof means the surface of a sphere, and Value 1 thereof means the surface of perspective projection. As will be described below with reference to FIG. 10, object_width represents a width (angle) of a region in a projection structure and object_height represents a height (angle) of a region in the projection structure.

Here, stereo_packing type is identification information for identifying a stereo packing type and Value 0 thereof conforms to stereo_indication_type of stvi. When there is no stvi, stereo_packing_type means to be monoscopic. In a case in which there is stvi, stereo_packing_type means packing for each frame in which the side by side, the top & bottom, or the like is used. That is, Value 0 thereof means the packing illustrated in FIGS. 3 and 4. Value 1 of stereo_packing_type means packing of the L view and the R view for each region in a frame of a celestial sphere stereoscopic image. That is, Value 1 means the packing illustrated in FIG. 6. Value 2 means packing in accordance with arbitrary disposition of the L view and the R view of regions in the frame of the celestial sphere stereoscopic image. That is, Value 2 means the packing illustrated in FIG. 7. Here, num_regions represents the number of regions of a packed frame.

In RegionMappingBox, center_yaw, center_pitch, object_width, and object_height are further described. Here, center_yaw represents yaw of a region center in the projection structure and center_pitch represents a pitch of the region center in the projection structure.

In a case in which the value of packing_flag is true (1), rect_width, rect_height, rect_left, and rect_top are described. Here, rect_width represents a region width in a packed frame and rect_height represents a region height in the packed frame. In addition, rect_left and rect_top represent an x coordinate and a y coordinate of a region in the packed frame, respectively. These will be further described later with reference to FIG. 10.

In a case in which stereo_packing_type=2 is true, that is, the L view and the R view of a region in the frame of the celestial sphere stereoscopic image are disposed at arbitrary positions, rect_width_r, rect_height_r, rect_left_r, and rect_top_r are described. Here, rect_width_r and rect_height_r represent a width and a height of a region of the R view in the packed frame, respectively. In addition, rect_left_r and rect_top_r represent an x coordinate and a y coordinate of the region of the R view in the packed frame, respectively.

Figure 10:
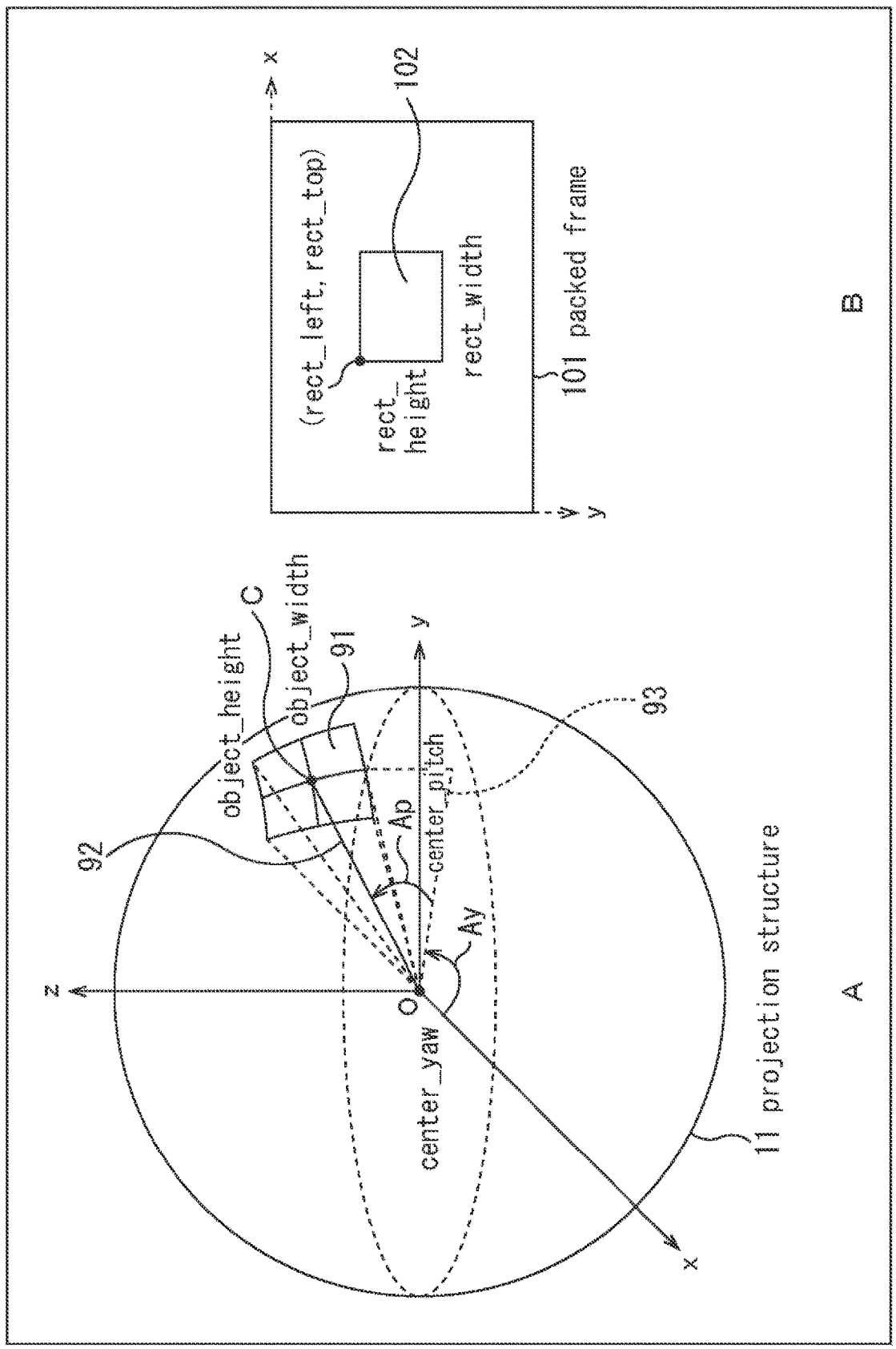
FIG. 10 is an explanatory diagram illustrating the fields of the region mapping box.

FIG. 10 is an explanatory diagram illustrating the fields of the region mapping box. Referring to A of FIG. 10, center_yaw, center_pitch, object_width, and object_height will be further described. In A of FIG. 10, an image is projected to a surface 91A on the surface of the sphere 11 which is a projection structure. Here, xyz coordinates in which the center O of the sphere 11 in A of FIG. 10 is the origin are illustrated. A line connecting the center O to a center C of the surface 91 is a line 92 and a line obtained by projecting the line 92 to the xy coordinate surface is a line 93. An angle Ay formed by the line 93 and the x axis is center_yaw. An angle Ap formed by the line 92 and the line 93 is center_pitch.

An angle when right and left sides of the surface 91 are viewed from the center O is object_width and an angle when top and bottom sides are viewed from the center O is object_height.

Information regarding a region in the projection structure is common between the L view image and the R view image and is represented with a spherical coordinate system that has center_yaw, center_pitch, object_width, and object_height.

Referring to B of FIG. 10, rect_width, rect_height, rect_left, and rect_top will be further described. B of FIG. 10 illustrates a packed frame 101 that includes a region 102. The width of the region 102 is rect_width and the height thereof is rect_height. The x coordinate of an angle of the top left of the region 102 is rect_left and the y coordinate thereof is rect_top.

B of FIG. 10 describes an L view image and the same conforms to an R view image. Fields of the R view corresponding to rect_width, rect_height, rect_left, and rect_top in the L view are rect_width_r, rect_height_r, rect_left_r, and rect_top_r.

As illustrated in FIG. 8, information described in a for-loop in RegionMappingBox is referred to as packing information and information expressed at coordinates of the packed frame and the projection structure in the packing information is also referred to as region information at the coordinates. In addition, information described outside of the for-loop is referred to as property information. In addition, information described in RegionMappingBox is collectively referred to as box information.

<Delivery System (FIG. 11)>

Figure 11:
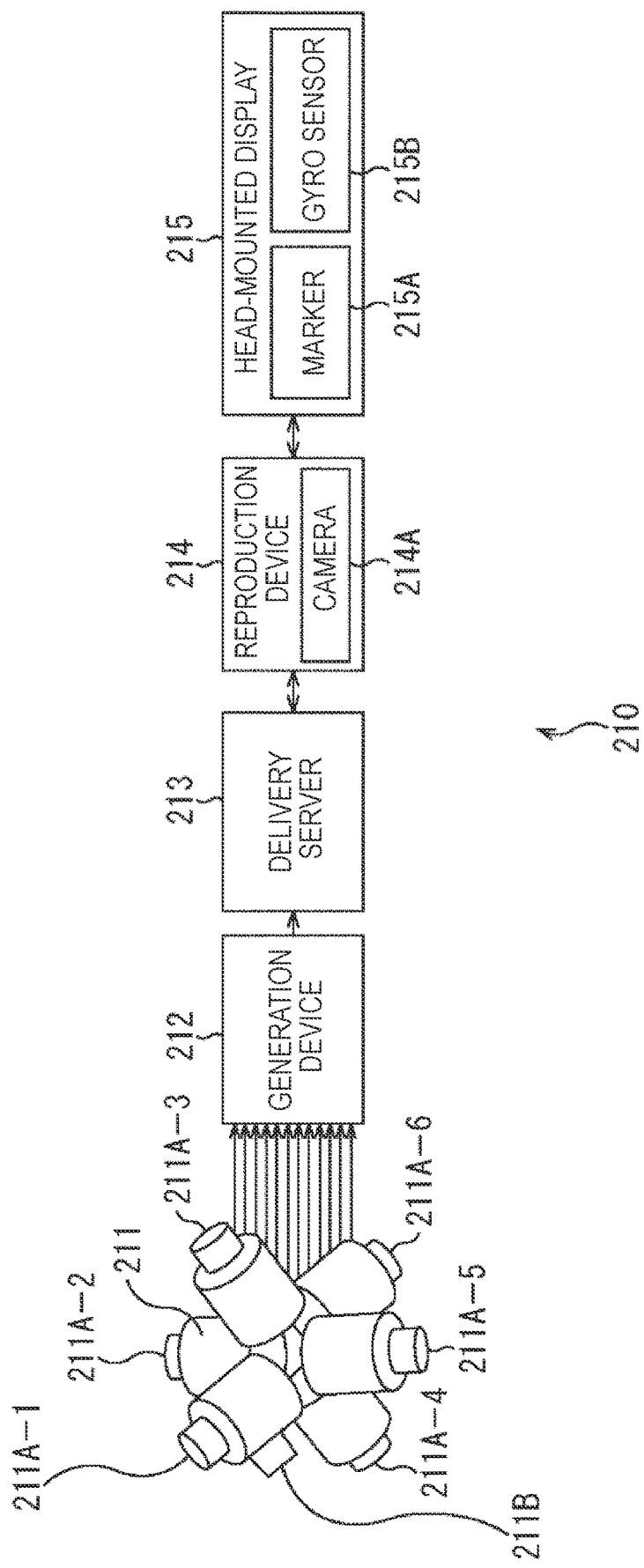
FIG. 11 is a block diagram illustrating a configuration example of a delivery system.

Next, a system that delivers a celestial sphere stereoscopic image will be described. FIG. 11 is a block diagram illustrating a configuration example of a delivery system.

A delivery system 210 in FIG. 11 includes a photographing device 211, a generation device 212, a delivery server 213, a reproduction device 214, and a head-mounted display 215. The delivery system 210 produces a celestial sphere image from photographed images photographed by the photographing device 211 and displays a display image with a visual field range of a viewer by using the celestial sphere image.

Specifically, the photographing device 211 of the delivery system 210 includes six cameras 211A-1 to 211A-6 and a microphone 211B. The cameras 211A-1 to 211A-6 are paired as right-eye cameras and left-eye cameras to photograph stereoscopic images. Note that, hereinafter, in a case in which it is not necessary to distinguish the cameras 211A-1 to 211A-6 from each other particularly, the cameras 211A-1 to 211A-6 are collectively referred to as the cameras 211A.

Each camera 211A photographs a moving image and the microphone 211B acquires a surrounding sound. The delivery system 210 supplies the photographed images which is a moving image of six directions photographed by each camera 211A and the sound acquired by the microphone 211B as moving image content to the generation device 212. Note that the number of cameras included in the photographing device 211 may be a number other than six as long as the number of cameras is plural.

The generation device 212 generates a celestial sphere image from the photographed images supplied from the photographing device 211 in accordance with a method using equirectangular projection and encodes the celestial sphere image at one or more bit rates to generate an equirectangular stream of each bit rate. In addition, the generation device 212 generates a celestial sphere image from the photographed images by cube mapping and encodes the celestial sphere image at one or more bit rates to generate a cube stream of each bit rate. In addition, the generation device 212 encodes the sound supplied from the photographing device 211 to generate an audio stream.

The generation device 212 forms the equirectangular stream of each bit rate, the cube stream of each bit rate, and the audio stream as ISOBMFF files. The generation device 212 uploads the ISOBMFF files generated as the result to the delivery server 213.

Note that, herein, the number of bit rates of the equirectangular stream and the cube stream is one or more and conditions (for example, the sizes of images or the like) other than the bit rates may be one or more.

In addition, the generation device 212 generates an MPD file for managing segment files of the moving image content and uploads the MPD file to the delivery server 213. Segments are formed by forming a video stream and an audio stream as files in time units from about several seconds to 10 seconds. For example, the ISOBMFF files including RegionMappingBox are delivered as segment files.

For example, the delivery server 213 that performs delivery using MEPG-DASH (ISO/IEC 23009-1) stores the segment files and the MPD files uploaded from the generation device 212. The delivery server 213 transmits the stored segment files to the reproduction device 214 in response to a request from the reproduction device 214 serving as a client.

The reproduction device 214 gives a request for the ISOBMFF files to the delivery server 213 and receives the ISOBMFF files transmitted in response to the request. In addition, the reproduction device 214 requests the segment files of the celestial sphere image generated in accordance with a method of producing the celestial sphere image corresponding to mapping which can be performed by the reproduction device 214 on the basis of the ISOBMFF files and receives the segment files transmitted in response to the request. The reproduction device 214 decodes the cube stream (or may decode equirectangular stream) included in the received segment files. The reproduction device 214 generates a 3D model image by mapping the celestial sphere image obtained as the decoding result to a 3D model.

In addition, the reproduction device 214 contains the camera 214A and photographs a marker 2154 attached to the head-mounted display 215. Then, the reproduction device 214 detects a viewing position at a coordinate system of the 3D model on the basis of a photographed image of the marker 215A. Further, the reproduction device 214 receives a detection result of a gyro sensor 215B of the head-mounted display 215 from the head-mounted display 215. The reproduction device 214 decides a visual line direction of a viewer on the coordinate system of the 3D model on the basis of the detection result of the gyro sensor 215B. The reproduction device 214 decides a visual field range of a viewer located inside the 3D model on the basis of the viewing position and the visual line direction.

The reproduction device 214 produces an image in the visual field range of the viewer as a display image by performing the perspective projection on the 3D model image within the visual field range of the viewer using the viewing position as a focus. The reproduction device 214 supplies the display image to the head-mounted display 215.

The head-mounted display 215 is mounted on the head of the viewer and displays the display image supplied from the reproduction device 214. The marker 215A photographed by the camera 214A is attached to the head-mounted display 215. Accordingly, the viewer can designate a viewing position, moving in a state in which the head-mounted display 215 is mounted on his or her head. In addition, the gyro sensor 215B is contained in the head-mounted display 215 and a detection result of an angular velocity by the gyro sensor 215B is transmitted to the reproduction device 214. Accordingly, the viewer can designate a visual line direction, rotating his or her head on which the head-mounted display 215 is mounted.

<Generation Device (FIGS. 12 to 32)>

Figure 12:
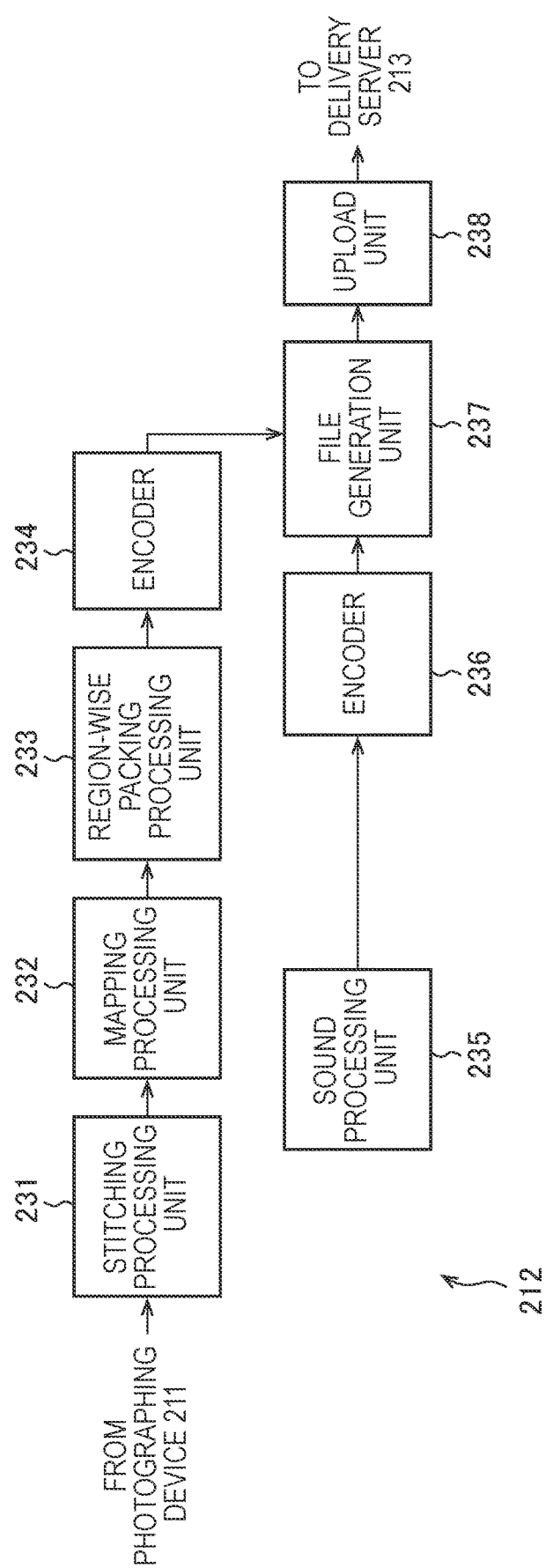
FIG. 12 is a block diagram illustrating a configuration example of a generation device.

FIG. 12 is a block diagram illustrating a configuration example of the generation device. The generation device 212 includes a stitching processing unit 231, a mapping processing unit 232, a region-wise packing processing unit 233, an encoder 234, a sound processing unit 235, an encoder 236, a file generation unit 237, and an upload unit 238.

The stitching processing unit 231 performs a stitching process of causing color or brightness of the photographed images of the six directions supplied from the camera 211A in FIG. 11 to be the same for each frame and removing overlap for connection. The stitching processing unit 231 supplies the photographed images of a frame unit after the stitching process to the mapping processing unit 232.

The mapping processing unit 232 generates a celestial sphere image from the photographed images supplied from the stitching processing unit 231 by the cube mapping in this example. Specifically, the mapping processing unit 232 maps the photographed images after the stitching process as texture to a cube to generate a development image of the cube as a celestial sphere image. The mapping processing unit 232 supplies the celestial sphere image to the region-wise packing processing unit 233. Note that the stitching processing unit 231 and the mapping processing unit 232 may be integrated.

The region-wise packing processing unit 233 performs a region-wise packing process. That is, a packed frame is generated by changing the position and the size of a projected frame for each region, disposing the projected frame on a 2-dimensional surface, and performing packing.

The encoder 234 encodes the celestial sphere image supplied from the region-wise packing processing unit 233 at one or more bit rates to generate a cube stream. The encoder 234 supplies the cube stream of each bit rate to the file generation unit 237.

The sound processing unit 235 acquires the sound supplied from the microphone 211B in FIG. 11 and supplies the sound to the encoder 236. The encoder 236 encodes the sound supplied from the sound processing unit 235 to generate an audio stream. The encoder 236 supplies the audio stream to the file generation unit 237.

The file generation unit 237 forms the cube stream of each bit rate and the audio stream as files in units of segments. The file generation unit 237 supplies the segment files generated as the result to the upload unit 238.

The file generation unit 237 also generates an ISOBMFF file. Specifically, the file generation unit 237 generates RegionMappingBox in which stereo_packing_type to be described below is included in the ISOBMFF file.

The upload unit 238 uploads the segment files supplied from the file generation unit 237 and the ISOBMFF file to the delivery server 213 in FIG. 11.

Figure 13:
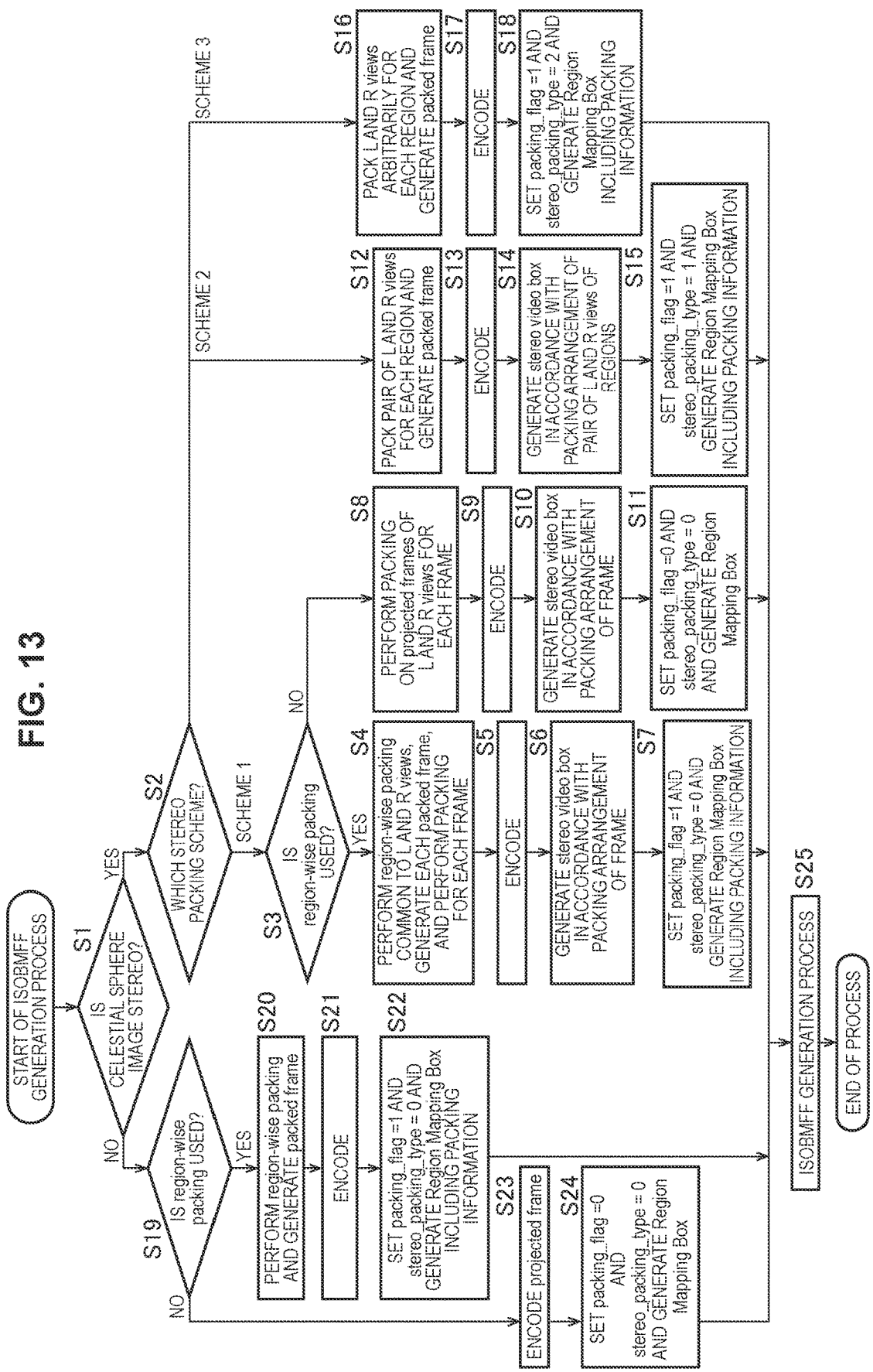
FIG. 13 is an explanatory flowchart illustrating a generation process.

Next, a process of the generation device 212 will be described with reference to FIG. 13. FIG. 13 is an explanatory flowchart illustrating a generation process.

The stitching processing unit 231 performs a stitching process of causing color or brightness of the photographed images of the six directions supplied from the camera 211A in FIG. 11 to be the same for each frame and removing overlap for connection. The stitching processing unit 231 supplies the photographed images of a frame unit after the stitching process to the mapping processing unit 232.

The mapping processing unit 232 generates a celestial sphere image from the photographed images supplied from the stitching processing unit 231 by the cube mapping. That is, the mapping processing unit 232 maps the photographed images after the stitching process as texture to a cube to generate a development image of the cube as a celestial sphere image. The mapping processing unit 232 supplies the celestial sphere image to the region-wise packing processing unit 233.

In step S1, the region-wise packing processing unit 233 determines whether the celestial sphere image is stereoscopic. In a case in which the celestial sphere image is stereoscopic, the region-wise packing processing unit 233 determines which stereo packing scheme is performed on the basis of an instruction from a user in step S2. That is, whether one of Scheme 1 to Scheme 3 is adopted is determined as the stereo packing scheme.

In a case in which the adopted stereo packing scheme is Scheme 1 (the packing scheme illustrated in FIG. 3 or 4), the region-wise packing processing unit 233 determines whether the region-wise packing is used as the packing scheme on the basis of an instruction from the user in step S3.

In a case in which the region-wise packing is used as the packing scheme, the region-wise packing processing unit 233 performs a region-wise packing process common to the L view and the R view in step S4. Then, the region-wise packing processing unit 233 generates packed frames of the L view and the R view and performs packing for each frame. In step S5, the encoder 234 encodes the frames and supplies the encoded frames to the file generation unit 237.

In step S6, the file generation unit 237 generates StereoVideoBox in accordance with packing arrangement of the frame. In stereo_indication_type, Value 3 or Value 4 (see FIG. 5) is set in accordance with a packing type.

In step S7, the file generation unit 237 sets packing_flag=1 (where region-wise packing is used) and sets stereo_packing_type=0 (Scheme 1). Then, the file generation unit 237 generates RegionMappingBox including them.

In a case in which it is determined in step S3 that the region-wise packing is not used, the region-wise packing processing unit 233 performs packing on the projected frames of the L view and R view (for example, the projected frame 14 in FIG. 1) for each frame in step S8. In step S9, the encoder 234 encodes the packed frame.

In step S10, the file generation unit 237 generates StereoVideoBox in accordance with packing arrangement of the frame. That is, as in the case of step S6, in stereo_indication_type thereof, Value 3 or Value 4 (see FIG. 5) is set in accordance with a packing type.

In step S11, the file generation unit 237 sets packing_flag=0 (where region-wise packing is not used) and sets stereo_packing_type=0 (Scheme 1). Then, the file generation unit 237 generates RegionMappingBox including them.

In a case in which it is determined in step S2 that the stereo packing scheme is Scheme 2 (the L view image and the R view image are packed for each region in the frame of the celestial stereoscopic image), the process proceeds to step S12. In step S12, the region-wise packing processing unit 233 packs the L view and the R view as a pair for each region to generate the packed frame. In step S13, the encoder 234 encodes the packed frame.

In step S14, the file generation unit 237 generates StereoVideoBox in accordance with packing arrangement of the pair of L view and R view for each region. Then, in stereo_indication_type thereof, Value 3 or Value 4 (see FIG. 5) is set in accordance with a packing type. In step S15, the file generation unit 237 sets packing_flag=1 (where region-wise packing is used) and sets stereo_packing_type=1 (Scheme 2). Then, the file generation unit 237 generates RegionMappingBox including them.

In a case in which it is determined in step S2 that the stereo packing scheme is Scheme 3 (the L view image and the R view image are packed in an arbitrary region in the frame of the celestial stereoscopic image), the process proceeds to step S16. In step S16, the region-wise packing processing unit 233 packs the L view and the R view in an arbitrary position for each region to generate the packed frame. In step S17, the encoder 234 encodes the packed frame.

In step S18, the file generation unit 237 sets packing_flag=1 (where region-wise packing is used) and sets stereo_packing_type=2 (Scheme 3). Then, the file generation unit 237 generates RegionMappingBox including them.

In a case in which it is determined in step S1 that the celestial sphere image is not stereoscopic, the region-wise packing processing unit 233 determines whether the region-wise packing is used as the packing scheme on the basis of an instruction from the user in step S19.

In a case in which the region-wise packing is used as the packing scheme, the region-wise packing processing unit 233 performs the region-wise packing process to generate the packed frame in step S20. In step S21, the encoder 234 encodes the packed frame.

In step S22, the generation unit 237 sets packing_flag=1 (where region-wise packing is used) and sets stereo_packing_type=0 (Scheme 1). Then, the file generation unit 237 generates RegionMappingBox including the packing information.

In a case in which it is determined in step S19 that the region-wise packing is not used as the packing scheme, the encoder 234 encodes the projected frame in step S23.

In step S24, the generation unit 237 sets packing_flag=0 (where region-wise packing is not used) and sets stereo_packing_type=0 (Scheme 1). Then, the file generation unit 237 generates RegionMappingBox including them.

After the process of step S7, step S11, step S15, step S18, step S22, and step S24, the file generation unit 237 performs an ISOBMFF generation process in step S25.

A file generated by the file generation unit 237 is uploaded from the upload unit 238 to the delivery server 213.

Next, specific examples of processes of Scheme 1 to Scheme 3 of the stereo packing in the flowchart of the generation process in FIG. 13 will be described below.

First, an example of stereo_packing_type=0 (Scheme 1: packing for each frame in which side by side, top & bottom, or the like of the related art is used) will be described.

In this case, the side by side, the top & bottom, or the like is delivered as stereo_indication_type using a stvi box defined in ISOBMFF (steps S6 and S10 of FIG. 13). That is, the projected frame or the packed frame is transmitted in accordance with the stvi box by packing such as the side-by-side or the top & bottom. In this case, packing_flag may be set to any value. Even in a case in which there is no stvi, that is, the monoscopic case, stereo_packing_type=0 is delivered.

Figure 14:
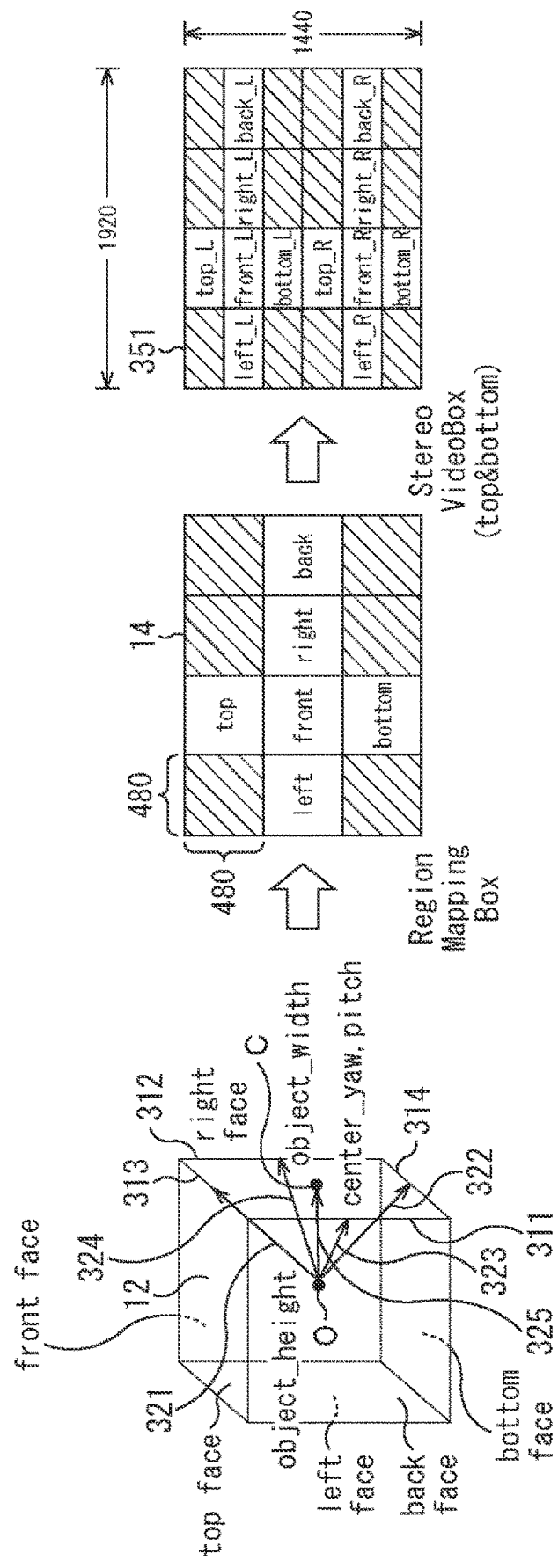
FIG. 14 is an explanatory diagram illustrating packing in a case in which a stereo packing type is 0.

FIG. 14 is an explanatory diagram illustrating packing in a case in which a stereo packing type is 0. That is, FIG. 14 illustrates an example of a cube mapping projection in the case of stereo_packing_type=0. The projected frame 14 which has face disposition common to the L view and the R view is generated from the cube 12 which is a projection structure and box information is delivered with RegionMappingBox. Since the packed frame is not used, packing_flag=0 is considered.

When O is assumed to be the center of the cube 12 in FIG. 14 and a perpendicular line 325 to the right face is drawn from the center O, a point at which the perpendicular line 325 and the right face intersect is assumed to be a center C. An angle between the perpendicular line 325 and a perpendicular line drawn from the center O to the front face is center_yaw, and an angle between the perpendicular line 325 and a surface parallel to the bottom face including the perpendicular line 325 is center_pitch.

An angle between a perpendicular line 323 oriented from the center O to the left side 311 of the right face and a perpendicular line 324 oriented to a right side 312 is object_width. An angle between a perpendicular line 321 oriented from the center O to a top side 313 of the right face and a perpendicular line 322 oriented to the bottom side 314 is object_height.

For example, values of center_yaw and center_pitch indicate a face. When center_yaw is 0, the front face is indicated. When center_yaw is 90, the left face is indicated. When center_yaw is −90, the right face is indicated, or the like.

In the example of FIG. 14, the projected frame 14 of the L view and the R view is packed as a frame 351 by the top & bottom and is delivered as Value 4 (top & bottom) with stereo_indication_type of stvi, as illustrated in FIG. 5.

In the case of the delivery, as illustrated in FIG. 14, the box information is illustrated in FIG. 15. FIG. 15 is an explanatory diagram illustrating a filed in the case in which the stereo packing type is 0. Here, projection_format is 1, packing_flag is 0, stereo_packing_type is 0, num_regions is 6, FOV_flag is 1, and center_yaw, center_pitch, object_width, and object_height are −90, 0, 90, 90, respectively. Note that as the field values in FIG. 15, center_yaw, center_pitch, object_width, and object_height, only information regarding the right face of the cube mapping projection is shown.

An angle of view of the projected frame is 1920×1440 which is delivered with the width and height fields in, for example, a track header box (tkhd').

Next, an example of stereo_packing_type=1 (Scheme 2: packing of the L view and the R view for each display region in a frame of a celestial sphere stereoscopic image) will be described.

In this case, the side by side, the top & bottom, or the like is delivered as stereo_indication_type using the stvi box defined in ISOBMFF. A pair of L view and R view in the packed frame is delivered as one region and packing of the side by side, the top & bottom, or the like is transmitted in accordance with stereo_indication_type in the region. In this case, packing_flag=1 is set in administration.

Figure 16:
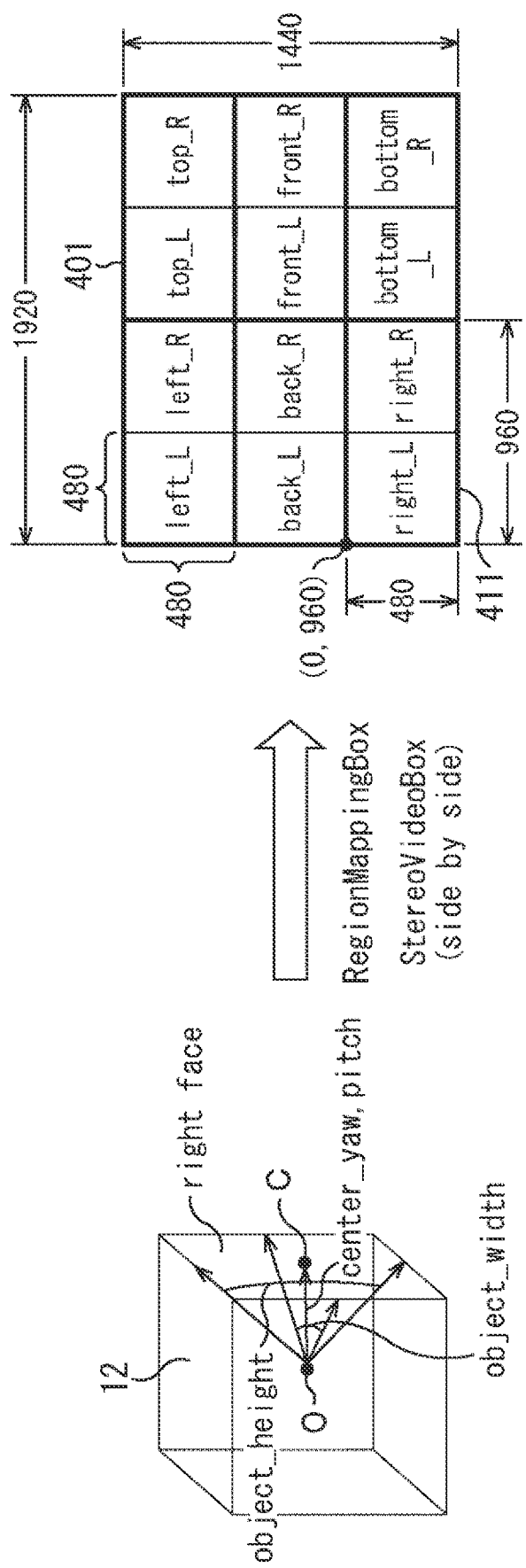
FIG. 16 is an explanatory diagram illustrating packing in a case in which the stereo packing type is 1.

FIG. 16 is an explanatory diagram illustrating packing in a case in which the stereo packing type is 1. In addition, FIG. 17 is an explanatory diagram illustrating a field in the case in which the stereo packing type is 1.

FIG. 16 illustrates an example of the cube mapping projection in the case of stereo_packing_type=1. In this example, a packed frame 401 in which a pair of L view and R view of faces is adjacent side by side is generated from the cube 12 and packing information is delivered with RegionMappingBox. In the packed frame 401, a large region 411 is collectively transmitted as the pair of L view and R view. The side by side is delivered as stereo indication type of stvi.

Information of the fields of RegionMappingBox is illustrated in FIG. 17. Here, projection_format is set to 1, packing_flag is set to 1, stereo_packing_type is set to 1, num_regions is set to 6, and FOV_flag is set to 1. In addition, center_yaw, center_pitch, object_width, and object_height are set to −90, 0, 90, and 90, respectively. In addition, rect_left, rect_top, rect_width, and rect_height are 0, 960, 960, and 480, respectively. Only the field values of the right face are all illustrated. Note that rect_left, rect_top, rect_width, and rect_height are values obtained by packing the L view and the R view in the region 411 (see FIG. 16) side by side. An angle of view of the packed frame is 1920×1440.

Note that each pair of L view and the R view may be encoded as an independent stream and transmitted with a plurality of tracks of ISOBMFF.

Figure 18:
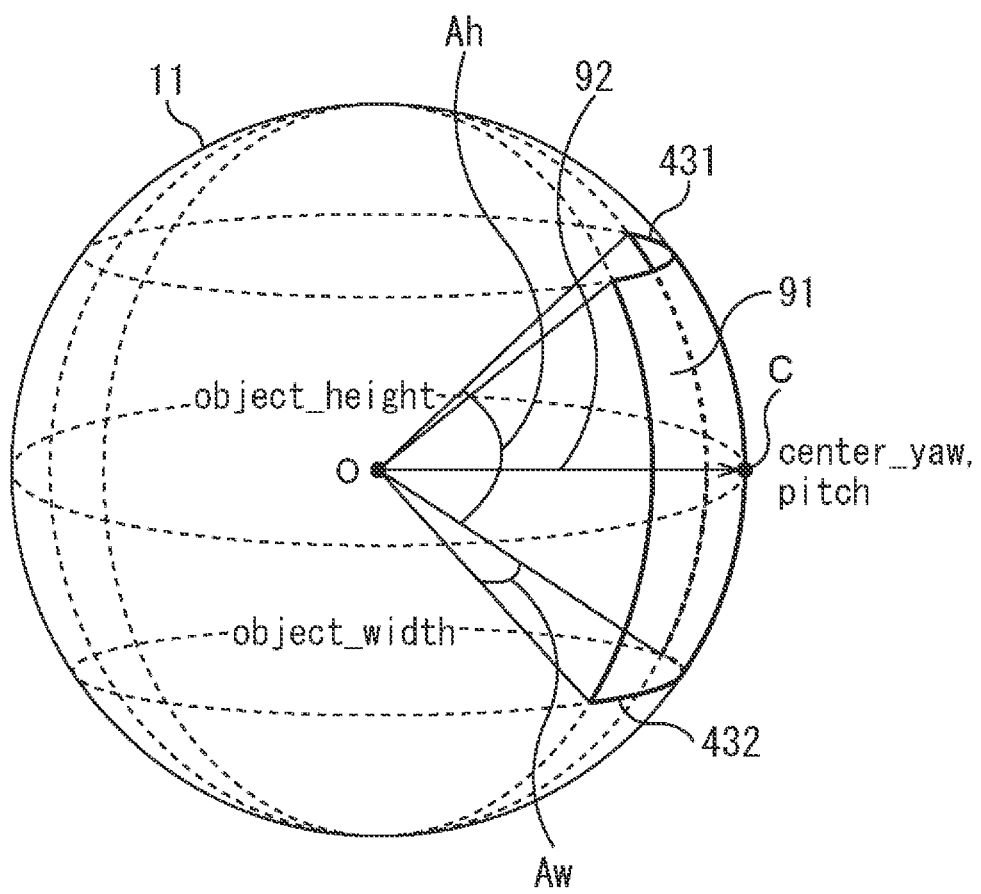
FIG. 18 is an explanatory diagram illustrating projection of equirectangular projection.
Figure 19:
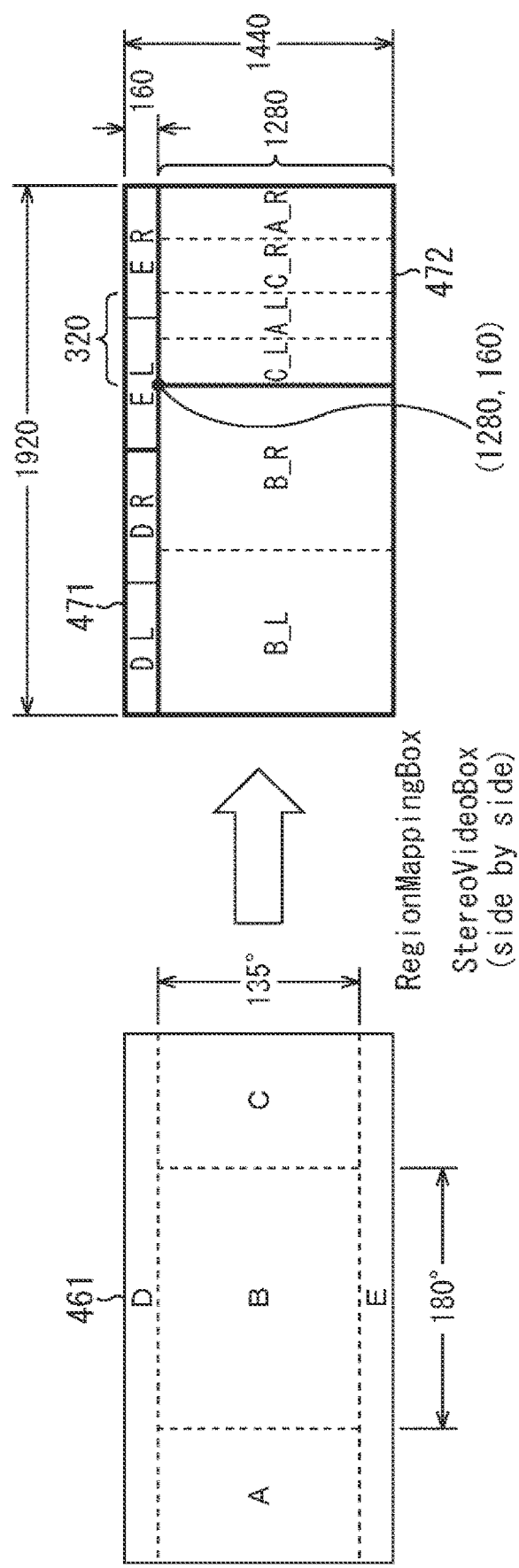
FIG. 19 is an explanatory diagram illustrating packing of projection of the equirectangular projection.

Equirectangular projection can also be used, of course. FIGS. 18 to 20 are diagrams illustrating an example of equirectangular projection in the case of stereo_packing_type=1 in which the syntax of FIG. 8 is used. FIG. 18 is an explanatory diagram illustrating projection of the equirectangular projection. FIG. 19 is an explanatory diagram illustrating packing of the projection of the equirectangular projection. FIG. 20 is an explanatory diagram illustrating a field in a case in which packing is performed by the equirectangular projection.

As illustrated in FIG. 18, an angle Aw when both ends of the bottom side 432 of the surface 91 are viewed from the center O of the sphere 11 is object_width and an angle Ah when the top side 431 and the bottom side 432 of the surface 91 are viewed from the center O of the sphere 11 is object_height. Here, center_yaw and center_pitch are similar to those in the case described with reference to FIG. 10. That is, an angle formed between a perpendicular line 92 drawn from the center O of the sphere 11 to the surface 91 and the x axis (not illustrated) passing through the center O is center_yaw, and an angle formed between the perpendicular line 92 and a horizontal plane including the perpendicular line 92 is center_pitch.

As illustrated in FIG. 19, a projected frame 461 of the equirectangular projection is divided into five regions A, B, C, D, and E. Top and bottom regions (the regions D and E) considered to he unimportant compared to a region near the front face (the region B) are reduced and packed to generate a packed frame 471. The angle of view is 1920×1440. The rear regions (the regions A and C) are collectively packed. That is, in a region 472, the L view of the region C, the L view of the region A, the R view of the region C, and the R view of the region A are disposed sequentially from the left side. These are recorded briefly as C_L, A_L, C_R and A_R in FIG. 19. That is, the front letters thereof represent the regions and the rear letters thereof represent the views.

The regions A and C are divided in the projected frame 461, but are continuous regions in the sphere 11 which the projection structure as a celestial sphere image. Since the regions A and C are regarded as one region, num_regions=4 is set. By collectively packing the regions A and C, it is possible to obtain the advantageous effect that visual line movement is smoothened centering the region B in addition to an encoding efficiency improvement expected by the packing scheme.

As illustrated in FIG. 20, projection_format is set to 0, packing_flag is set to 1, stereo_packing_type is set to 1, num_regions is set to 4, and FOV_flag is set to 0. Here, center_yaw, center_pitch, object_width, and object_height are set to 180, 0, 180, and 135, respectively (the regions A and C). In addition, rect_left, rect_top, rect_width, and rect_height are set to 1280, 160, 640, 1280, respectively (the region 472). Here, rect_width is set to a value at which the L view and the R view are collectively packed side by side as one view in the region 472. An angle of view of the packed frame is 1920×1440.

Figure 23:
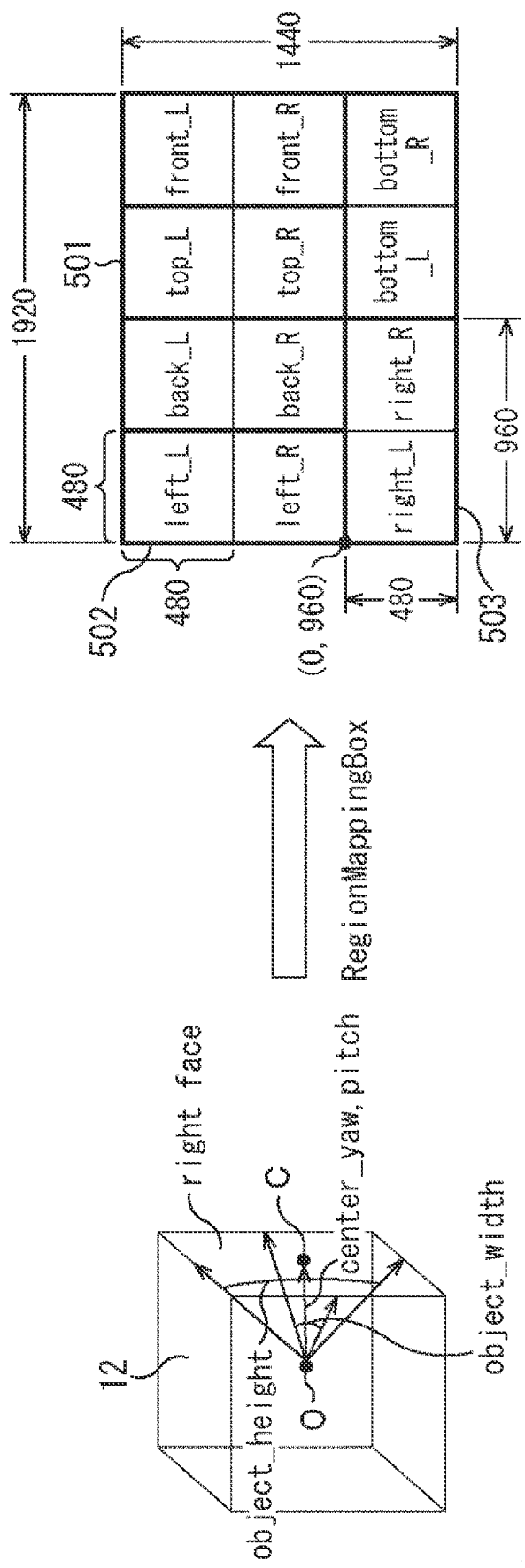
FIG. 23 is an explanatory diagram illustrating a change in packing arrangement.

As a modification example, by using syntax and semantics of FIGS. 21 and 22, as illustrated in FIGS. 23 and 24, it is possible to change packing arrangement (the side by side, the top & bottom, or the like) for each region of the pair of L view and R view. In addition, at this time, delivery of stereo_indication_type by stvi is not performed.

FIG. 21 is a diagram illustrating a configuration example of a region mapping box. FIG. 22 is an explanatory diagram illustrating a field of the region mapping box. In addition, FIG. 23 is an explanatory diagram illustrating a change in the packing arrangement. FIG. 24 is an explanatory diagram illustrating a filed in a case in which the packing arrangement is changed.

The semantics of the fields other than the stereo_packing_type and stereo_indication fields in FIG. 21 is basically similar to the case of FIG. 8. The stereo_packing_type field represents a stereo packing type. As illustrated in FIG. 22, Value 0 thereof means to be monoscopic. Value 1 means packing of the L view and the R view for each frame of the celestial sphere stereoscopic image. Value 2 means packing of the L view and the R view for each region in the frame of the celestial sphere stereoscopic image. Value 3 means packing of the L view and the R view by arbitrary disposition of the region in the frame of the celestial sphere stereoscopic image.

In a case in which stereo_packing_type is 1 or 2, stereo_indication is described. There is the stereo_indication field at the time of stereo_packing_type=1 or 2. When the stereo_indication field is Value 1, a packing method such as the side-by-side or the top & bottom can be delivered for each frame. When the stereo_indication field is Value 2, a packing method such as the side-by-side or the top & bottom can be delivered for each pair of regions of the L view and the R view. As illustrated in FIG. 22, Value 3 of stereo_indication means the packing of the side by side and Value 4 of stereo_indication means the packing of the top & and bottom. The packing arrangement which can be delivered with stereo_indication is not limited to the side-by-side and the top & bottom. As in the modification example, in a case in which delivery by stereo_indication is performed, delivery of stereo_indication_type by stvi may not be performed. At this time, steps related to the stereo video box in FIG. 13 and FIG. 34 (to be described below) are substituted with setting of values of stereo_packing_type and stereo_indication of RegionMappingBox.

Note that in a case in which the packing arrangement is not changed for each pair region of L view and R view, signaling may be performed outside of a for-loop instead of signaling performed with stereo_indication in the for-loop.

In a packed frame 501 of FIG. 23, the left face, the back face, the top face, and the front face are packed in a region 502 by the top & bottom, and the right face and the bottom face is packed side by side in a region 503.

As illustrated in FIG. 24, projection_format is set to 1, packing_flag is set to 1, stereo_packing_type is set to 2, num_regions is set to 6, and FOV_flag is set to 1. Here, center_yaw, center_pitch, object_width, and object_height of the left face are set to 90, 0, 90, and 90, respectively, and stereo_indication is set to 4 (the top & bottom). In addition, rect_left, rect_top, rect_width, and rect_height are set to 0, 0, 480, and 960, respectively.

Here, center_yaw, center_pitch, object_width, and object_height of the right face are set to −90, 0, 90, and 90, respectively, stereo_indication is set to 3 (the side by side), and rect_left, rect_top, rect_width, and rect_height of the right face are set to 0, 960, 960, and 480, respectively. Note that rect_width is set to a value of the region 503 in which the L view and the R view are collectively packed side by side as one view.

In this way, in center_yaw, center_pitch, object_width, object_height, rect_left, sect_top, rect_width, and rect_height, only information regarding the left face and the right face of the cube 12 of the cube mapping projection is described. An angle of view of the packed frame is 1920×1440.

Next, an example of stereo_packing_type=2 (Scheme 3: packing by arbitrary disposition of the L view and the R view of display regions in a frame of a celestial sphere stereoscopic image) will be described.

In this example, the stvi box defined in ISOBMFF is not used. The L view and the R view of each region are disposed arbitrarily in the packed frame to be transmitted. In this case, packing_flag=1 is set in administration.

Figure 25:
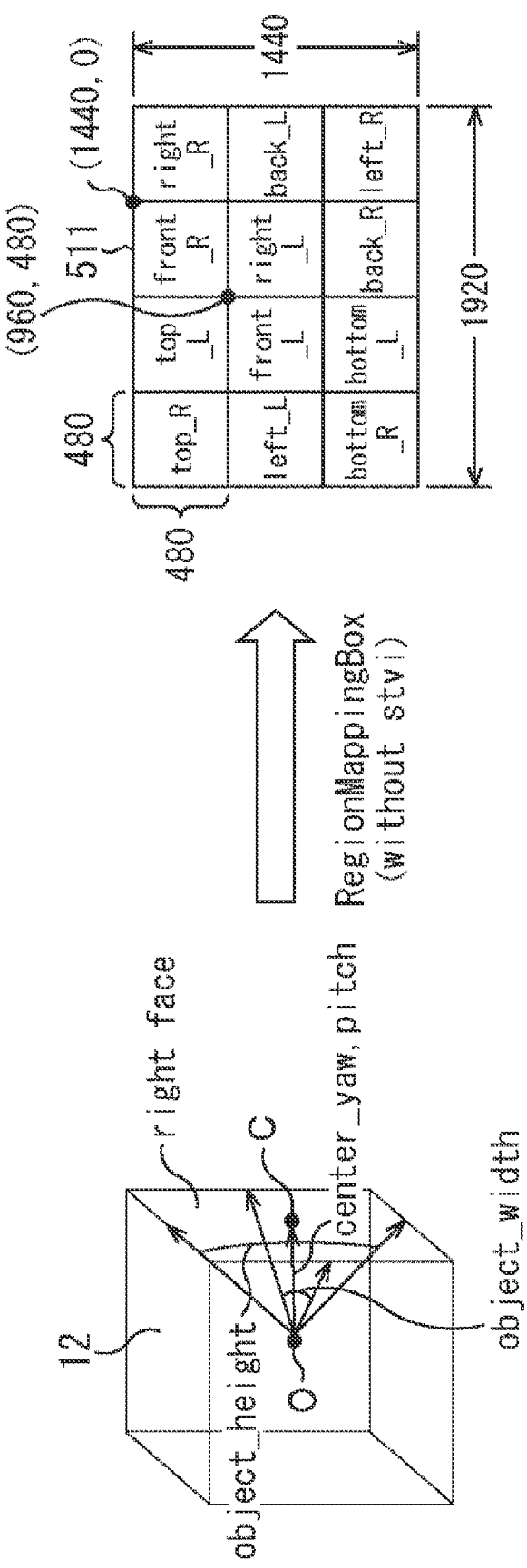
FIG. 25 is an explanatory diagram illustrating packing in a case in which the stereo packing type is 2.

FIG. 25 is an explanatory diagram illustrating packing in a case in which the stereo packing type is 2. FIG. 26 is an explanatory diagram illustrating a field in the case in which the stereo packing type is 2.

In the example of the cube mapping projection in the case of stereo_packing_type=2 of FIG. 25, the L view image and the R view image of each face of the cube 12 are disposed at arbitrary positions and a packed frame 511 is generated and transmitted. Then, packing information is delivered with RegionMappingBox. Note that FIG. 26 illustrates an example of only the right face of the cube mapping projection.

In the example of FIG. 26, projection_format is set to 1, packing_flag is set to 1, stereo_packing_type is set to 2, num_regions is set to 6, and FOV_flag is set to 1. Here, center_yaw, center_pitch, object_width, and object_height of the right face are set to −90, 0, 90, and 90, respectively. In addition, rect_left, rect_top, rect_width, and rect_height of the L view of the right face are set to 960, 480, and 480, respectively, and rect_left_r, rect_top_r, rect_width_r, and rect_height_r of the R view are set to 1440, 0, 480, and 480, respectively. An angle of view of the packed frame is 1920×1440.

As a modification example, when using syntax and semantics of FIGS. 27 and 28 are used, it is possible to cause a monoscopic image and a stereoscopic image to be mixed for each region. FIG. 27 is a diagram illustrating a configuration example of the region mapping box. FIG. 28 is an explanatory diagram illustrating a field of the region mapping box.

The configuration of RegionMappingBox in FIG. 27 is basically similar to the case illustrated in FIG. 8. In the case of the example of FIG. 8, when stereo_packing_flag=2, rect_width_r, rect_height_r, rect_left_r, and rect_top_r are described. On the other hand, in the case of the example of FIG. 27, after mono_region is described, they are described when mono_region is not 1. As illustrated in FIG. 28, a region in which mono_region is 0 is stereoscopic and a region in which mono_region is 1 is monoscopic. The fields other than the mono_region field are similar to the case of FIG. 8.

For example, in the cube mapping projection, a packed frame in which only the top face and the bottom face are monoscopic and the other faces are stereoscopic can be generated and delivered with RegionMappingBox. At this time, by setting images in the horizontal direction important (the front face, the left face, the back face, and the right face in the cube mapping projection) in a celestial sphere image to be stereoscopic and setting the relatively unimportant top face and bottom face to be monoscopic, it is possible to obtain the advantageous effect of reducing a transmission capacity and improving the resolution of a video in the horizontal direction.

Further, as a modification example, when the syntax and semantics of FIGS. 29 and 30 are used, the packed frame can have regions for three or more views in addition to the L view and the R view with regard to one region of the projected frame. FIG. 29 is a diagram illustrating a configuration example of the region mapping box. FIG. 30 is an explanatory diagram illustrating a field of the region mapping box.

Note that semantics other than the semantics of the fields stated in FIGS. 29 and 30 are similar to the case of FIG. 8. In FIG. 29, rect_width_av, rect_height_av, rect_left_av, and rect_top_av are described instead of rect_width_r, rect_height_r, rect_left_r, and rect_top_r in FIG. 8.

As illustrated in FIG. 30, stereo_packing_type represents a stereo packing type and Value 0 thereof means packing for each frame using the side by side, the top & bottom, or the like. Value 1 thereof means packing of the L view and the R view for each region in a frame of a celestial sphere stereoscopic image. That is, Value 1 means the packing illustrated in FIG. 6. Value 2 means packing by arbitrary disposition of a plurality of views in regions in a frame of a celestial sphere stereoscopic image. That is, Value 2 means the packing illustrated in FIG. 7. Here, num_additional_view indicates the number of views for each region. A total number of views is num_additional_view+1.

Here, rect_width_av, rect_height_av, rect_left_av, and rect_top_av mean a width, a height, an x coordinate, and a y coordinate of a region of an additional view in the packed frame, respectively.

For example, by providing a center view in addition to the L view and the R view in the cube mapping projection, it is possible to use the center view at the time of monoscopic display by using the L view and the R view in the case of stereoscopic display. Note that, by extending stereo_indication_type of stvi, implementation is possible even in the cases of stereo_packing_type=0 and 1.

The example in which information regarding the positions and the sizes of the regions in the projected frame is expressed in a spherical coordinate system has been described above, but the information may be expressed in a 2-dimensional coordinate system. For example, an example in which a position and a size of a region in a projected frame are expressed in a 2-dimensional coordinate system in the syntax and semantics of FIGS. 8 and 9 is illustrated in FIGS. 31 and 32. FIG. 31 is a diagram illustrating a configuration example of the region mapping box. FIG. 32 is an explanatory diagram illustrating a field of the region mapping box. Note that semantics other than the semantics of the fields stated in FIGS. 31 and 32 is similar to the case illustrated in FIGS. 8 and 9.

In the example of FIG. 31, FOV_flag in the example of FIG. 8 is omitted and pf_region_width, pf_region_height, pf_region_left, and pf_region_top are used instead of center_yaw; center_pitch, object_width, and object_height in FIG. 8. As illustrated in FIG. 32, pf_region_width, pf_region_height, pf_region_left, and pf_region_top mean a width, height, an x coordinate, and a y coordinate of a region in the projected frame, respectively.

In addition, the cube mapping projection or the equirectangular projection have been described above as the examples, but correspondence to other projection types (for example, truncated square pyramid, a cylinder, and the like) is also possible.

Further, in the examples of stereo_packing_type=0 and 1 (the examples of FIGS. 14 and 15 or FIGS. 16 and 17), the cases in which stereo_indication_type of stvi is the side by side, the top & bottom, and the like have been described. However, correspondence to other column interleaving, row interleaving, checker board, or the like is also possible. The packed views are not limited to the L view and the R view. For example, another view such as a center view may be used.

<Reproduction Device (FIGS. 33 and 34)>

Next, a configuration example of the reproduction device 214 will be described. FIG. 33 is a block diagram illustrating a configuration example of the reproduction device. The reproduction device 214 includes a file acquisition unit 601, a stream extraction unit 602, a decoder 603, a projected frame generation unit 604, a mapping processing unit 605, a drawing unit 606, a reception unit 607, a visual line detection unit 608, and a camera 214A.

The file acquisition unit 601 acquires a reproduction target file from the delivery server 213 in FIG. 11. The stream extraction unit 602 extracts a video stream from the file acquired by the file acquisition unit 601. The decoder 603 decodes the video stream extracted by the stream extraction unit 602. The projected frame generation unit 604 generates a projected frame from image data decoded by the decoder 603.

The mapping processing unit 605 maps a celestial sphere image supplied from the projected frame generation unit 604 as a texture to each of six faces of the cube 12 on the basis of mapping information.

The drawing unit 606 generates an image with a visual field range of a viewer as a display image by performing projective projection on a 3D model image supplied from the mapping processing unit 605 to the visual field range of the viewer by setting a viewing position supplied from the visual line detection unit 608 as a focus. The drawing unit 606 supplies the display image to the head-mounted display 215.

The reception unit 607 receives a detection result of the gyro sensor 215B in FIG. 11 from the head-mounted display 215 and supplies the detection result to the visual line detection unit 608.

The visual line detection unit 608 decides a visual line direction of the viewer on a coordinate system of a 3D model on the basis of the detection result of the gyro sensor 215B supplied from the reception unit 607. In addition, the visual line detection unit 608 acquires a photographed image of the marker 215A from the camera 214A and detects a viewing position on the coordinate system of the 3D model on the basis of the photographed image. The visual line detection unit 608 decides a visual field range of the viewer on the coordinate system of the 3D model on the basis of the viewing position and the visual line direction on the coordinate system of the 3D model. The visual line detection unit 608 supplies the visual field range and the viewing position of the viewer to the drawing unit 606.

Next, an operation of the reproduction device 214 will be described with reference to FIG. 34. FIG. 34 is an explanatory flowchart illustrating a reproduction process. The file acquisition unit 601 acquires a reproduction target file from the delivery server 213 in FIG. 11.

In step S51, the file acquisition unit 601 determines which type of stereo_packing_type of RegionMappingBox is. That is, it is determined whether the stereo packing scheme is Scheme 1 (stereo_packing_type=0), Scheme 2 (stereo_packing_type=1), or Scheme 3 (stereo_packing_type=2). In a case in which the stereo packing scheme is Scheme 1 (stereo_packing_type=0), the process proceeds to step S52. In a case in which the stereo packing scheme is Scheme 2 (stereo_packing_type=1), the process proceeds to step S70. In addition, in a case in which the stereo packing scheme is Scheme 3 (stereo_packing_type=2), the process proceeds to step S77.

In step S52, the file acquisition unit 601 determines whether there is StereoVideoBox. In a case in which the file acquisition unit 601 determines that there is StereoVideoBox, the file acquisition unit 601 determines which type packing flag is in step S53. That is, it is determined whether the packing flag is 0 (the region-wise packing is not used) or 1 (the region-wise pacing is used). A stream based on a determination result is extracted by the stream extraction unit 602 and is supplied to the decoder 603.

In a case in which the packing flag is 1 (a case in which the region-wise pacing is used), the decoder 603 decodes the image frame in step S54. In step S55, the projected frame generation unit 604 generates a projected frame of the L view and the R view from the packing information of StereoVideoBox and RegionMappingBox.

In step S56, the mapping unit 605 maps the L view image and the R view image as the celestial sphere stereoscopic image to the projection structure. In addition, the drawing unit 606 renders the image in a direction corresponding to a visual line on the basis of the visual line information from the visual line detection unit 608 and supplies the image to the head-mounted display 215 to cause the image to be displayed.

In step S57, the drawing unit 606 determines whether the final image frame is processed. In a case in which the final image frame is not processed, the process returns to step S54 and the processes of steps S54 to S56 are repeated. In a case in which it is determined that the final image frame is processed, the process ends.

In a case in which it is determined in step S53 that the packing flag is 0 (the region-wise packing is not used), the decoder 603 decodes the image frame in step S58. In step S59, the projected frame generation unit 604 generates the projected frame of the L view and the R view from the information of StereoVideoBox.

In step S60, the mapping unit 605 maps the L view image and the R view image as the celestial sphere stereoscopic image to the projection structure. The drawing unit 606 renders the image in a direction corresponding to a visual line on the basis of the visual line information from the visual line detection unit 608 and supplies the image to the head-mounted display 215 to cause the image to be displayed.

In step S61, the drawing unit 606 determines whether the final image frame is processed. In a case in which the final image frame is not processed, the process returns to step S58 and the processes of steps S58 to S60 are repeated. In a case in which it is determined that the final image frame is processed, the process ends.

In a case in which it is determined in step S52 that there is no StereoVideoBox, the file acquisition unit 601 determines which type the packing flag is in step S62. That is, it is determined whether the packing flag is Value 0 (the region-wise packing is not used) or Value 1 (the region-wise packing is used). A stream based on a determination result is extracted by the stream extraction unit 602 and is supplied to the decoder 603.

In a case in which the packing flag is 1 (a case in which the region-wise pacing is used), the decoder 603 decodes the image frame in step S63. In step S64, the projected frame generation unit 604 generates a projected frame from the packing information of RegionMappingBox.

In step S65, the mapping unit 605 maps the projected frame as the celestial sphere monoscopic image to the projection structure. The drawing unit 606 renders the image in a direction corresponding to a visual line on the basis of the visual line information from the visual line detection unit 608 and supplies the image to the head-mounted display 215 to cause the image to be displayed.

In step S66, the drawing unit 606 determines whether the final image frame is processed. In a case in which the final image frame is not processed, the process returns to step S63 and the processes of steps S63 to S65 are repeated. In a case in which it is determined that the final image frame is processed, the process ends.

In a case in which it is determined in step S62 that the packing flag is 0 (the region-wise packing is not used), the decoder 603 decodes the image frame in step S67.

In step S68, the mapping unit 605 maps the projected frame as the celestial sphere monoscopic image to the projection structure. The drawing unit 606 renders the image in a direction corresponding to a visual line on the basis of the visual line information from the visual line detection unit 608 and supplies the image to the head-mounted display 215 to cause the image to be displayed.

In step S69, the drawing unit 606 determines whether the final image frame is processed. In a case in which the final image frame is not processed, the process returns to step S67 and the processes of steps S67 and S68 are repeated. In a case in which it is determined that the final image frame is processed, the process ends.

In a case in which it is determined in step S51 that the stereo packing scheme is Scheme 2 (stereo_packing_type=1), the file acquisition unit 601 determines whether there is StereoVideoBox is in step S70. In a case in which the file acquisition unit 601 determines that there is StereoVideoBox, the file acquisition unit 601 determines which type packing flag is in step S71. That is, it is determined whether the packing flag is Value 0 (the region-wise packing is not used) or Value 1 (the region-wise pacing is used). A stream based on a determination result is extracted by the stream extraction unit 602 and is supplied to the decoder 603.

In a case in which the packing flag is 1 (a case in which the region-wise pacing is used), the decoder 603 decodes the image frame in step S72. In step S73, the projected frame generation unit 604 acquires the packing information of StereoVideoBox and RegionMappingBox, and then generates a projected frame of the L view and the R view.

In step S74, the mapping unit 605 maps the projected frame of the L view and the R view as the celestial sphere stereoscopic image to the projection structure. The drawing unit 606 renders the image in a direction corresponding to a visual line on the basis of the visual line information from the visual line detection unit 608 and supplies the image to the head-mounted display 215 to cause the image to be displayed.

In step S75, the drawing unit 606 determines whether the final image frame is processed. In a case in which the final image is not processed, the process returns to step S72 and the processes of steps S72 to S74 are repeated. In a case in which it is determined that the final image frame is processed, the process ends.

In a case in which it is determined in step S70 that there is no StereoVideoBox and a case in which it is determined in step S71 that the packing flag is 0 (the region-wise packing is not used), the file acquisition unit 601 ends the process in step S76 since the acquired file is an unauthorized file.

In a case in which it is determined in step S51 that the stereo packing scheme is Scheme 3 (stereo_packing_type=2), the file acquisition unit 601 determines which type the packing flag is in step S77. That is, it is determined whether the packing flag is Value 0 (the region-wise packing is not used) or Value 1 (the region-wise pacing is used). A stream based on a determination result is extracted by the stream extraction unit 602 and is supplied to the decoder 603.

In a case in which the packing flag is 1 (a case in which the region-wise pacing is used), the decoder 603 decodes the image frame in step S78. In step S79, the projected frame generation unit 604 generates a projected frame of the L view and the R view from the packing information of RegionMappingBox.

In step S80, the mapping unit 605 maps the projected frame of the L view and the R view as the celestial sphere stereoscopic image to the projection structure. The drawing unit 606 renders the image in a direction corresponding to a visual line on the basis of the visual line information from the visual line detection unit 608 and supplies the image to the head-mounted display 215 to cause the image to be displayed.

In step S81, the drawing unit 606 determines whether the final image frame is processed, in a case in which the final image is not processed, the process returns to step S78 and the processes of steps S78 to S80 are repeated. In a case in which it is determined that the final image frame is processed, the process ends.

In a case in which it is determined in step S77 that the packing flag is 0 (the region-wise packing is not used), the file acquisition unit 601 ends the process in step S82 since the acquired file is an unauthorized file.

Delivery of Property Information of Celestial Sphere Stereoscopic Image Packing (FIGS. 35 to 37)>

The property information regarding the stereo packing scheme according to the present technology can be collectively delivered as VR Information Box, as illustrated in FIGS. 35 and 36. VR Information Box is disposed, for example, at the time of SchemeType='vrif' below Scheme Information Box (schi') defined in ISOBMFF, but the present technology is not limited to the disposition at that location.

FIG. 35 is a diagram illustrating a configuration example of a VR information box. FIG. 36 is an explanatory diagram illustrating a field of the VR information box. As illustrated in FIG. 35, projection_format, stereo_packing_type, coordinate_system are described in VR Information Box.

As illustrated in FIG. 36, projection_format represents a projection type, Value 0 thereof means equirectangular projection, and Value 1 means the cube mapping projection. Here, stereo_packing type is similar to the case of FIG. 9. That is, stereo_packing_type represents a stereo packing type and Value 0 thereof conforms to stereo_indication_type of stvi. When there is no stvi, stereo_packing_type means to be monoscopic. In a case in which there is stvi, stereo_packing_type means packing for each frame in which the side by side, the top & bottom, or the like is used, that is, stereo packing type means the packing illustrated in FIGS. 3 and 4. Value 1 of stereo_packing_type means packing of the L view and the R view for each display region in a frame of a celestial sphere stereoscopic image and Value 2 means packing in accordance with arbitrary disposition of the L view and the R view of display regions in the frame of the celestial sphere stereoscopic image.

Here, coordinate system represents a coordinate system of region expression of the projection structure and the projected frame, Value 0 thereof means a 2-dimensional coordinate system, and Value 1 thereof means a spherical coordinate system.

The reproduction device 214 can collectively acquire information regarding a celestial sphere image with reference to VR Information Box before content reproduction. That is, it is possible to collectively acquire which type of stereo packing is used and whether the position and the size of a region are expressed on the 2-dimensional coordinate system of a projected frame or expressed on the spherical coordinate system of the projection structure.

Note that the information stored in VR Information Box is not limited to the stereo packing type or the position and the coordinate system information of the size of the region of the projected frame, is not limited to the information regarding the celestial sphere image, and information regarding audio, subtitles, or the like may be stored.

The example of ISOBMFF has been described above, but the present technology can also be applied to delivery using MEPG-DASH (ISO/IEC 23009-1). FIG. 37 is a diagram illustrating an example of an MPD file to which DASH is applied. The fact that the frame packing type is 3 (the side by side) is delivered with EssentialProperty of schemeIdUri="urn: mpeg: mpegB: cicp: VideoFramePackingType" in each AdaptationSet in FIG. 37. Here, value="cube" of EssentialProperty of schemeIdUri="urn: mpeg: dash: vr: ProjectionType" indicates that the celestial sphere image is formed by cube projection mapping. Further, a stereo packing type is delivered by EssentialProperty of schemeIdUri="urn: mpeg: dash: vr: StereoPackingType" in the second AdaptationSet. A value in EssentialProperty has the same semantics as stereo_packing_type.

In the first AdaptationSet, packing of the side by side for each frame similar to that of the related art is delivered. Note that the fact that the stereo packing type is "0" (packing for each frame) may be explicitly delivered using SupplementalProperty of schemeIdUri="urn: mpeg: dash: vr: StereoPackingType" in this AdaptationSet.

In the second AdaptationSet, the stereo packing type is "1" and the packing of the side by side for each region of the packed frame is delivered in conjunction with the frame packing type. A DASH client can perform reproduction by selecting and acquiring AdaptationSet and Representation, for example, in accordance with the stereo packing type corresponding to the DASH client.

Note that a DASH client which does not correspond to schemeIdUri of EssentialProperty has to ignore AdaptationSet (or Representation or the like in some cases) in which this property is written. In addition, a DASH client which does not correspond to schemeIdUri of SupplementalProperty may ignore the property value and use Adaptation thereof (Representation or the like in some cases).

Further, in the case of stereo_packing_type=1 (Scheme 2: packing of the L view and the R view for each display region in a frame of a celestial sphere stereoscopic image), each pair of L view and R view can be encoded as an independent stream. Then, the stream may be stored in a single track of ISOBMFF and may be transmitted by MPEG-DASH (ISO/TEC 23009-1).

The present technology is not limited to the delivery of the stereo packing type by SupplementalProperty of schemeIdUri="urn: mpeg: dash: vr: StereoPackingType," and information can be delivered with a DASH MPD file by SupplementalProperty or EssentialProperty. For example, whether or not content referred to in Representation uses the region-wise packing and whether region information in the projection structure/projected frame is expressed on a 2-dimensional coordinate system or expressed on the spherical coordinate system can be delivered. In addition, in a case in which the region-wise packing is used, the packing information can be delivered with a DASH MPD file. Of course, other information can be further described in the DASH MPD file.

The image processing has been mainly described above, but sound information is also delivered along with the image information.

<Sub-Picture Tracking (FIGS. 38 to 74)>

In the above-described example, a celestial sphere stereoscopic image is stored on one track. FIG. 38 is an explanatory diagram illustrating a celestial sphere stereoscopic image stored on one track, in the example of FIG. 38, a packed frame illustrated on the right side of the drawing is generated by disposing the L view images and the R view images illustrated on the left side side by side and performing the region-wise packing on images of six faces on each of the right and left sides from the projected frame formed by the frame packing.

The packed frame includes 4×3 regions. In the packed frame, the images of left_L, back_L, and right_L are disposed on the leftmost column, the images of left_R, back_R, and right_R are disposed on the right column thereof, the images of top_L, front_L, and bottom_L are disposed on the right column thereof, and the images of top_R, front_R, and bottom_R are disposed on the rightmost column thereof. The packed frame is stored on one track. Note that the track is a unit in which independent audio video (AV) data is managed.

Figure 39:
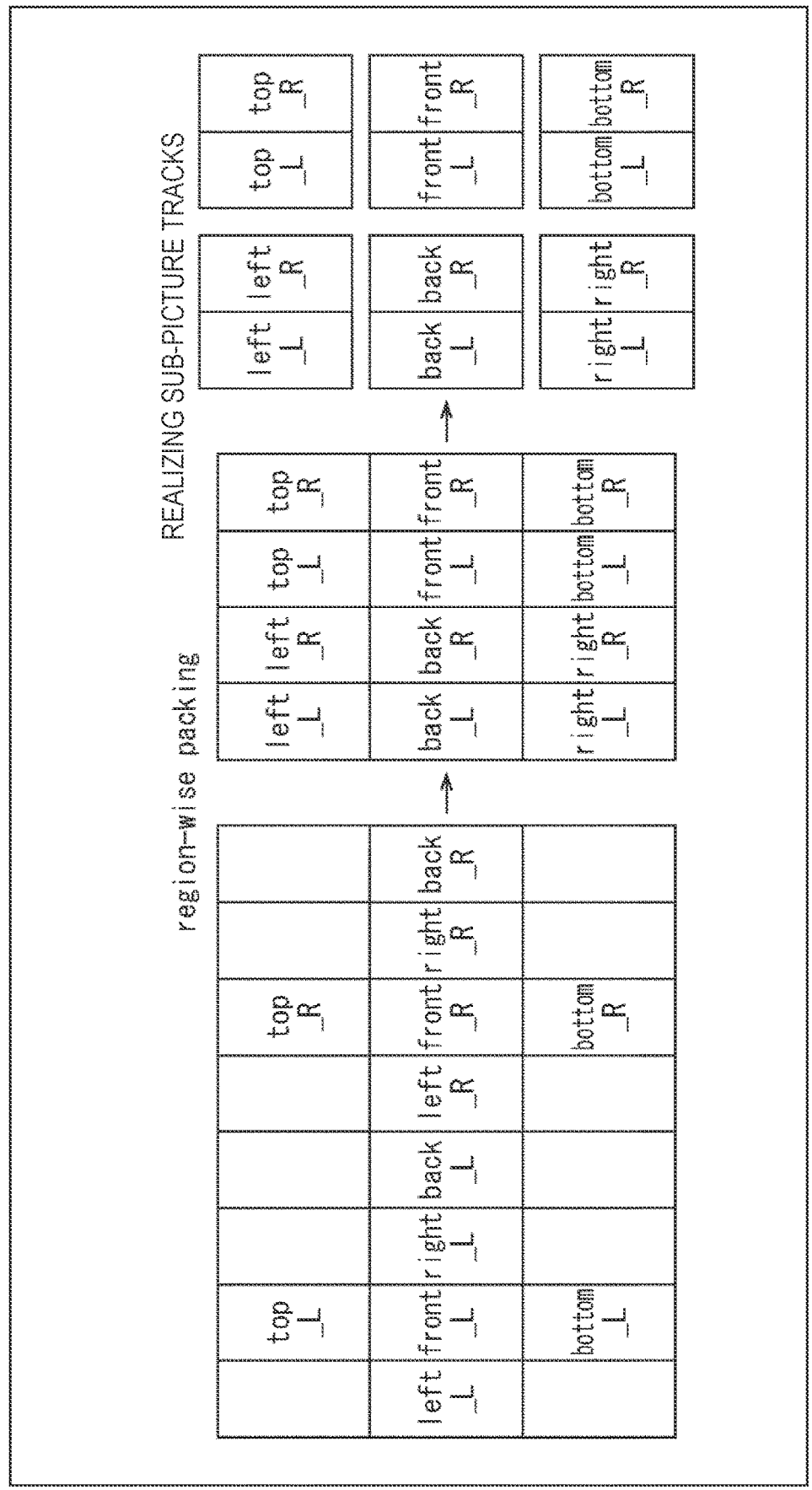
FIG. 39 is an explanatory diagram illustrating a celestial sphere stereoscopic image stored on a plurality of tracks.

In contrast, the celestial sphere stereoscopic image can be divided and stored on a plurality of tracks. FIG. 39 is an explanatory diagram illustrating a celestial sphere stereoscopic image stored on a plurality of tracks. As illustrated in FIG. 39, a packed frame including 4×3 regions and illustrated in the middle of the drawing is generated by performing the region-wise packing on images of six faces on each of the right and left sides of a projected frame in which an L view image and an R view image are disposed side by side, as illustrated on the leftmost side of the drawing. Further, the packed frame is partitioned into sub-picture tracks. In this example, the images of the six faces formed by pairs (that is, stereo pairs) of L view images and R view images of which display regions match are each divided to the six tracks to be stored.

As types of images stored in the sub-picture track, there are images for which stereoscopic reproduction is possible and images for which only monoscopic reproduction is possible. The images of the sub-picture tracks which can be reproduced stereoscopically are illustrated in FIG. 39. That is, in this example, the images of six faces (top, left, front, right, back, and bottom) formed by the pairs of L view images and R view images of which the display regions match are each divided to the six tracks to be stored. That is, the images of left_L and left_R, top_L and top_R, back_L and back_R, front_L and front_R, right L and right_R, and bottom_L and bottom_R are each divided to the six tracks to be stored.

Figure 40:
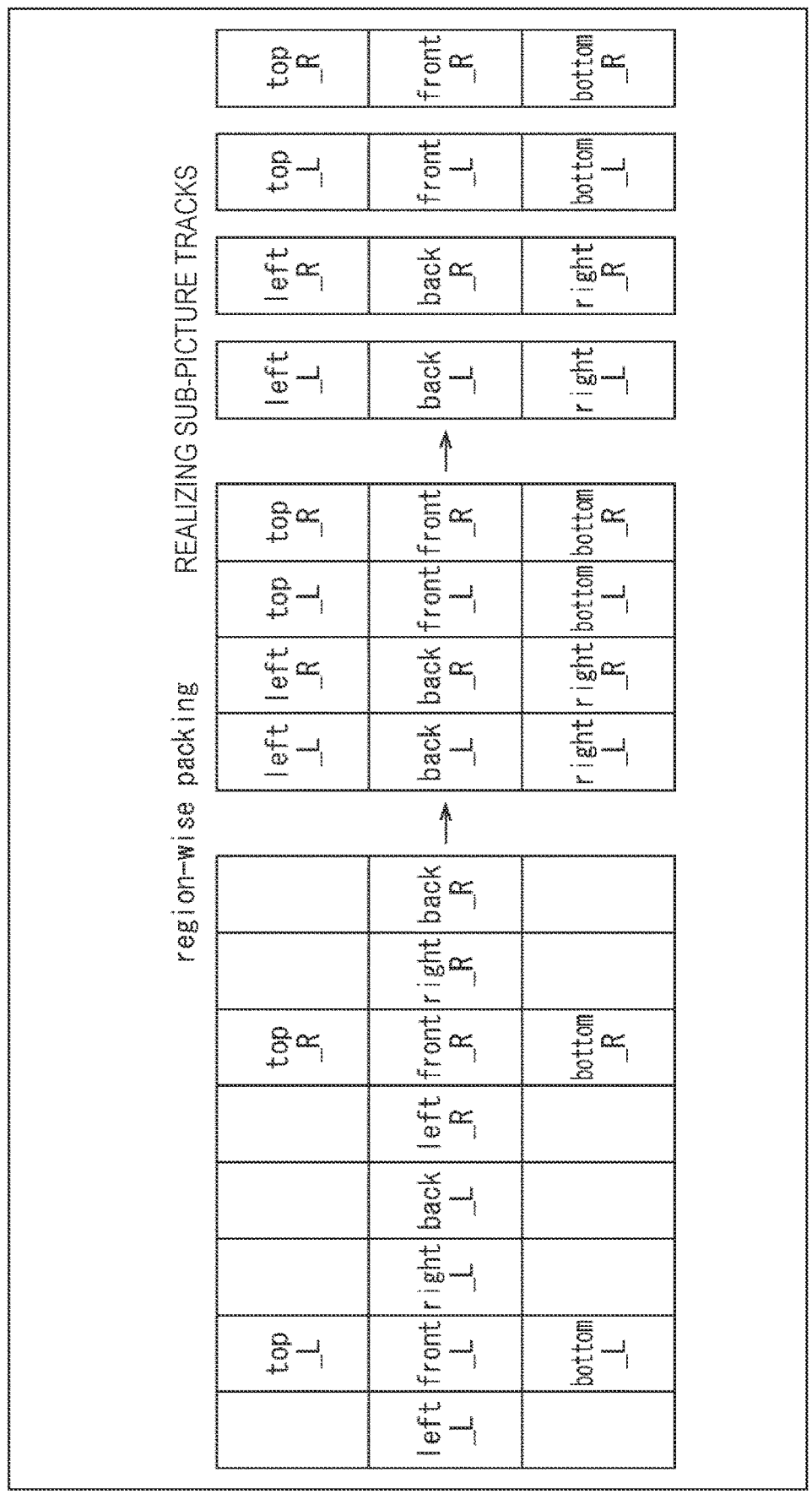
FIG. 40 is an explanatory diagram illustrating images of sub-picture tracks for which only monoscopic reproduction is possible.

On the other hand, the images of the sub-picture tracks for which only monoscopic reproduction is possible are illustrated in FIG. 40. FIG. 40 is an explanatory diagram illustrating images of sub-picture tracks for which only monoscopic reproduction is possible. Similarly to the case illustrated in FIG. 39, a packed frame including 4×3 regions, as illustrated in the middle of the drawing, is generated by performing the region-wise packing on images of six faces on each of the right and left sides of a projected frame, as illustrated on the leftmost side of the drawing. In the example of FIG. 40, images configured by only the L view images in the packed frame, that is, images configured by left_L, back_L, and right_L and images configured by top_L, front_L, and bottom_L, are each stored in different tracks. Similarly, images configured by only the R view images, that is, images configured by left_R, back_R, and right_R and images configured by top_R, front_R, and bottom_R are each stored in different tracks. Note that this can also be realized even in a case in which the region-wise packing is not performed.

Two region-wise packing methods for realizing sub-picture tracks will be described below.

In the first region-wise packing method for realizing sub-picture tracks, a celestial sphere stereoscopic image is divided for each stereo_packing_type and stored in sub-picture tracks. That is, to realize the sub-picture tracks, the region-wise packing is performed using stereo_packing_type.

Specifically, in a case in which sub-picture tracks in which stereo pairs are stored are configured, the region-wise packing of Value 1 of stereo_packing_type is performed.

Figure 41:
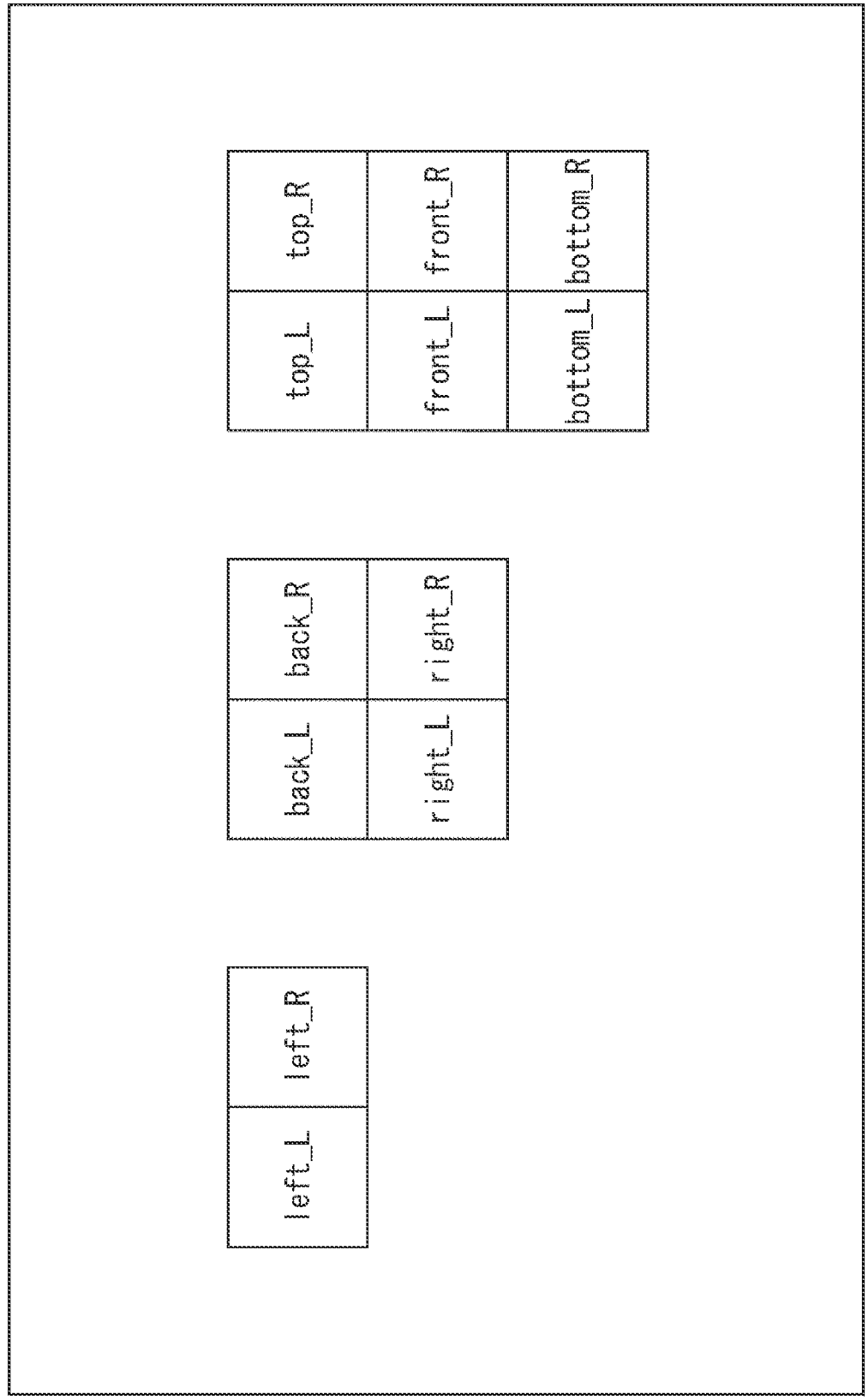
FIG. 41 is a diagram illustrating an example of sub-picture tracks in a case in which a stereoscopic packing type is 1.

FIG. 41 is a diagram illustrating an example of sub-picture tracks in a case in which a stereoscopic packing type is 1. In this example, images formed by one stereo pair of left_L and left_R, images formed by two stereo pairs of back_L, back_R, right_L, and right_R, and images formed by three stereo pairs of top_L, top_R, front_L, front_R, bottom_L, and bottom_R are each stored in three different tracks (sub-picture tacks).

As illustrated in FIG. 41, in a case in which the sub-picture tracks in which the stereo pairs are stored are configured, a value of stereo_packing_type is 1. For example, the region-wise packing illustrated in A of FIG. 6 is performed. In the packed frame illustrated in A of FIG. 6, one stereo pair of left_L and left_R stored in one sub-picture track is disposed to be adjacent and two stereo pairs of back_L and back_R, right_L, and right_R stored in one sub-picture track are disposed to be adjacent. Further, three stereo pairs of top_L and top_R, front_L and front_R, bottom_L, and bottom_R stored in one sub-picture track are disposed to be adjacent.

In this way, in a case in which the sub-picture tracks in which the stereo pairs are stored are configured, the region-wise packing is performed so that the stereo pairs, that is, the L view image and the R view image of which the display regions are identical, are adjacent and the stereo pairs stored in the sub-picture tracks are further disposed to be adjacent. Thus, the stereo pairs can be divided, as it stands, and the sub-picture tracks illustrated in FIG. 41 can be realized.

On the other hand, in a case in which only the L view images or only the R view images are stored in the sub-picture track, stereo_packing_type=0 or stereo_packing_type=2 is set in the region-wise packing. Alternatively, the region-wise packing may not be applied.

Figure 42:
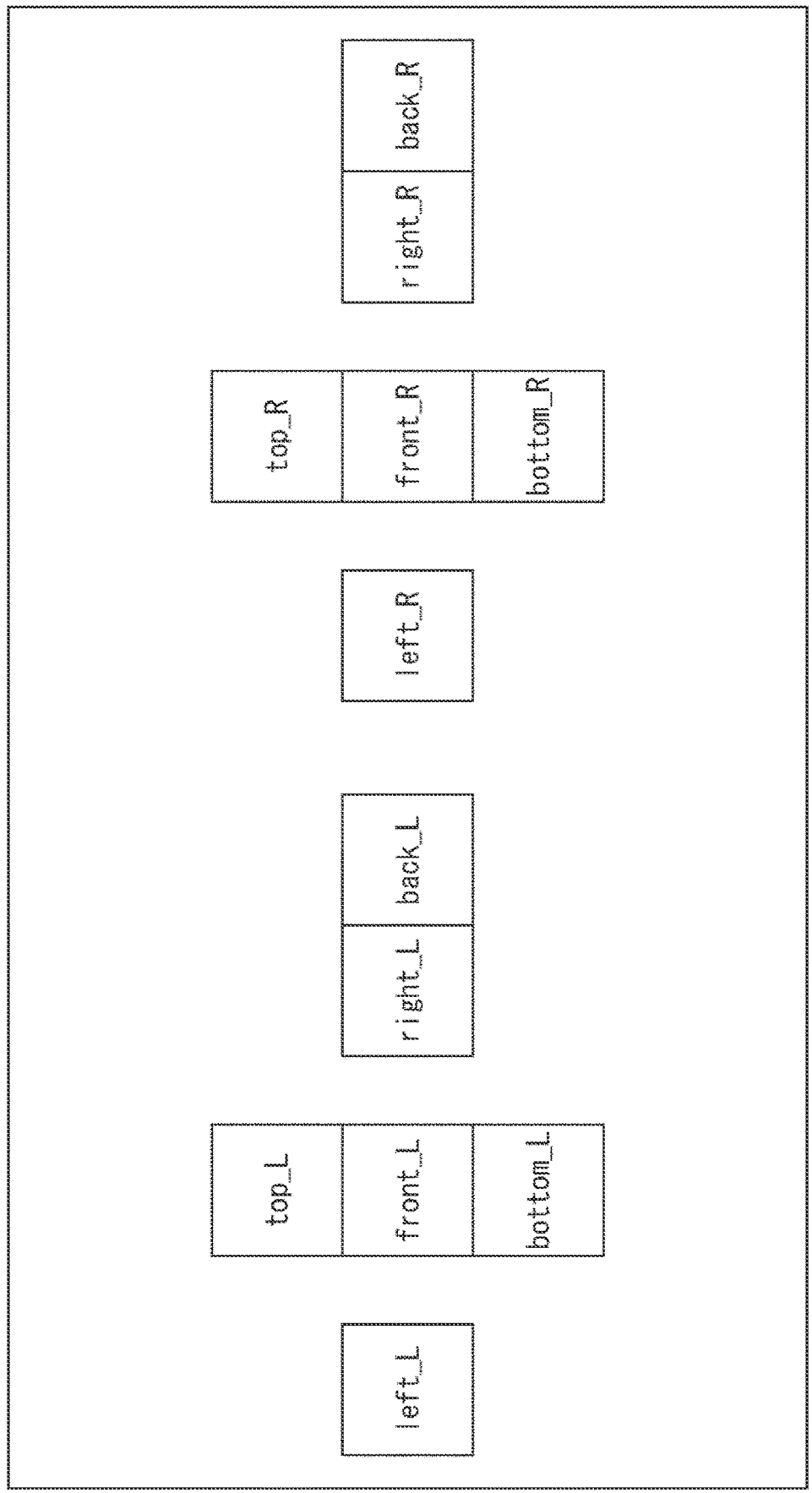
FIG. 42 is a diagram illustrating an example of sub-picture tracks in a case in which the stereoscopic packing type is 0.

FIG. 42 is a diagram illustrating an example of sub-picture tracks in a case in which the stereoscopic packing type is 0. In this example, an image of left_L, images of top_L, front_L, and bottom_L, images of right_L and back_L, an image of left_R, images of top_R, front_R, and bottom_R, and images of right_R and back_R are each stored in six sub-picture tracks.

As illustrated in FIG. 42, in a case in which the sub-picture tracks in which only the images of the L view images or the R view images are configured, for example, the region-wise packing in which a value of stereo_packing_type is 0 and which is illustrated in A of FIG. 3 is performed. In a packed frame illustrated in A of FIG. 3, the images of top_L, front_L, and bottom_L stored in one sub-picture track are disposed to be adjacent in the second column from the left and the images of top_R, front_R, and bottom_R stored in one sub-picture track are disposed to be adjacent in the third column from the right. The images of right_L and back_L stored in one sub-picture track are disposed to be adjacent in the third and fourth columns of the middle row and the images of right_R and back_R stored in one sub-picture track are disposed to be adjacent in the second and first columns from the right of the middle row. Further, the image of left_L stored in one sub-picture track is disposed in the first column from the left of the middle row and the image of left_R stored in one sub-picture track is disposed in the fifth column from the left of the middle row. Thus, the sub-picture tracks illustrated in FIG. 42 can be realized.

Figure 43:
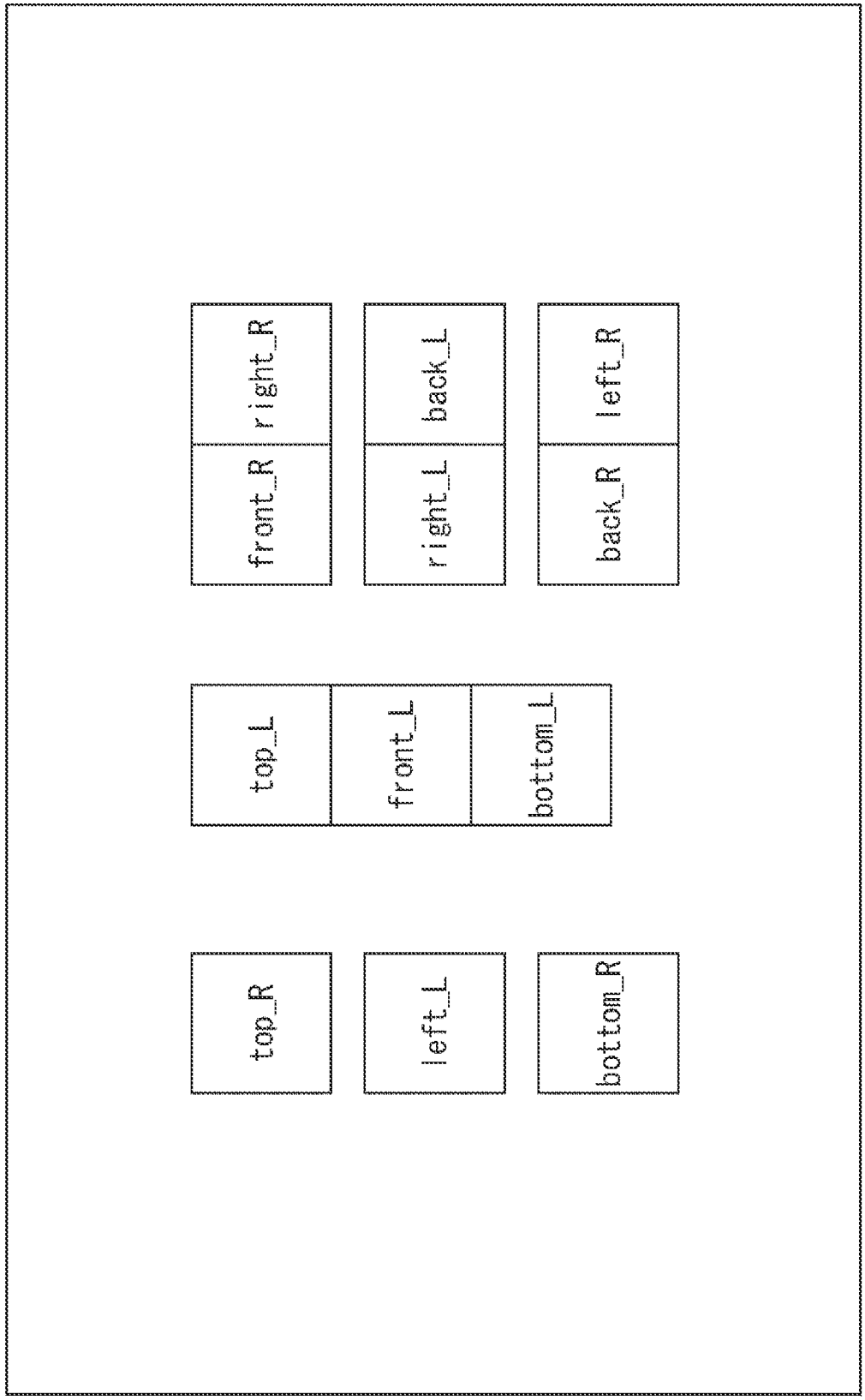
FIG. 43 is a diagram illustrating an example of sub-picture tracks in a case in which the stereoscopic packing type is 2.

FIG. 43 is a diagram illustrating an example of sub-picture tracks in a case in which the stereoscopic packing type is 2. In this example, an image of top_R, an image of left_L, an image of bottom_R, images of top_L, front_, and bottom_L, images of front_R and right_R, images of right_L and backL, and images of back_R and left_R are each stored in seven sub-picture tracks.

In a case in which the sub-picture tracks in which only the images of the L view o the R view images illustrated in FIG. 43 are stored are configured, for example, the region-wise packing in which a value of stereo_packing_type is 2 and which is illustrated in A of FIG. 7 is performed. In a packed frame illustrated in A of FIG. 7, images of top_L, front_L, and bottom_L stored in one sub-picture track are disposed to be adjacent in the second column from the left, images of front_R and right_R are disposed in the third and fourth columns of the first row, images of right_L and back_L are disposed in the third and fourth columns of the second row, and images of back_R and left_R are disposed in the third and fourth columns of the third row. An image of top_R, an image of left_L, and an image of bottom_R are disposed in the first, second, and third rows of the first column. Thus, the sub-picture tracks illustrated in FIG. 43 can be realized.

Which type of region-wise packing is used can be checked from stereo_packing_type. In a case in which one track can be generated without dividing content at the time of content generation and then sub-picture tracks are separately realized, this flag can be referred to and is thus useful.

In the second region-wise packing method for realizing the sub-picture tracks, in a case in which the sub-picture tracks in which stereo pairs of regions are stored are configured, the following region-wise packing is performed. That is, the region-wise packing is performed so that an L view image and an R view image of regions of which display regions match (that is, an L view image and an R view image configured as a stereo pair) form arbitrary continuous rectangular regions in the packed frame. On the other hand, in a case in which sub-picture tracks in which only L view images or R view images are stored are configured, arbitrary region-wise packing is performed or the region-wise packing is not applied.

Figure 44:
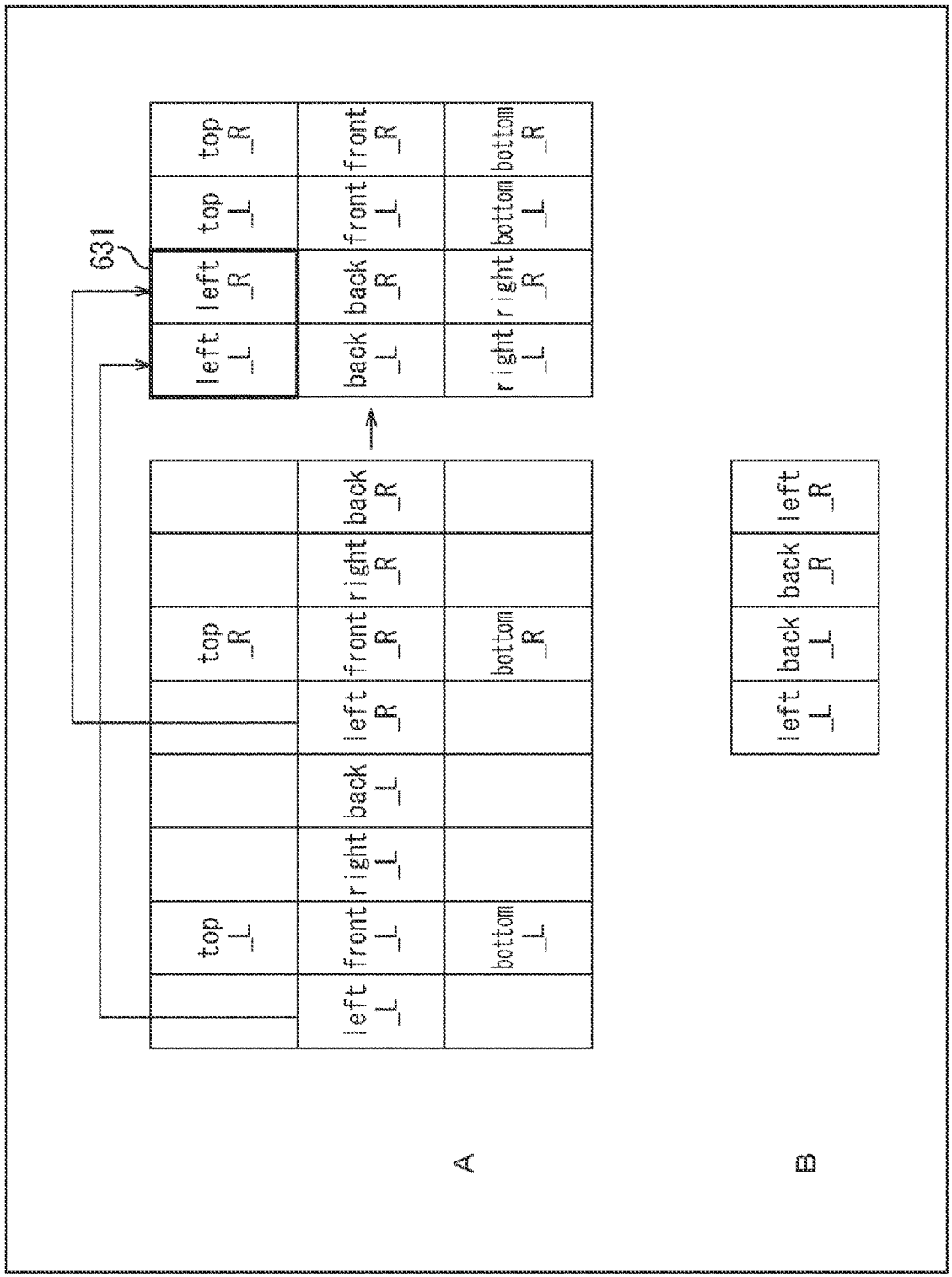
FIG. 44 is an explanatory diagram illustrating region-wise packing in which continuous rectangular regions are formed.

FIG. 44 is an explanatory diagram illustrating region-wise packing in which continuous rectangular regions are formed. As illustrated in A of FIG. 44, a packed frame which includes 4×3 regions, as illustrated on the right side of the drawing, is formed by performing the region-wise packing on images of six faces on each of the right and left sides of a projected frame in which the L view images and the R view images are disposed side by side, as illustrated on the left side of the drawing. In the packed frame, a region stereo pair of left_L and left_R is disposed to be adjacent right and left so that one continuous rectangular region 631 is formed in this example.

Hereinafter, similarly, a stereo pair of top_L and top_R, a stereo pair of back_L and back_R, a stereo pair of front_L and front_R, a stereo pair of right_L and right_R, and a stereo pair of bottom_L and bottom_R are disposed to adjacent right and left. In this example, the stereo pairs of (left_L, left_R), (top_L, top_R), (back_L, back_R), (front_L, front_R), (right_L, right_R), and (bottom_L, bottom_R) are disposed on the left and right sides of the uppermost row, the left and right sides of the middle row, and the left and right sides of the lowermost row of the packed frame.

The continuous rectangular regions can also be formed, for example, as illustrated in B of FIG. 44. In this example, images of four regions that configure two stereo pairs of left_L, back_L, back_R, and left_R form one continuous rectangular region. In this example, the images of the regions that configure the stereo pairs are not adjacent, but the images of the regions that configure the stereo pairs may be disposed in the continuous rectangular regions.

Note that in the example of FIG. 44, the continuous rectangular regions are horizontally long, but may be vertically long.

In this way, by performing the region-wise packing so that arbitrary continuous rectangular regions are formed by the stereo pairs, that is, the L view images and the R view images of which display regions are identical, the stereo pairs can be divided from the continuous rectangular region, as it stands, and the sub-picture tracks can be realized.

Figure 45:
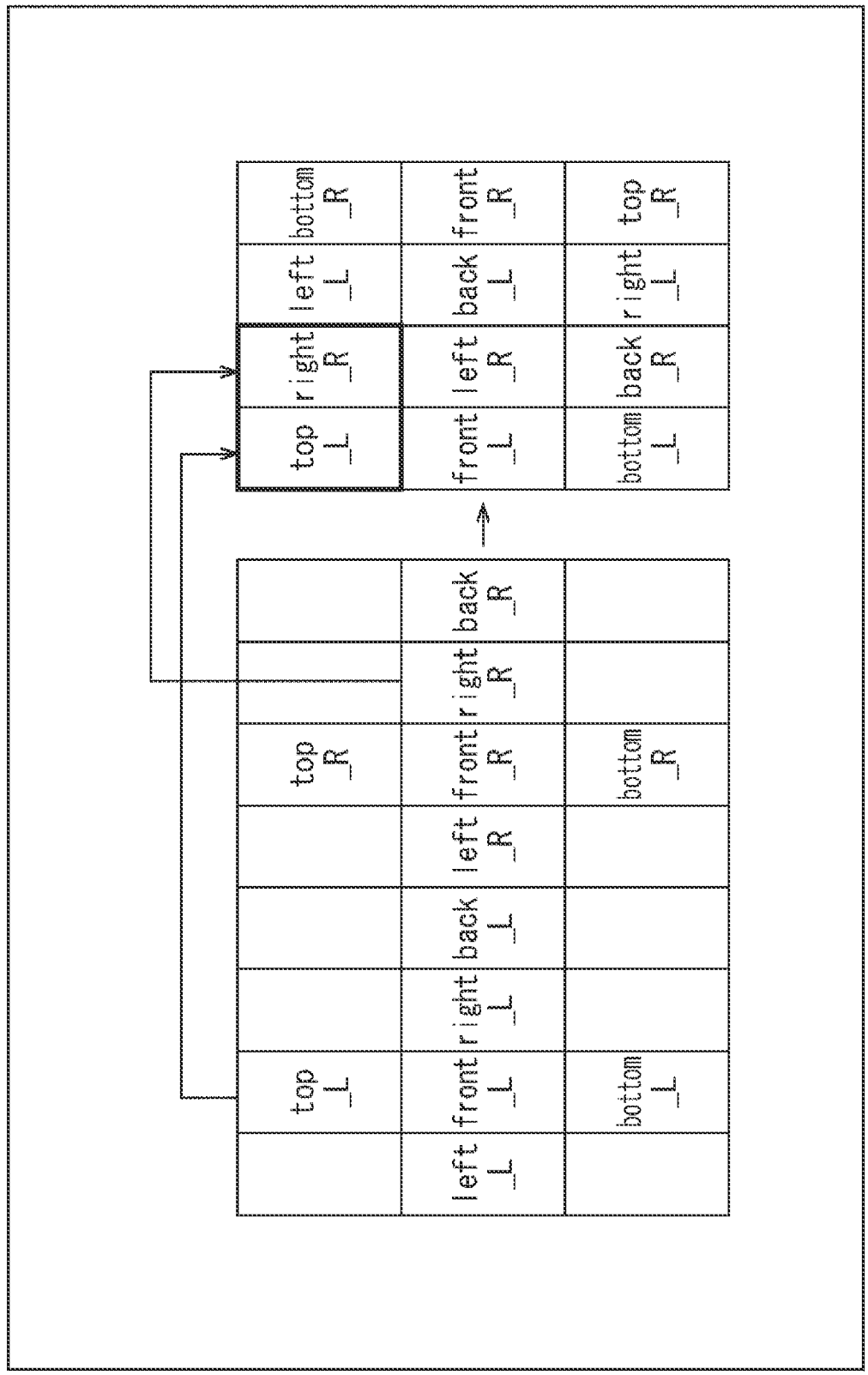
FIG. 45 is an explanatory diagram illustrating region-wise packing in which continuous rectangular regions are not formed.

FIG. 45 is an explanatory diagram illustrating region-wise packing in which continuous rectangular regions are not formed. In this example, L view images or R view images of top_L, right_R, left_L, bottom_R, front_L, left_R, back_L, front_R, bottom_L, back_R, right_L, and top_R are disposed from the top left in the bottom right direction. In this configuration, it is difficult to realize the sub-picture tracks since stereo pairs do not form continuous regions.

The packed frame formed by the region-wise packing is described in a box as follows so that continuous rectangular regions are formed.

Figure 50:
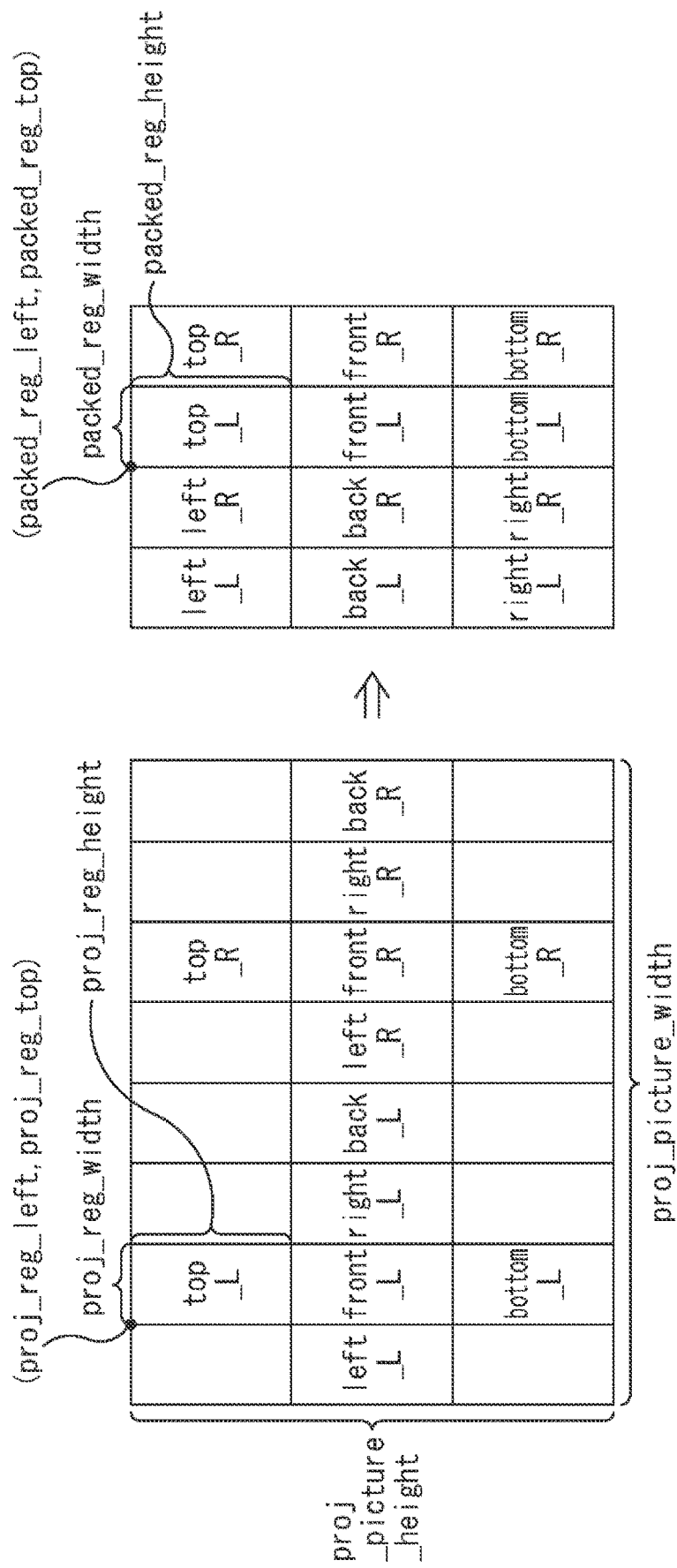
FIG. 50 is an explanatory diagram illustrating a project picture and a packed picture.
Figure 51:
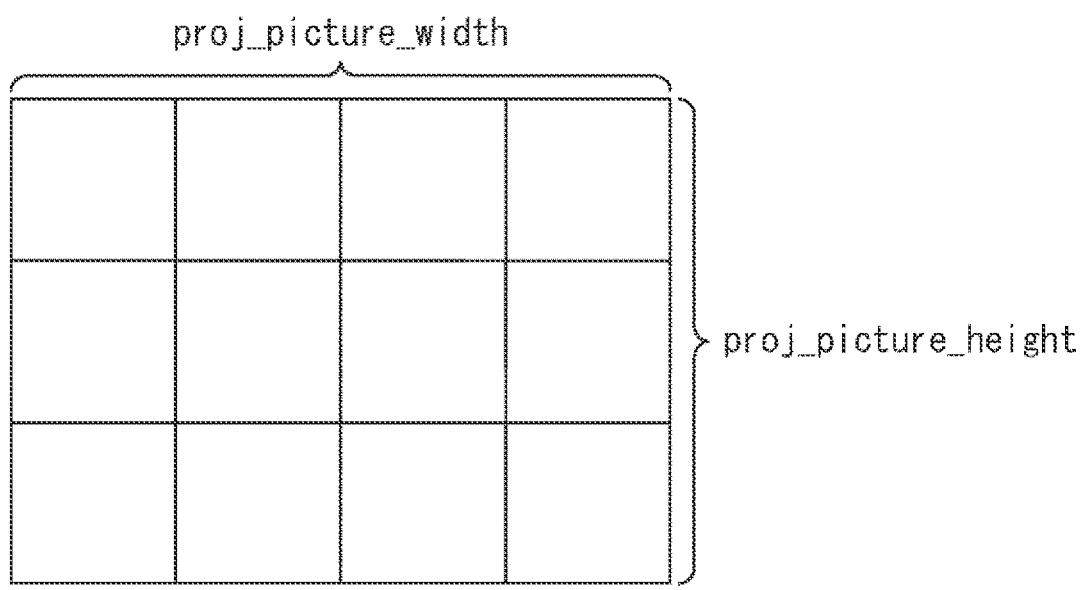
FIG. 51 is a diagram illustrating a projected picture.

FIG. 46 is a diagram illustrating a configuration of RegionWisePackingBox. FIG. 47 is a diagram illustrating a configuration of RegionWisePackingStruct. FIG. 48 is a diagram illustrating a configuration of RectRegionPacking. FIG. 49 is an explanatory diagram illustrating fields of RegionWisePackingStruct and RectRegionPacking. FIG. 50 is an explanatory diagram illustrating a project picture and a packed picture. FIG. 51 is a diagram illustrating a projected picture.

RegionWisePackingBox illustrated in FIG. 46 is equivalent to RegionMappingBox illustrated in FIG. 31 and is a modification example of RegionMappingBox illustrated in FIG. 31. RegionWisePackingStruct is described in RegionWisePackingBox of FIG. 46. In RegionWisePackingStruct, as illustrated in FIG. 47, num_regions, proj_picture_width, and proj_picture_height are described. In addition, packing_type is described in an i-th num_regions. When a value of packing_type is 0, RectRegionPacking illustrated in FIG. 48 is described. In RectRegionPacking of FIG. 48, proj_reg_width[i], proj_reg_height[i], proj_reg_top, proj_reg_left, packed_reg_width[i], packed_reg_height[i], packed_reg_top, and packed_reg_left are described.

Meanings of fields of RegionWisePackingStruct of FIG. 47 and RectRegionPacking of FIG. 48 are illustrated in FIG. 49.

In RegionWisePackingStruct, num_regions represents the number of regions. As illustrated in FIG. 50, the region represents the number of regions which are valid image regions of a projected picture in which the L view images and the R view images on the left side of the drawing are formed side by side by the frame packing. The number of regions is equal to the number of regions of the packed picture on the right side of the drawing. In the example of FIG. 50, the number of regions is 12. Here, proj_picture_width represents the width of the projected picture and proj_picture_height represents the height of the projected picture.

That is, in this example, an image formed by packing the L view images and the R view images side by side by the frame packing is considered as a projected picture. This point is different from an example in which the L view images or the R view images before side-by-side frame packing are formed as a projected picture, proj_picture_width is the width of the projected picture, and proj_picture_height is the height of the projected picture, as illustrated in FIG. 51.

As illustrated in FIG. 49, packing_type[i] represents a kind of region-wise packing of an i-th region among the 12 regions and Value 0 thereof indicates packing of a rectangular region.

Here, proj_reg_width[i] represents the width of the i-th region of the projected picture and proj_reg_height[i] represents the height of the i-th region of the projected picture. In addition, pro_reg_top represents a position of a top left pixel of the i-th region of the projected picture in the vertical direction and pro_reg_left represents a position of the top left pixel of the i-th region of the projected picture in the horizontal direction.

For the projected picture on the left side of FIG. 50, ranges of proj_picture_width and proj_picture_height are specifically illustrated. For top_L which is one region of the projected picture, ranges of proj_reg_width and proj_reg_height and positions of pro_reg_left and pro_reg_top are specifically illustrated.

Here, packed_reg_width[i] and packed_reg_height[i] represent the width and the height of an i-th region of the packed picture illustrated on the right side of FIG. 50, respectively. In addition, packed_reg_left[i] and packed_reg_top[i] represent positions of the top left pixel of the i-th region of the packed picture in the horizontal direction and the vertical direction, respectively. This specific example is illustrated for top_L which is one region of the projected picture on the right side of FIG. 50.

Then, in this example, a flag is further added to RegionWisePackingStruct described with reference to FIG. 47, as illustrated in FIG. 52. Thus, as illustrated, the region-wise packing is performed so that the regions of L view images and R view images of which display regions match form arbitrary continuous rectangular regions.

FIG. 52 is a diagram illustrating a configuration of RegionWisePackingStruct. In this example, region_wise_stereo_packing_flag is further described in RegionWisePackingStruct illustrated in FIG. 47. The other configuration is similar to the case of FIG. 47.

FIG. 53 is an explanatory diagram illustrating a region-wise stereo packing flag. As illustrated in FIG. 53, Value 0 of region_wise_stereo_packing_flag indicates that the projected picture is monoscopic or the region(s) of the L view and the R view of which display regions match do not form arbitrary continuous regions in the packed picture formed by the region-wise packing. Value 1 of region_wise_stereo_packing_flag means that the region(s) of the L view and the R view of which display regions match form arbitrary continuous regions in the packed picture formed by the region-wise packing.

Accordingly, it is possible to check presence of the stereo pairs on the basis of this flag and easily realize the sub-picture tracks.

Figure 54:
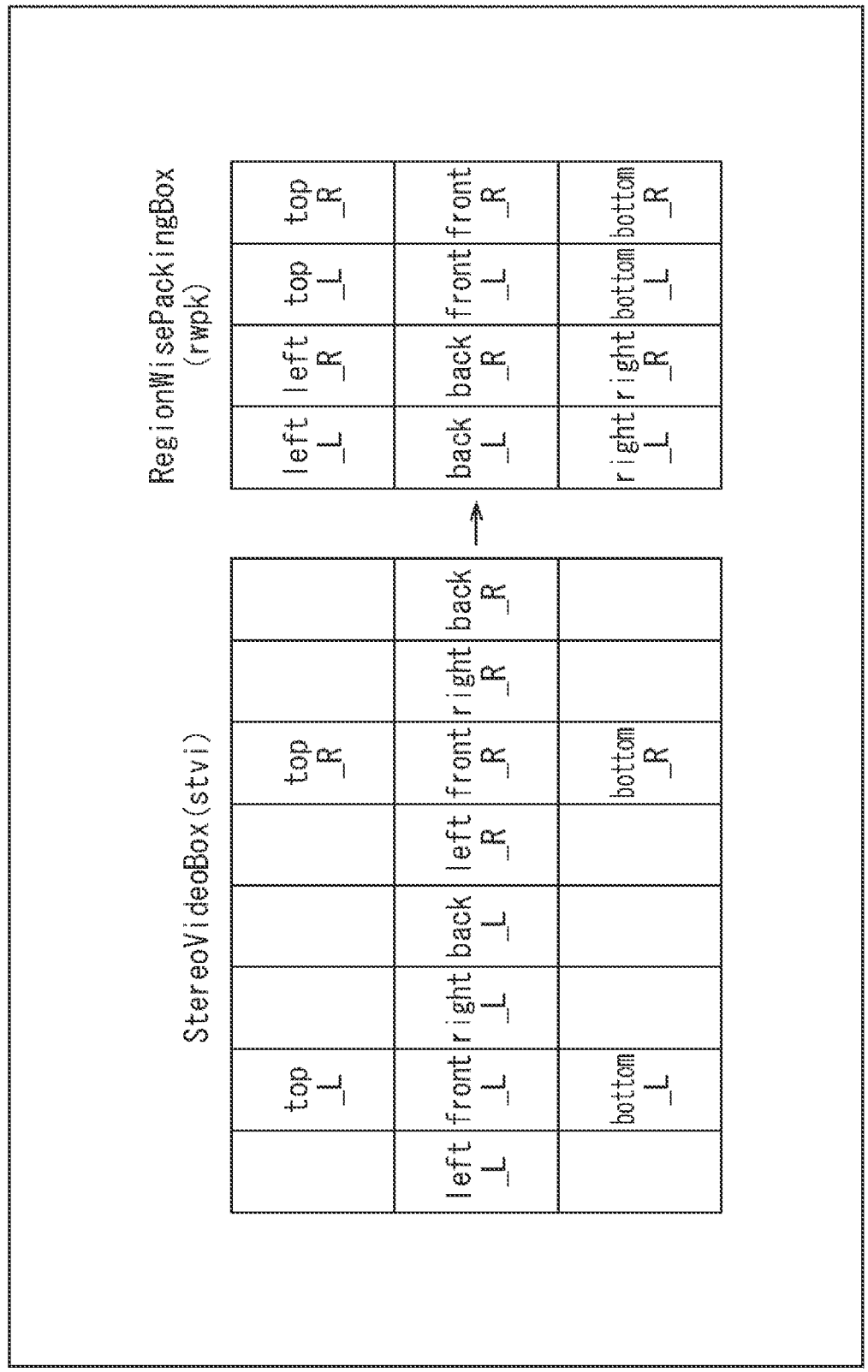
FIG. 54 is an explanatory diagram illustrating a box in a case in which a celestial sphere stereoscopic image is stored in one track.
Figure 55:
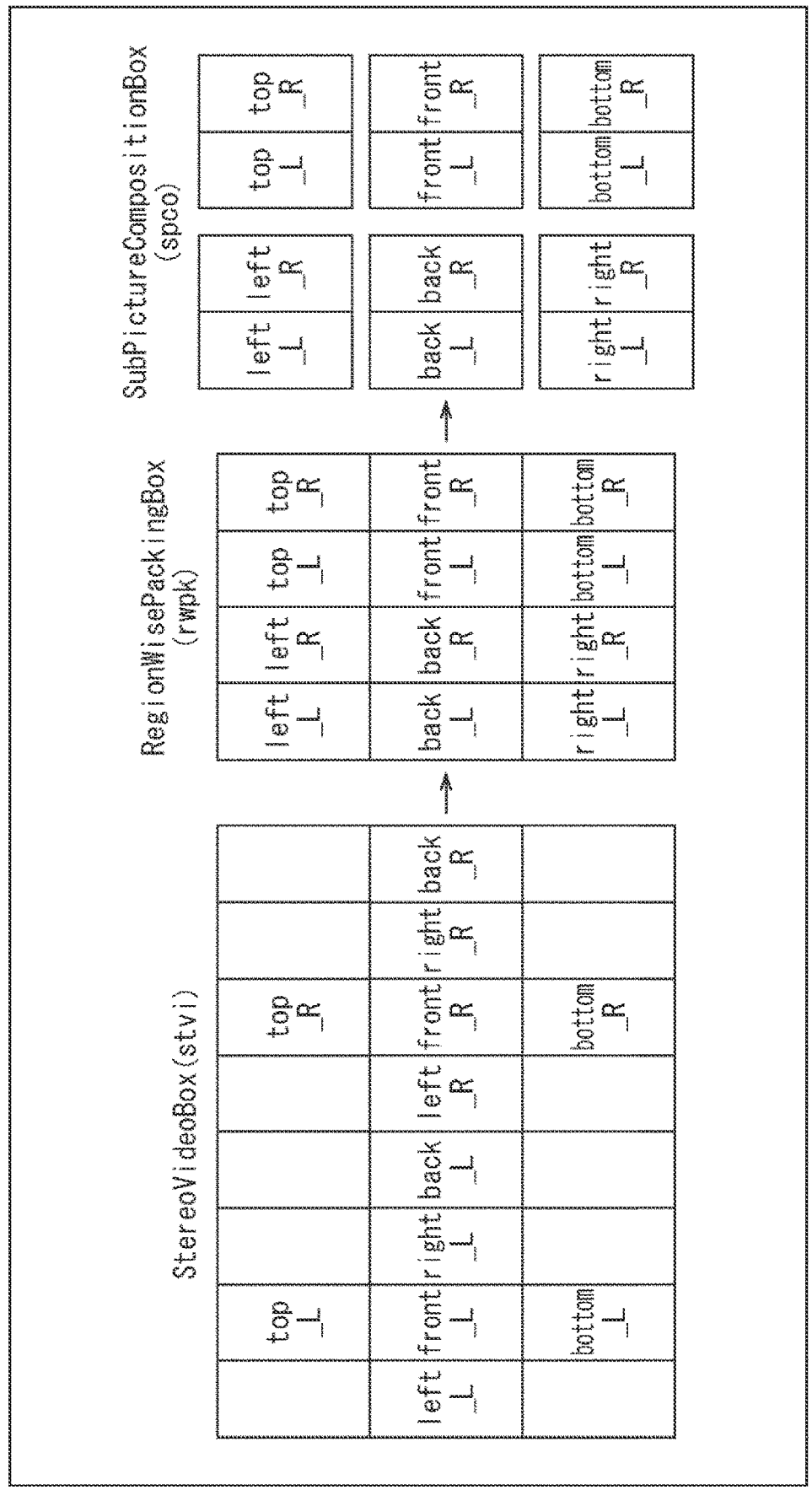
FIG. 55 is an explanatory diagram illustrating a box in a case in which a celestial sphere stereoscopic image is stored in six tracks.
Figure 56:
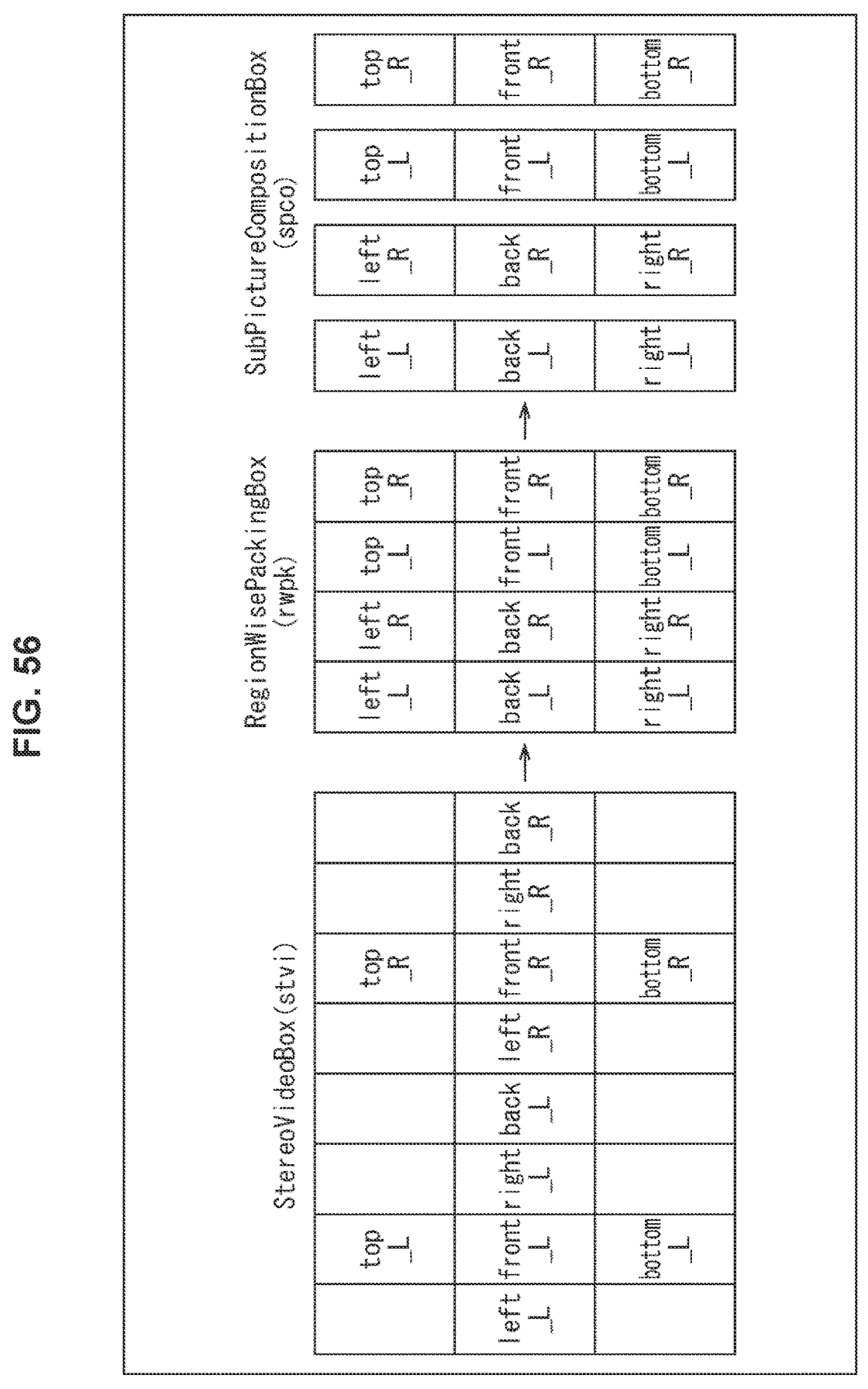

Next, a method of signaling stereo video information of the sub-picture tracks will be described. FIG. 54 is an explanatory diagram illustrating a box in a case in which a celestial sphere stereoscopic image is stored in one track. FIG. 55 is an explanatory diagram illustrating a box in a case in which the celestial sphere stereoscopic image is stored in six tracks. FIG. 56 is an explanatory diagram illustrating a box in a case in which the celestial sphere stereoscopic image is stored in four tracks.

In the example of FIG. 54, as in the case illustrated in FIG. 38, the projected picture illustrated on the left side of FIG. 54 is packed in the packed picture illustrated on the right side of FIG. 54 by the region-wise packing. In the packed picture, in two columns of the left half, images of left_L, back_L, and right_L are disposed left, images of left_R, back_R, and right_R are disposed right. In two columns of the right half, images of top_L, front_L, and bottom_L are disposed left and images of top_R, front_R, and bottom_R are disposed right. Stereo video information regarding the projected picture is described in StereoVideoBox (stvi). In addition, stereo video information regarding the packed picture is described in RegionWisePackingBox (rwpk) (see FIG. 46), In the example of FIG. 55, as in the case illustrated in FIG. 54, a projected picture illustrated on the left side of FIG. 55 is packed in a packed picture illustrated in the middle of FIG. 55 by the region-wise packing. Stereo video information regarding the projected picture is described in StereoVideoBox (stvi). In addition, region_wise_stereo_packing_flag information regarding the packed picture is described in RegionWisePackingBox (rwpk).

In the example of FIG. 55, as in the case illustrated in FIG. 39, an image of the packed picture illustrated in the middle of FIG. 55 is further divided to be stored in six sub-picture tracks, as illustrated on the rightmost side. That is, stereo pairs in which L view images and R view images of regions of which display regions of the faces of the packed picture match are disposed side by side are stored in six sub-picture tracks. Specifically, the images of left_L and left_R, top_L and top_R, back_L and back_R, front_L and front_R, right_L and right_R, and bottom_L and bottom_R are considered as the side-by-side stereo pairs, respectively, and are divided to six sub-picture tracks to be stored.

In the example of FIG. 56, as in the case illustrated in FIG. 38 (FIG. 55), the projected picture illustrated on the left side of FIG. 56 is packed in a packed picture illustrated in the middle of FIG. 56 by the region-wise packing. Stereo video information of the projected picture is described in StereoVideoBox and region_wise_stereo_packing_flag of the packed picture is described in RegionWisePackingBox.

Further, in the example of FIG. 56, the images of the packed picture illustrated in the middle of FIG. 56 are further divided to be stored in four sub-picture tracks, as illustrated on the rightmost side. Specifically, L view images of left_L, back_L, and right_L, R view images of left_R, back_R, and right_R, L view images of top_L, front_L, and bottom_L, and R view images of top_R, front_R, and bottom_R are divided to four sub-picture tracks to be stored. That is, the regions of the L view images and the regions of the R view images of the packed picture are considered as a monoscopic configuration and are stored in four sub-picture tracks.

Next, SubPictureCompositionBox will be described, FIG. 57 is a diagram illustrating a configuration of a sub-picture composition box. FIG. 58 is an explanatory diagram illustrating fields of the sub-picture composition box.

In SubPictureCompositionBox, tracks in which sub-pictures included in an entire picture are stored are grouped. In SubPictureCompositionBox, information indicating at which position a sub-picture of each track is disposed with which size in the entire picture. SubPictureCompositionBox is located below TrackGroupBox at the time of track_group_type='spco.'

Specifically, as illustrated in FIG. 57, track_x, track_y, track_width, track_height, composition_width, and composition_height are described in SubPictureCompositionBox. Here, track_x represents a position of a top left pixel of the sub-picture stored in the track in the horizontal direction in the entire picture and track_y represents a position of the top left pixel of the sub-picture stored in the track in the vertical direction in the entire picture.

In addition, track width represents the width of the sub-picture stored in the track in the entire picture and track_height represents the height of the sub-picture stored in the track in the entire picture. In addition, composition_width represents the width of the entire picture and composition_height represents the height of the entire picture.

To determine whether a sub-picture of each sub-picture track is an L view image, an R view image, or a stereoscopic image, it is necessary to perform calculation based on the above-described SubPictureCompositionBox, RegionWisePackingBox, and StereoVideoBox. Accordingly, by indicating stereo packing information of the entire picture by existing StereoVideoBox and further adding stereo video information for each sub-picture track, it is possible to perform the determination easily. Thus, a device which does not corresponds to a stereoscopic image (capable of performing only monoscopic reproduction) can selectively reproduce tracks of the L view images or the R view images and a device which corresponds to a stereoscopic image can selectively reproduce tracks of stereoscopic images in accordance with a viewport.

In the first method of signaling stereo video information of the sub-picture tracks, TrackStereoVideoBox (tstv) for signaling stereo video information of the sub-picture tracks which can be used only in the sub-picture track configuration is newly defined. The definition location can be set below RestrictedSchemeInformationBox (rinf)/SchemeInformationBox (schi) or in an optical box region of the end of StereoVideoBox (stvi).

The stereo video information is information illustrated in FIGS. 62, 67, 69, and the like to be described below.

As methods of newly defining TrackStereoVideoBox, there are a method of not signaling frame packing such as side-by-side or top & bottom (for example, the example of FIG. 59 to be described below) and a method of signaling frame packing (for example, an example of FIG. 61 to be described below).

FIG. 59 is a diagram illustrating a configuration of a track stereo video box and illustrating a configuration in a case in which frame packing is not signaled. FIG. 60 is an explanatory diagram illustrating fields of the track stereo video box.

As illustrated in FIG. 59, view_idc is described in TrackStereoVideoBox in a case in which the frame packing is not signaled. As illustrated in FIG. 60, Value 1 of view_idc means that only the left views are stored in the tracks and monoscopic display is possible and Value 2 means that only the right views are stored in the tracks and monoscopic display is possible. In addition, Value 3 means that stereoscopic display is possible in the tracks.

FIG. 61 is a diagram illustrating a configuration of a track stereo video box and illustrating a configuration in a case in which frame packing is signaled. FIG. 62 is an explanatory diagram illustrating a field of the track stereo video box.

As illustrated in FIG. 61, in TrackStereoVideoBox in the case of signaling of the frame packing, signal_view_allowed, stereo_scheme, length, stereo_indication_type are further described in a case in which a value of view_idc is 3 other than view_idc. As illustrated in FIG. 62, the meanings of the values of view_idc are similar to the case described with reference to FIG. 60.

Value 0 of single_view_allowed means that content is intended to be displayed only on a display supporting a stereoscopic image. Value 1 (single_view_allowed&1=1) means that display of the right views of content is allowed as monoscopic display. Value 2 (single_view_allowed&2=2) means that display of the left views of content is allowed as monoscopic display.

Value 1 of stereo_scheme means that the frame packing method conforms to Frame packing arrangement SEI of ISO/IEC 14496-10 and value 2 means that the frame packing method conforms to Annex.L of ISO/IEC 13818-2. Value 3 means that the frame packing method conforms to 2D/3D Mixed service and frame/service compatible of ISO/IEC 23000-11. Here, length represents a byte length of stereo_indication_type and stereo_indication_type represents a frame packing method conforming to stereo_scheme.

A case in which TrackStereoVideoBox is stored in StereoVideoBox is illustrated in FIGS. 63 and 64. FIG. 63 is a diagram illustrating a configuration of a stereo video box and illustrating a configuration before the track stereo video box is signaled. FIG. 64 is a diagram illustrating a configuration of a stereo video box and illustrating a configuration after the track stereo video box is signaled.

As illustrated in FIG. 63, in StereoVideoBox, any_box is considered to be addable optionally. When TrackStereoVideoBox is added as any_box, StereoVideoBox is illustrated in FIG. 64.

Note that meanings of single_view_allowed, stereo_scheme, length, and stereo_indication_type described in StereoVideoBox of FIG. 64 are similar to the case illustrated in FIG. 62, and thus the repeated description will be omitted.

TrackStereoVideoBox can exist only when SubPictureCompositionBox and StereoVideoBox exist in a track. In a case in which SubPictureCompositionBox and StereoVideoBox exist in the track and TrackStereoVideoBox does not exist, as illustrated in FIG. 65, the sub-pictures of the tracks may be set so that stereo video display is not possible without only the L view images or only the R view images.

Figure 65:
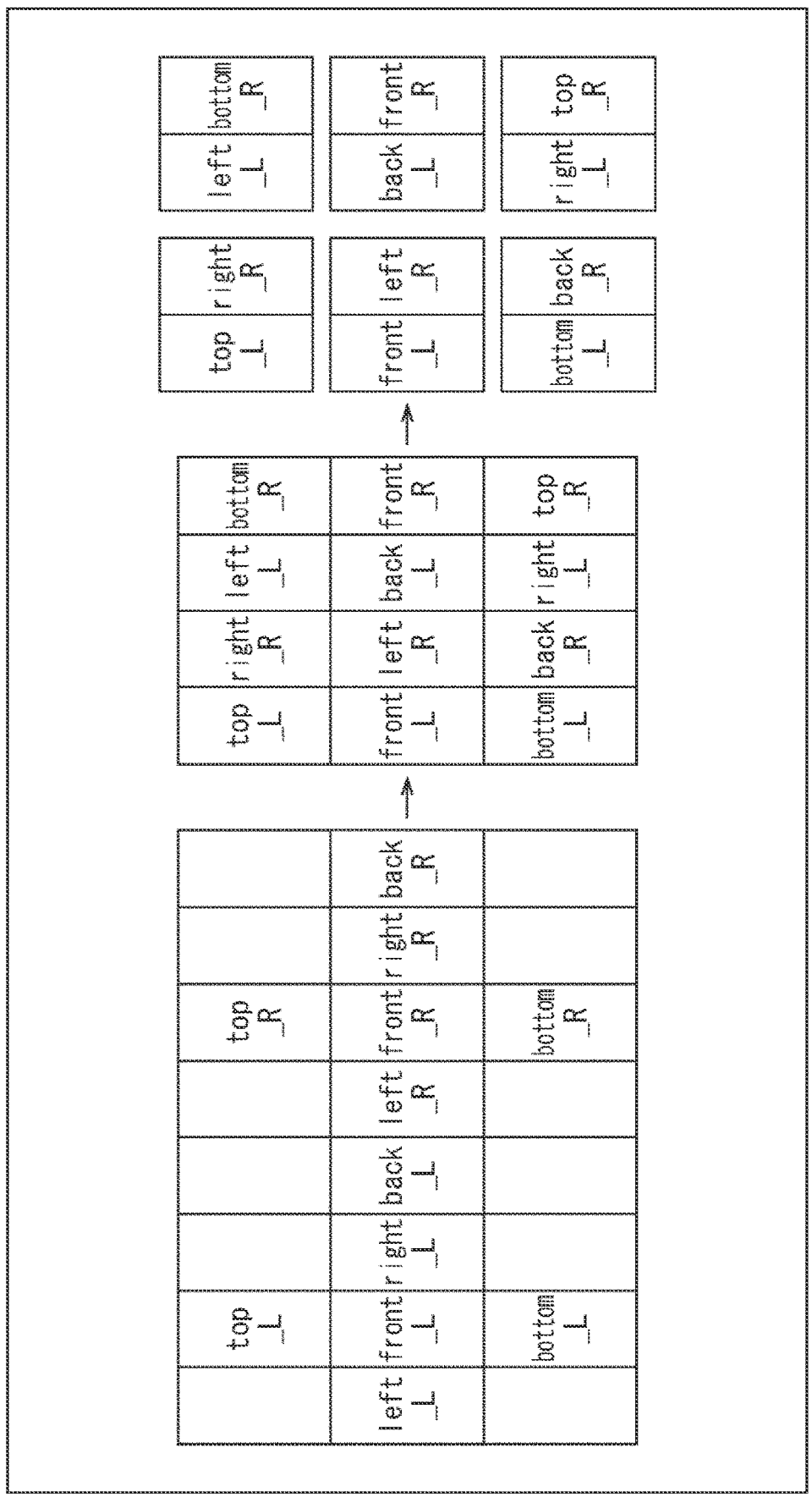
FIG. 65 is an explanatory diagram illustrating storing of a celestial sphere stereoscopic image in a plurality of tracks.

FIG. 65 is an explanatory diagram illustrating storing of a celestial sphere stereoscopic image in a plurality of tracks. In this example, the projected picture illustrated in the leftmost side of the drawing is packed in the packed picture displayed in the middle of the drawing by the region-wise packing. In the packed picture, images of regions of top_L, right_R, left_L, bottom_R, front_L, left_R, back_L, front_R, bottom_L, back_R, right_L, and top_R are disposed from the top left in the bottom right direction.

On the rightmost side of FIG. 65, an image stored in each sub-picture track is illustrated. In this example, images of top_L and right_R, images of left_L and bottom_R, images of front_L and left_R, images of back_L and front_R, images of bottom_L and back_R, and images of right_L and top_R are each stored in six sub-picture tracks. The images of the sub-picture tracks may not be displayed as stereoscopic images without matching of the regions of the L view images and the R view images (that is, without the stereo pairs). In addition, the image of each sub-picture track is the L view image and the R view image and is neither only the L view image nor only the R view image.

As described above, in the first method of signaling the stereo video information of the sub-picture tracks, TrackStereoVideoBox in which stereo video information of the sub-picture tracks usable only at the time of the configuration of the sub-picture tracks is signaled is newly defined. In contrast, in a second method of signaling the stereo video information of the sub-picture tracks, SubPictureCompositionBox (spco) extends.

As methods of extending SubPictureCompositionBox, there are a method of not signaling frame packing such as the side-by-side or the top & bottom (for example, an example of FIG. 66 to be described below) and a method of signaling frame packing (for example, an example of FIG. 68 to be described below).

FIG. 66 is a diagram illustrating a configuration of a sub-picture composition box and illustrating a configuration in a case in which the frame packing such as the side-by-side and the top & bottom is not signaled. In SubPictureCompositionBox, view_idc_presence_flag is described. In a case in which the value of view_idc_presence_flag is 1, view_idc is described. Additionally, as in the case of FIG. 57, track_x, track_y, track_width, track_height, composition_width, and composition_height are described.

FIG. 67 is an explanatory diagram illustrating fields of the sub-picture composition box. As illustrated in FIG. 67, Value 0 of view_idc_presence_flag means that there is no view_idc and Value 1 thereof means that there is view_idc. Meanings of Value 0 to Value 3 of view_idc are similar to the case described with reference to FIG. 60. In this example, Value 4 meaning to be unknown is added. Value 4 of view_idc is used in a case in which the image stored in each sub-picture track is none of a monoscopic image, the L view image, the R view image, and a stereoscopic image, for example, as illustrated in FIG. 65.

Meanings of track_x, track_y, track_width, track_height, composition_width, and composition_height of SubPictureCompositionBox are similar to the case described with reference to FIG. 58.

FIG. 68 is a diagram illustrating a configuration of a sub-picture composition box and illustrating a configuration in a case in which the frame packing such as the side-by-side and the top & bottom is signaled. In SubPictureCompositionBox of FIG. 68, not only is stereo_info_presence_flag described, but track_x, track_y, track_width, track_height, composition_width, and composition_height are also described as in the case of FIG. 66. In addition, in a case in which the value of stereo_info_presence_flag is 1, view_idc is described. Further, when the value of view_idc is 3, single_view_allowed, stereo_scheme, length, and stereo_indication_type are described.

FIG. 69 is an explanatory diagram illustrating a field of the sub-picture composition box. As illustrated in FIG. 69, Value 0 of stereo_info_presence_flag represents that there is no stereo-related information and Value 1 thereof represents that there is stereo-related information. The stereo-related information is information illustrated in FIG. 62. Meaning of view_idc is similar to that at the time of SubPictureCompositionBox illustrated in FIG. 66 in a case in which frame packing such as the side-by-side or the top & bottom is not signaled (the case illustrated in FIG. 67).

Meanings of single_view_allowed, stereo_scheme, length, and stereo_indication_type are similar to the case illustrated in FIG. 62 and meanings of track_x, track_y, track_width, track_height, composition_width, and composition_height are similar to the case illustrated in FIG. 58.

It is possible to configure sub-picture tracks in which the L view images and the R view images of the stereo projected picture are divided and cover different ranges from the L view images and the R view images. For example, by setting the front face as stereoscopic display and setting the other faces as monoscopic display, or the like, it is possible to perform signaling corresponding to a use case at a stereoscopic view that depends on a viewport.

Figure 70:
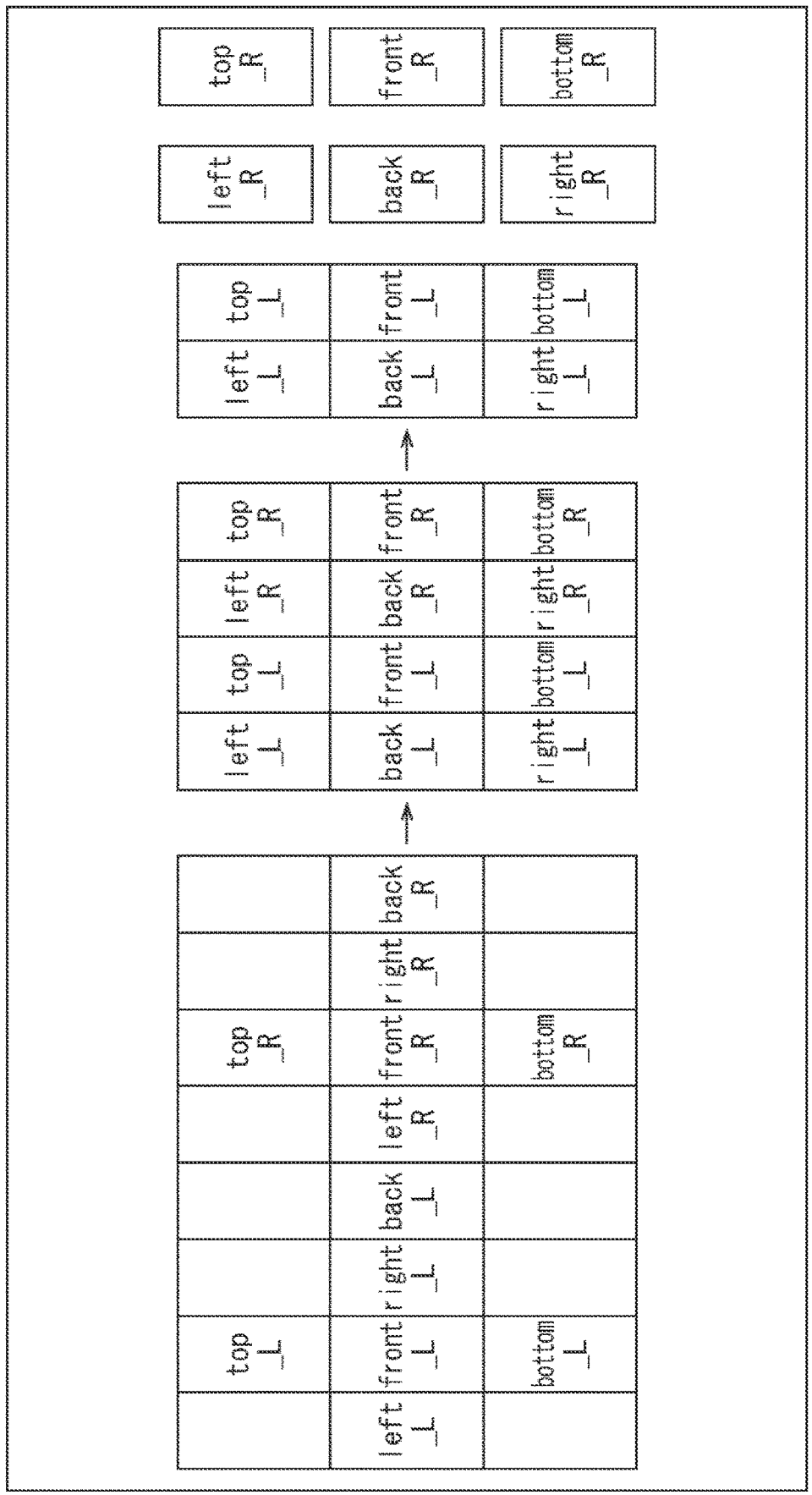
FIG. 70 is an explanatory diagram illustrating storing of a celestial sphere stereoscopic image in a plurality of tracks.

FIG. 70 is an explanatory diagram illustrating storing of a celestial sphere stereoscopic image in a plurality of tracks. In an example of a use case of FIG. 70, a projected picture illustrated on the leftmost side of FIG. 70 is packed in a packed picture illustrated on the right side by the region-wise packing. In the packed picture, in two columns of the left half, images of left_L, back_L, and right_L are disposed left, images of top_L, front_L, and bottom_L are disposed right. In two columns of the right half, images of left_R, back_R, and right_R are disposed left and images of top_R, front_R, and bottom_R are disposed right.

In the example of FIG. 70, as illustrated on the rightmost side, the packed picture is further divided to seven sub-picture tracks to be stored. That is, images of six faces such as left_L, back_L, right_L, top_L, front_L, and bottom_L are stored in one sub-picture track. In this case, in TrackStereoVideoBox or SubPictureCompositionBox, the value of view_idc is considered to be 1.

Further, the images of six faces such as left_R, back_R, right_R, top_R, front_R, and bottom_R are stored in six sub-picture tracks, respectively. In this case, in TrackStereoVideoBox or SubPictureCompositionBox, the value of view_idc is considered to be 2.

That is, in the example of FIG. 70, the L view images are displayed on six surfaces and the R view image is displayed on only the left surface. Thus, stereoscopic display is possible on only the left surface and the monoscopic display is possible on the other surfaces.

As described above, by causing the existing StereoVideoBox to indicate the stereo packing information of the entire picture, newly defining TrackStereoVideoBox, or extending SubPictureCompositionBox, or the like, the stereo video information for each sub-picture track is further added. As a modification example, the existing StereoVideoBox can be caused to indicate stereo video information for each sub-picture track and stereo packing information of the entire picture can be newly added. In the stereo packing information of the entire picture, for example, the same syntax and semantics as those of the existing StereoVideoBox can be used.

Figure 71:
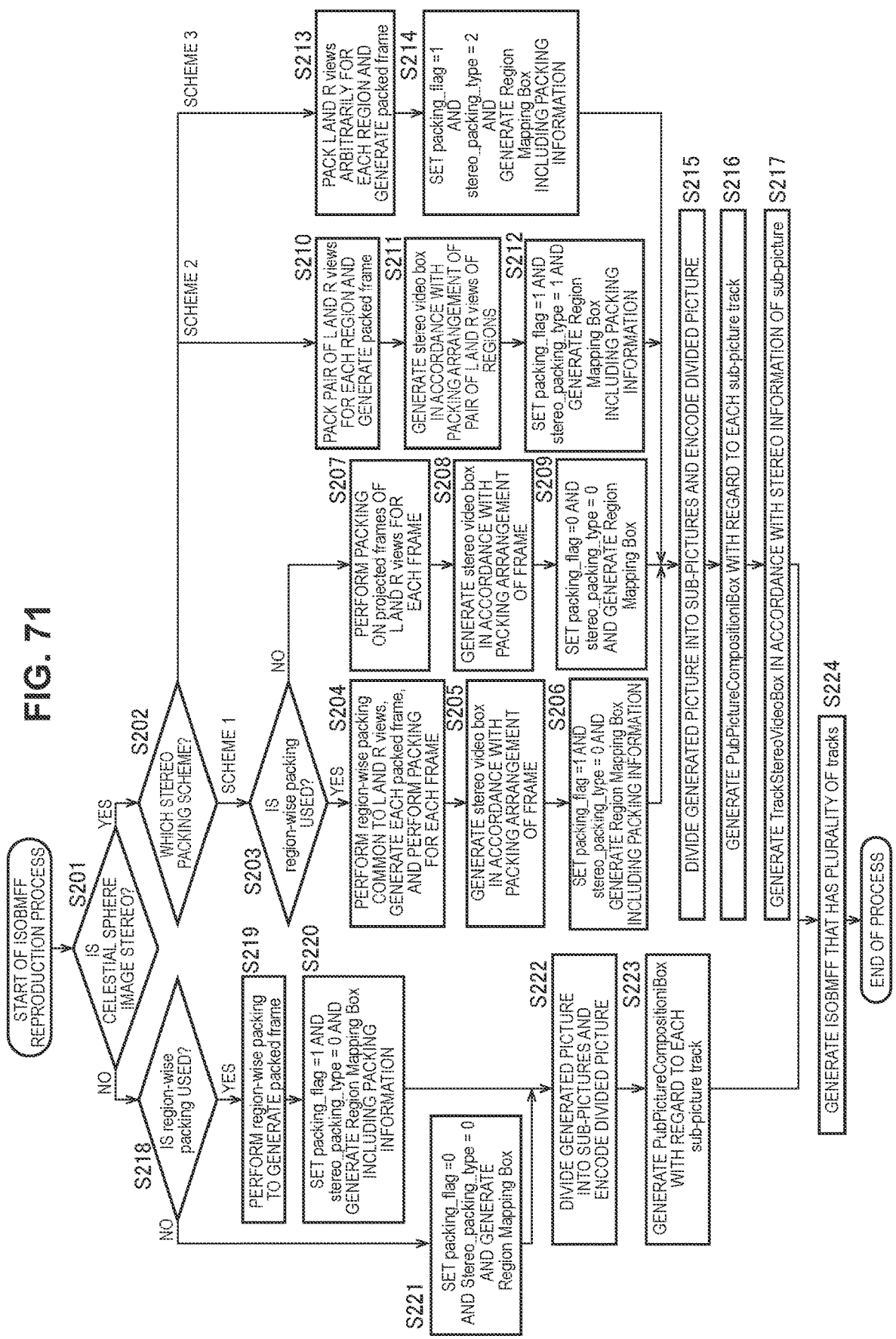
FIG. 71 is an explanatory flowchart illustrating a generation process.

Next, a process of the generation device 212 of FIG. 12 in a case in which the region-wise packing is performed using stereo_packing_type to realize the above-described sub-picture tracks will be described with reference to FIG. 71. Note that in this example, as illustrated in FIG. 64, TrackStereoVideoBox is assumed to be stored in StereoVideoBox. FIG. 71 is an explanatory flowchart illustrating a generation process.

The stitching processing unit 231 performs a stitching process of causing color or brightness of the photographed images of the six directions supplied from the camera 211A in FIG. 11 to be the same for each frame and removing overlap for connection. The stitching processing unit 231 supplies the photographed images of a frame unit after the stitching process to the mapping processing unit 232.

The mapping processing unit 232 generates a celestial sphere image from the photographed images supplied from the stitching processing unit 231 by the cube mapping. That is, the mapping processing unit 232 maps the photographed images after the stitching process as texture to a cube to generate a development image of the cube as a celestial sphere image. The mapping processing unit 232 supplies the celestial sphere image to the region-wise packing processing unit 233.

In step S201, the region-wise packing processing unit 233 determines whether the celestial sphere image is stereoscopic. In a case in which the celestial sphere image is stereoscopic, the region-wise packing processing unit 233 determines which stereo packing scheme is performed on the basis of an instruction from a user in step S202. That is, whether one of Scheme 1 to Scheme 3 is adopted is determined as the stereo packing scheme.

In a case in which the adopted stereo packing scheme is Scheme 1 (the packing scheme illustrated in FIG. 3 or 4), the region-wise packing processing unit 233 determines whether the region-wise packing is used as the packing scheme on the basis of an instruction from the user in step S203.

In a case in which the region-wise packing is used as the packing scheme, the region-wise packing processing unit 233 performs a region-wise packing process common to the L view and the R view in step S204. Then, the region-wise packing processing unit 233 generates respective packed frames of the L view and the R view and performs packing for each frame.

In step S205, the region-wise packing processing unit 233 generates StereoVideoBox in accordance with the packing arrangement of the frame. In step S206, the region-wise packing processing unit 233 sets packing_flag=1 and stereo_packing_type=0 and generates RegionMappingBox including the packing information.

In a case in which it is determined in step S203 that the region-wise packing is not used, the region-wise packing processing unit 233 performs packing on the projected frames of the L view and R view for each frame in step S207.

In step S208, the region-wise packing processing unit 233 generates StereoVideoBox in accordance with the packing arrangement of the frame. In step S209, the region-wise packing processing unit 233 sets packing_flag=0 and stereo_packing_type=0 and generates RegionMappingBox.

In a case in which it is determined in step S202 that the stereo packing scheme is Scheme 2 (a scheme of packing the L view image and the R view image for each region in the frame of the celestial stereoscopic image), the process proceeds to step S210. In step S210, the region-wise packing processing unit 233 packs the L view and the R view as a pair for each region to generate the packed frame.

In step S211, the region-wise packing processing unit 233 generates StereoVideoBox in accordance with packing arrangement of a pair of L view and R view of the regions. In step S212, the region-wise packing processing unit 233 sets packing_flag=1 and stereo_packing_type_=1 and generates RegionMappingBox including the packing information.

In a case in which it is determined in step S202 that the stereo packing scheme is Scheme 3 (a scheme of packing the L view image and the R view image in arbitrary regions in the frame of the celestial sphere stereoscopic image), the process proceeds to step S213. In step S213, the region-wise packing processing unit 233 packs the L view and the R view at arbitrary positions for each region to generate a packed frame.

In step S214, the region-wise packing processing unit 233 sets packing_flag=1 and stereo_packing_type=1 and generates RegionMappingBox including the packing information.

After the processes of step S206, step S209, step S212, and step S214, the encoder 234 divides the generated picture into sub-picture tracks, encodes the divided picture, and supplies the encoded picture to the file generation unit 237 in step S215.

In step S216, the file generation unit 237 generates SubPictureCompositionBox with regard to each sub-picture track. In step S217, the file generation unit 237 generates TrackStereoVideoBox in accordance with the stereo video information of the sub-pictures.

In a case in which it is determined in step S201 that the celestial sphere image is not stereoscopic, the region-wise packing processing unit 233 determines in step S218 whether the region-wise packing is used as the packing scheme on the basis of an instruction from the user.

In a case in which the region-wise packing is used as the packing scheme, the region-wise packing processing unit 233 performs the region-wise packing process to generate a packed frame in step S219. In step S220, the region-wise packing processing unit 233 sets packing_flag=1 (the region-wise packing is used) and sets stereo_packing_type=0 (Scheme 1). Then, the region-wise packing processing unit 233 generates RegionMappingBox including the packing information.

In a case in which it is determined in step S218 that the region-wise packing is not used as the packing scheme, the region-wise packing processing unit 233 sets packing_flag=0 (the region-wise packing is not used) and sets stereo_packing_type=0 (Scheme 1) in step S221. Then, the region-wise packing processing unit 233 generates RegionMappingBox including them.

After the processes of step S220 and step S221, the encoder 234 divides the generated picture into the sub-pictures, encodes the divided picture, and supplies the encoded picture to the file generation unit 237 in step S222. In step S223, the file generation unit 237 generates SubPictureCompositionBox with regard to each sub-picture track.

After the processes of step S217 and step S223, the file generation unit 237 generates an ISOBMFF file that has the plurality of tracks in step S224.

The file generated by the file generation unit 237 is uploaded from the upload unit 238 to the delivery server 213.

Figure 72:
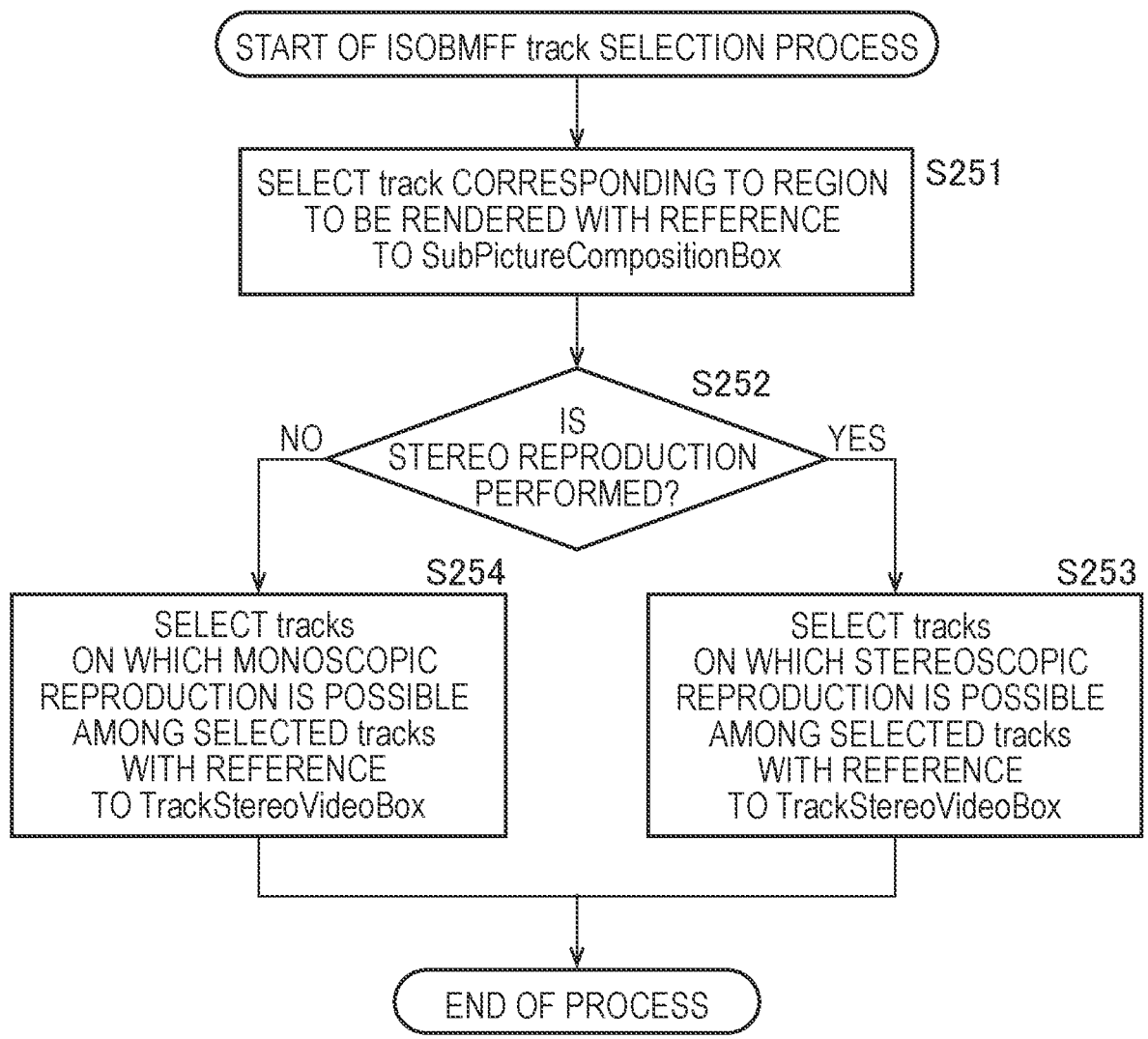
FIG. 72 is an explanatory flowchart illustrating a selection process.

Next, a track selection process of the reproduction device 214 in FIG. 33 will be described with reference to FIG. 72. FIG. 72 is an explanatory flowchart illustrating a selection process.

In step S251, the file acquisition unit 601 selects tracks corresponding to regions to be rendered with reference to SubPictureCompositionBox. In step S252, the file acquisition unit 601 determines whether stereoscopic reproduction is performed on the selected tracks. The processes of step S251 and step S252 are performed on the basis of an instruction from the user.

In a case in which it is determined in step S252 that the stereoscopic reproduction is performed, the file acquisition unit 601 selects tracks on which the stereoscopic reproduction is possible among the selected tracks with reference to TrackStereoVideoBox in step S253. In a case in which it is determined in step S252 that the stereoscopic reproduction is not performed, the file acquisition unit 601 selects tracks on which monoscopic reproduction is possible among the selected tracks with reference to TrackStereoVideoBox in step S254.

After the foregoing selection process of FIG. 72 the above-described reproduction process of FIG. 34 is performed.

As described above, the stereoscopic image is generated from the L view image and the R view image, but the stereoscopic image may be generated from a texture image and a depth image. The texture image is an image which serves as a basis used to generate the stereoscopic image and the depth image is an image representing a position of a subject in a depth direction in a predetermined unit region of the texture image. Information regarding the depth image is quantized to a value (for example, a value from 0 to 255) of a predetermined number of bits and considered to be a pixel value to be encoded.

Figure 73:
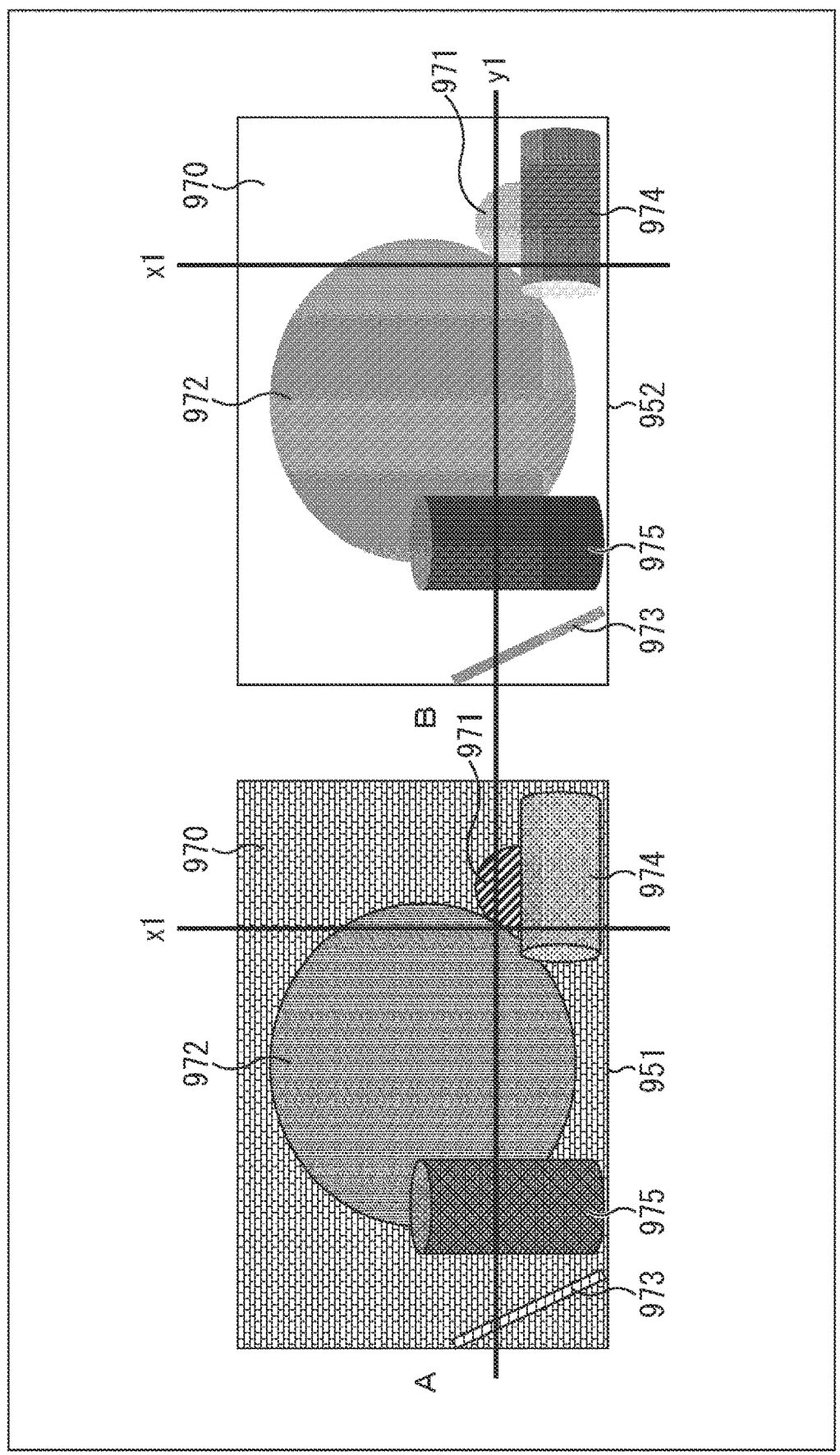
FIG. 73 is an explanatory diagram illustrating a texture image and a depth image.
Figure 74:
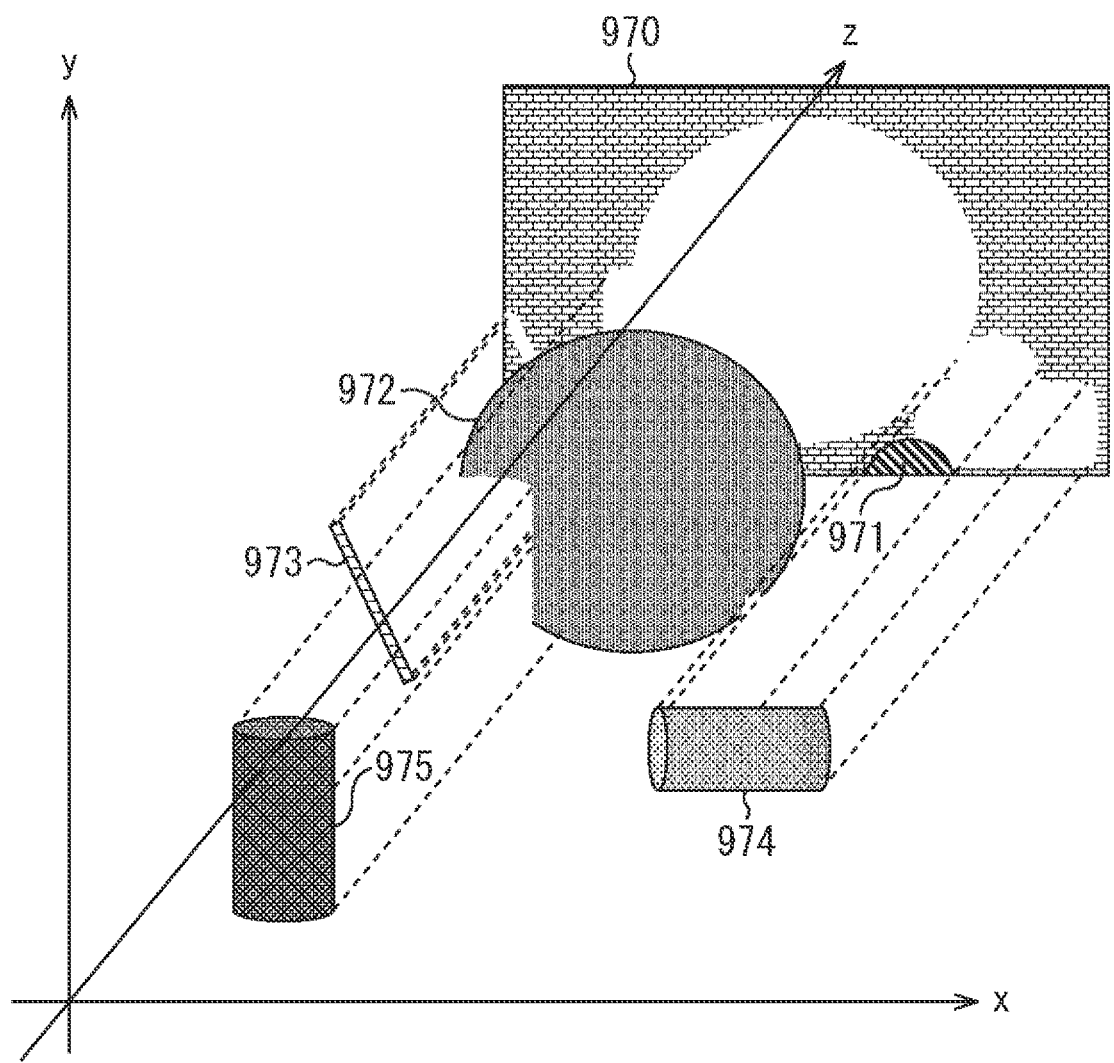
FIG. 74 is an explanatory diagram illustrating 3-dimensional positions of image components.

Next, the texture image and the depth image will be described with reference to FIGS. 73 and 74. FIG. 73 is an explanatory diagram illustrating the texture image and the depth image. FIG. 74 is an explanatory diagram illustrating 3-dimensional positions of image components.

Input image data in FIG. 73 includes color image data 951 serving as a texture image in A of FIG. 73 and depth image data 952 in B of FIG. 73. In A of FIG. 73, color information of the color image data is illustrated in a figure. As illustrated in A of FIG. 73, the color image data includes a background 970, partial circles 971 and 972 in which parts are lost, a rectangle 973, a cylinder 974, and a cylinder 975.

In addition, in the example of B of FIG. 73, pixel values of the depth image data increase as distances are away. In the example of B of FIG. 73, the background 970 is whitest (bright), the partial circle 971, the partial circle 972 and the rectangle 973, the cylinder 974, and the cylinder 975 are gradually blackened (darkened) in this order and the positions in the depth direction is away in this order.

FIG. 74 illustrates 3-dimensional positions of the background 970, the partial circle 971, the partial circle 972, the rectangle 973, the cylinder 974, and the cylinder 975 in FIG. 73.

As illustrated in FIG. 74, x and y coordinates of the 3-dimensional positions of the background 970, the partial circle 971, the partial circle 972, the rectangle 973, the cylinder 974, and the cylinder 975 correspond to positional coordinates of the color image data 951 in the horizontal direction and the vertical direction on a screen. In addition, the z coordinates of the 3-dimensional positions of the background 970, the partial circle 971, the partial circle 972, the rectangle 973, the cylinder 974, and the cylinder 975 correspond to pixel values of the depth image data 952.

In this way, images at different viewpoints can be generated from the texture image and the depth image, and a stereoscopic image can be generated on the basis of the generated image as in the L view image and the R view image. That is, a view image (a left-eye region image) and an R view image (a right-eye region image) or a texture image and a depth image can be used as a first image and a second image used to generate a stereoscopic image.

According to the present technology, an improvement of encoding efficiency or optimization of transmission image region disposition can be realized in accordance with a new packing scheme for a celestial sphere stereoscopic image. Thus, it is possible to realize a reduction in a transmission capacity, an improvement in resolution, and smooth viewpoint movement at the time of viewing of a celestial sphere stereoscopic image in transmission of the celestial sphere stereoscopic image.

In addition, according to the present technology, by delivering a new packing scheme in a file, it is possible to state a packing scheme which is used in the reproduction device and easily perform a reproduction process.

Note that the present technology can be embodied in various modification examples within the scope of the present technology without departing from the nature of the present technology.

<Computer (FIG. 75)>

Figure 75:
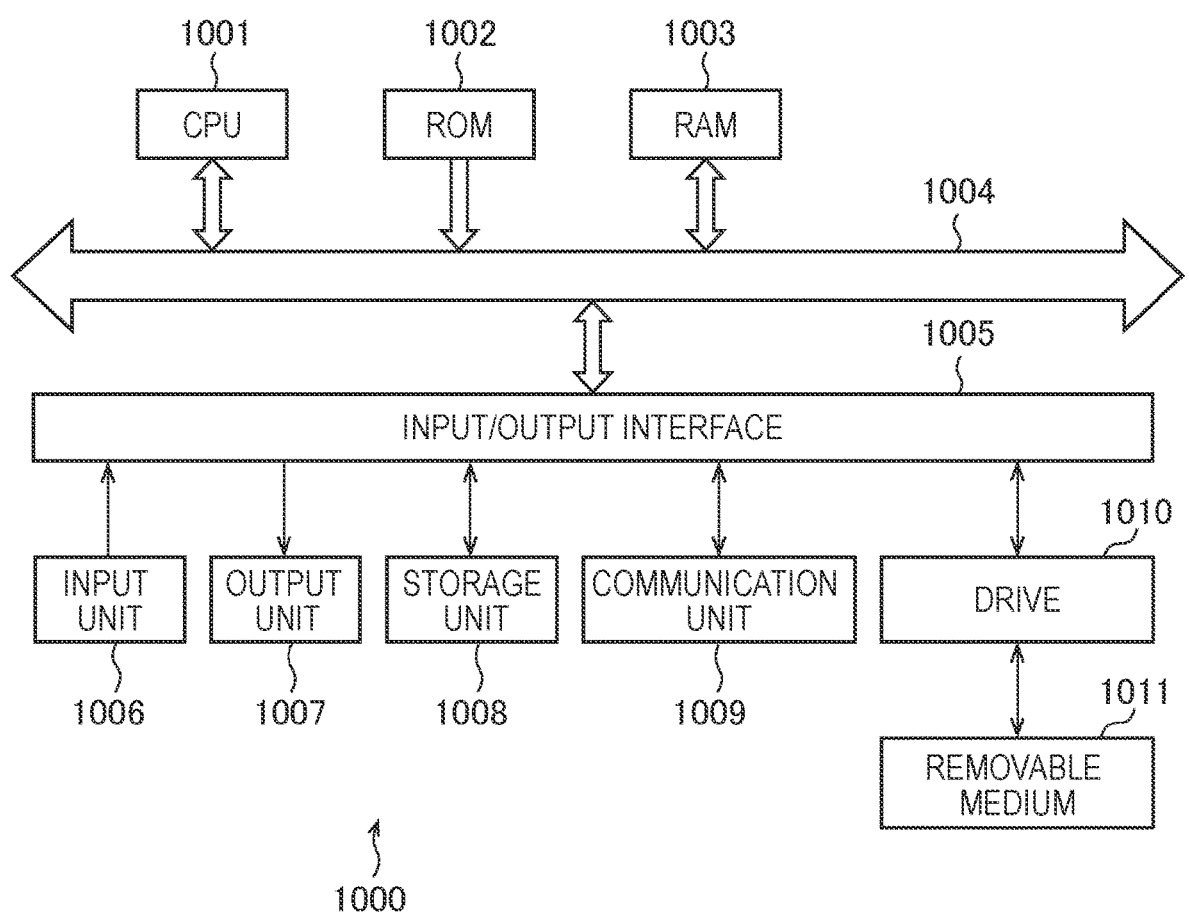
FIG. 75 is a block diagram illustrating an exemplary hardware configuration of a computer

FIG. 75 is a block diagram illustrating an exemplary hardware configuration of a computer that executes a series of processing described above by a program.

In the computer 1000, a central processing unit (CPU) 1001, a read only memory (ROM) 1002, and a random access memory (RAM) 1003 are connected to one another by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The storage unit 1008 includes a hard disk, a nonvolatile memory, or the like. The communication unit 1009 includes a network interface or the like. The drive 1010 drives a removable medium 1011 such as a magnetic disk, an optical disk, a magneto-optical disk, or a semiconductor memory.

In the computer 1000 configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer 1000 (the CPU 1001) are provided being recorded in the removable medium 1011 which is a packaged medium or the like. Also, programs may be provided via a wired or wireless transmission medium, such as a local area network, the Internet or digital satellite broadcasting.

In the computer 1000, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by the computer 1000 may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

Further, the advantageous effects described in the present specification are merely examples and are not limitative, and other advantageous effects may be achieved.

Further, an embodiment of the disclosure is not limited to the embodiments described above, and various changes and modifications may be made without departing from the scope of the disclosure.

3. Others

Additionally, the present technology may also be configured as below (1)

A generation device including:

a generation unit configured to generate stereo packing identification information for identifying a type of packing with regard to a plurality of region images of a celestial sphere image packed in a packed frame.

(2)

The generation device according to (1), further including:

a packing unit configured to pack, in the packed frame, a first image and a second image for generating a celestial sphere stereoscopic image of a projected frame of a plurality of regions of the celestial sphere image.

(3)

The generation device according to (2), in which the first image and the second image are a left-eye region image and a right-eye region image or a texture image and a depth image.

(4)

The generation device according to (2) or (3), in which the stereo packing identification information includes information for identifying the type of packing in which the first image and the second right image of the corresponding regions are disposed to configure the packed frame which is rectangular as a whole.

(5)

The generation device according to any of (2) to (4), in which the stereo packing identification information includes information for identifying the type of packing in which the first image and the second image of the corresponding regions are packed to be adjacent in the packed frame.

(6)

The generation device according to any of (2) to (5), in which the stereo packing identification information includes information for identifying the type of packing in which the first image and the second image of the corresponding regions are disposed at arbitrary positions in the rectangular packed frame.

(7)

The generation device according to any of (2) to (6), in which the stereo packing identification information includes information for identifying the type of packing in which packing is performed so that a first frame which is rectangular as a whole is configured in an invalid region along with the first image of the corresponding region, a second frame which is rectangular as a whole is configured in an invalid region along with the second image of the corresponding region, and the first frame and the second frame are disposed at predetermined positions to configure the rectangular packed frame.

(8)

The generation device according to any of (2) to (7), in which a projection structure of the celestial sphere image is a cube and the region image includes the region image in which images of the regions are continuously adjacent in right and left directions and the region image in which images of the regions are continuously adjacent in the top and bottom directions.

(9)

The generation device according to any of (2) to (8), in which the first image and the second image of the corresponding regions are collected in one large region.

(10)

The generation device according to any of (2) to (9), in which the large region includes a region long in a longitudinal direction and a region long in a transverse direction.

(11)

The generation device according to any of (2) to (10), in which a projection structure of the celestial sphere image is a sphere, and the first image and the second image of the regions adjacent to a left side of the region of a front face and the first image and the second image of the regions adjacent to a right side of the region of the front face are collected in one large region.

(12)

The generation device according to any of (2) to (11), in which the region is represented by a yaw angle and a pitch angle of a center of the region of a spherical coordinate system, angles of a width and a height of the region, or a width and a height of the region in a 2-dimensional coordinate system and x and y coordinates of one angle of the region.

(13)

The generation device according to any of (2) to (12), in which the stereo packing identification information is described in a box below Scheme Information Box of ISOBMFF.

(14)

The generation device according to any of (2) to (13), in which the generation unit further generates packing identification information for identifying that, with regard to the first image and the second image, at least one of a position or a size is changed for the packing.

(15)

The generation device according to any of (2) to (14), in which the first image is described in a case in which the packing identification information is packing identification information for identifying that at least one of the position or the size is changed for the packing.

(16)

The generation device according to any of (2) to (15), in which the first image is described in a case in which the stereo packing identification information is identification information for identifying the type of packing in which the left-eye region image of the corresponding region and the second image are disposed at arbitrary positions of the rectangular packed frame.

(17)

The generation device according to any of (2) to (16), in which the generation unit further generates identification information for identifying disposition of the region image, identification information for identifying whether the region image is stereoscopic or monoscopic, identification information for identifying a type of projection for the projection structure, or identification information for identifying a standard of an angle of a width and a height of the region of the projection structure.

(18)

The generation device according to any of (2) to (17), in which the generation unit further generates identification information for identifying the number of viewpoints for each region, and in a case in which the stereo packing identification information is identification information for identifying the type of packing, in which the first image and the second image of the corresponding regions are disposed at arbitrary positions of the rectangular packed frame, the region image of the number of viewpoints corresponding to the identification information for identifying the number of viewpoints for each region is described.

(19)

The generation device according to any of (2) to (18), in which the stereo packing identification information is described in conformity with MPEG-DASH.

(20)

The generation device according to any of (2) to (19), in which, in a case in which tracks in which an image of the packed frame is divided and stored are configured, the packed frame is packed in correspondence with the stereo packing identification information of the image stored in the tracks.

(21)

The generation device according to any of (2) to (20), in which, in a case in which tracks in which a pair of stereo images are stored are configured, the packed frame is packed so that the first image and the second image of which display regions match form an arbitrary continuous rectangular region in the packed frame.

(22)

An identification information generation method including:

a generation step of generating stereo packing identification information for identifying a type of packing with regard to a plurality of region images of a celestial sphere image packed in a packed frame by a generation device.

(23)

A reproduction device including:

an acquisition unit configured to acquire identification information for identifying a type of packing of a plurality of region images of a celestial sphere image in a packed frame;

a generation unit configured to generate a projected frame on the basis of the acquired identification information; and a rendering unit configured to render the projected frame.

(24)

An image reproduction method including:

an acquisition step of acquiring identification information for identifying a type of packing of a plurality of region images of a celestial sphere image in a packed frame by a reproduction device;

a generation step of generating a projected frame on the basis of the acquired identification information by the reproduction device; and a rendering step of rendering the projected frame by the reproduction device.

(25)

A generation device including:

a packing unit configured to pack a first image and a second image for generating a celestial sphere stereoscopic image of a projected frame of a plurality of regions of a celestial sphere image in a packed frame; and a generation unit configured to generate stereo video information that includes information indicating whether the image stored in a track in which at least one of the first image or the second image of the packed frame is stored is a stereoscopic reproducible image, for each track.

REFERENCE SIGNS LIST 210 delivery system
211 imaging device
212 generation device
213 delivery server
214 reproduction device
215 head-mounted display
231 stitching processing unit
232 mapping processing unit
233 region-wise packing processing unit
234 encoder
237 file generation unit
238 upload unit
601 file acquisition unit
604 packing frame generation unit
605 mapping processing unit
606 drawing unit

The invention claimed is:

1. A file generation device comprising:
a region-wise packing processing unit configured to generate a packed frame for an image comprising information of two projected frames by determining whether or not to perform a region-wise packing process of arranging a plurality of region images of each projected frame of the two projected frames in the packed frame; and
a file generation unit configured to generate a file including
the packed frame,
information indicating whether or not the region-wise packing process is performed for each packed frame, and
for each packed frame that the region-wise packing process is performed, information indicating a packing type of the region-wise packing process performed for arranging the plurality of region images of each projected frame,
wherein the two projected frames include a first projected frame corresponding to a first omnidirectional image and a second projected frame corresponding to a second omnidirectional image,
wherein the packing type is selected from among either a monoscopic packing type or a first stereoscopic packing type in which the plurality of region images of the first projected frame are arranged in a first configuration and the plurality of region images of the second projected frame are arranged in a second configuration in different areas of the packed frame, wherein either the monoscopic packing type or the first stereoscopic packing type is determined using a same information indicating the packing type according to whether the image is monoscopic or stereoscopic, or a second stereoscopic packing type in which the plurality of region images of the first projected frame and the plurality of region images of the second projected frame are interspersed in the packed frame, and wherein the region-wise packing processing unit and the file generation unit are each implemented via at least one processor.

2. The file generation device according to claim 1, wherein the region-wise packing processing unit is further configured to generate the information indicating the packing type, and
store the information indicating the packing type in a Region Mapping Box.

3. The file generation device according to claim 1,
wherein the region-wise packing process of the first stereoscopic packing type is performed such that the first configuration and the second configuration are identical.

4. A file generation method, implemented via at least one processor, the method comprising:

generating a packed frame for an image comprising information of two projected frames by determining whether or not to perform a region-wise packing process of arranging a plurality of region images of each projected frame of the two projected frames in the packed frame; and
generating a file including
the packed frame,
information indicating whether or not the region-wise packing process is performed for each packed frame, and
for each packed frame that the region-wise packing process is performed, information indicating a packing type of the region-wise packing process performed for arranging the plurality of region images of each projected frame,
wherein the two projected frames include a first projected frame corresponding to a first omnidirectional image and a second projected frame corresponding to a second omnidirectional image, and
wherein the packing type is selected from among
either a monoscopic packing type or a first stereoscopic packing type in which the plurality of region images of the first projected frame are arranged in a first configuration and the plurality of region images of the second projected frame are arranged in a second configuration in different areas of the packed frame, wherein either the monoscopic packing type or the first stereoscopic packing type is determined using a same information indicating the packing type according to whether the image is monoscopic or stereoscopic, or a second stereoscopic packing type in which the plurality of region images of the first projected frame and the plurality of region images of the second projected frame are interspersed in the packed frame.

5. A client device comprising:
a file acquisition unit configured to acquire a file including
a packed frame for an image comprising information of two projected frames; and
a decoder configured to decode the packed frame for the image comprising information of the two projected frames by determining whether or not the packed frame was generated by performing a region-wise packing process of arranging a plurality of region images of each projected frame of the two projected frames in the packed frame,
wherein the file further includes
information indicating whether or not the region-wise packing process is performed for each packed frame, and
for each packed frame that the region-wise packing process is performed, information indicating a packing type of the region-wise packing process performed for arranging the plurality of region images of each projected frame,
wherein the two projected frames include a first projected frame corresponding to a first omnidirectional image and a second projected frame corresponding to a second omnidirectional image,
wherein the packing type is selected from among
either a monoscopic packing type or a first stereoscopic packing type in which the plurality of region images of the first projected frame are arranged in a first configuration and the plurality of region images of the second projected frame are arranged in a second configuration in different areas of the packed frame, wherein either the monoscopic packing type or the first stereoscopic packing type is determined using a same information indicating the packing type according to whether the image is monoscopic or stereoscopic, or
a second stereoscopic packing type in which the plurality of region images of the first projected frame and the plurality of region images of the second projected frame are interspersed in the packed frame, and
wherein the file acquisition unit and the decoder are each implemented via at least one processor.

* * * * *